United States Patent
Yahiro et al.

(10) Patent No.: US 7,653,725 B2
(45) Date of Patent: Jan. 26, 2010

(54) MANAGEMENT SYSTEM SELECTIVELY MONITORING AND STORING ADDITIONAL PERFORMANCE DATA ONLY WHEN DETECTING ADDITION OR REMOVAL OF RESOURCES

(75) Inventors: Satomi Yahiro, Yokohama (JP); Hideo Ohata, Fujisawa (JP); Hideki Minato, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 185 days.

(21) Appl. No.: 12/025,248

(22) Filed: Feb. 4, 2008

(65) Prior Publication Data
US 2009/0150542 A1    Jun. 11, 2009

(30) Foreign Application Priority Data
Dec. 11, 2007    (JP) .............................. 2007-319749

(51) Int. Cl.
*G06F 15/173* (2006.01)

(52) U.S. Cl. ....................................... 709/224; 709/223

(58) Field of Classification Search ................. 709/223, 709/224, 222, 203; 702/182
See application file for complete search history.

(56) References Cited

U.S. PATENT DOCUMENTS

| 6,505,248 | B1 |   | 1/2003 | Casper et al. |         |
|-----------|----|---|--------|---------------|---------|
| 6,901,347 | B1 | * | 5/2005 | Murray et al. | 702/182 |
| 7,107,273 | B2 |   | 9/2006 | Ohata et al.  |         |
| 7,349,960 | B1 | * | 3/2008 | Pothier et al.| 709/224 |
| 2002/0116485 | A1 | * | 8/2002 | Black et al. | 709/223 |
| 2002/0138559 | A1 | * | 9/2002 | Ulrich et al.| 709/203 |
| 2005/0198247 | A1 | * | 9/2005 | Perry et al. | 709/223 |
| 2006/0041660 | A1 | * | 2/2006 | Bishop et al.| 709/224 |
| 2007/0198679 | A1 | * | 8/2007 | Duyanovich et al. | 709/223 |
| 2007/0250608 | A1 | * | 10/2007 | Watt .......... | 709/222 |

FOREIGN PATENT DOCUMENTS

JP    2005-157933    6/2005

* cited by examiner

*Primary Examiner*—Le Luu
(74) *Attorney, Agent, or Firm*—Brundidge & Stanger, P.C.

(57) ABSTRACT

To solve a problem in that reliable detection of a performance problem caused by a configuration change needs detailed performance information, which is costly to keep and analyze, a management computer which manages a computer system having a host computer and a storage system is provided. The management computer is configured to: store performance information obtained from resources that belong to paths at first time intervals until a predetermined length of time elapses since the detection of an addition or removal of the resources to the paths; store performance information obtained from the resources that belong to the paths at second time intervals, which are longer than the first time intervals, without storing performance information obtained from the resources that belong to the paths at the first time intervals after the predetermined length of time elapses since the detection of the addition or removal of the resources to the paths.

20 Claims, 42 Drawing Sheets

METRICS VALUE TABLE (HOST SERVER A)

| DATE/TIME | RESOURCE IDENTIFIER | METRICS IDENTIFIER | METRICS VALUE |
|---|---|---|---|
| 2007/07/07 6:00 | FILE A | I/O COUNT PER SECOND | 1214.5 |
| 2007/07/07 6:00 | VOLUME A | I/O COUNT PER SECOND | 2200.5 |
| 2007/07/07 6:00 | PORT A | I/O COUNT PER SECOND | 1237.3 |
| ... | ... | ... | ... |
| 2007/07/07 6:30 | FILE A | I/O COUNT PER SECOND | 1248.1 |
| 2007/07/07 6:30 | VOLUME A | I/O COUNT PER SECOND | 1989.3 |
| 2007/07/07 6:30 | PORT A | I/O COUNT PER SECOND | 1253.2 |
| ... | ... | ... | ... |

*FIG. 5*

APPLICATION-FILE RELATION TABLE (HOST SERVER A)

| APPLICATION IDENTIFIER (601) | FILE IDENTIFIER (602) |
|---|---|
| APPLICATION A | FILE A |

FILE-VOLUME RELATION TABLE (HOST SERVER A)

| FILE IDENTIFIER (611) | VOLUME IDENTIFIER (612) |
|---|---|
| FILE A | VOLUME A |

VOLUME-LOGICAL VOLUME-PORT RELATION TABLE (HOST SERVER A)

| VOLUME IDENTIFIER (621) | LOGICAL VOLUME IDENTIFIER (622) | HOST SIDE PORT IDENTIFIER (623) | STORAGE SIDE PORT IDENTIFIER (624) |
|---|---|---|---|
| VOLUME A | LOGICAL VOLUME A | PORT A | PORT P |

APPLICATION-FILE RELATION TABLE (HOST SERVER B)

| APPLICATION IDENTIFIER | FILE IDENTIFIER |
|---|---|
| APPLICATION B | FILE B |
| APPLICATION B | FILE C |
| APPLICATION C | FILE D |

*FIG. 8A*

FILE-VOLUME RELATION TABLE (HOST SERVER B)

| FILE IDENTIFIER | VOLUME IDENTIFIER |
|---|---|
| FILE B | VOLUME B |
| FILE C | VOLUME B |
| FILE D | VOLUME C |

*FIG. 8B*

VOLUME-LOGICAL VOLUME-PORT RELATION TABLE (HOST SERVER B)

| VOLUME IDENTIFIER | LOGICAL VOLUME IDENTIFIER | HOST SIDE PORT IDENTIFIER | STORAGE SIDE PORT IDENTIFIER |
|---|---|---|---|
| VOLUME B | LOGICAL VOLUME B | PORT B | PORT Q |
| VOLUME C | LOGICAL VOLUME C | PORT C | PORT R |

*FIG. 8C*

METRICS VALUE TABLE (HOST SERVER C)

| DATE/TIME | RESOURCE IDENTIFIER | METRICS IDENTIFIER | METRICS VALUE |
|---|---|---|---|
| 2007/07/07 6:00 | FILE E | I/O COUNT PER SECOND | 1214.5 |
| 2007/07/07 6:00 | VOLUME D | I/O COUNT PER SECOND | 2200.5 |
| 2007/07/07 6:00 | PORT S | I/O COUNT PER SECOND | 1237.3 |
| ... | ... | ... | ... |
| 2007/07/07 6:30 | FILE E | I/O COUNT PER SECOND | 1248.1 |
| 2007/07/07 6:30 | VOLUME D | I/O COUNT PER SECOND | 1989.3 |
| 2007/07/07 6:30 | PORT S | I/O COUNT PER SECOND | 1253.2 |
| ... | ... | ... | ... |

FIG. 9

APPLICATION-FILE RELATION TABLE (HOST SERVER C)

| APPLICATION IDENTIFIER (1001) | FILE IDENTIFIER (1002) |
|---|---|
| APPLICATION D | FILE E |

FILE-VOLUME RELATION TABLE (HOST SERVER C)

| FILE IDENTIFIER (1011) | VOLUME IDENTIFIER (1012) |
|---|---|
| FILE E | VOLUME D |

VOLUME-LOGICAL VOLUME-PORT RELATION TABLE (HOST SERVER C)

| VOLUME IDENTIFIER (1021) | LOGICAL VOLUME IDENTIFIER (1022) | HOST SIDE PORT IDENTIFIER (1023) | STORAGE SIDE PORT IDENTIFIER (1024) |
|---|---|---|---|
| VOLUME D | LOGICAL VOLUMED | PORT S | PORT R |

METRICS VALUE TABLE (SAN SWITCH)

| DATE/TIME | RESOURCE IDENTIFIER | METRICS IDENTIFIER | METRICS VALUE |
|---|---|---|---|
| 2007/07/07 6:00 | PORT D | I/O COUNT PER SECOND | 1213.6 |
| 2007/07/07 6:00 | PORT E | I/O COUNT PER SECOND | 1247.5 |
| 2007/07/07 6:00 | PORT F | I/O COUNT PER SECOND | 1252.3 |
| 2007/07/07 6:00 | PORT T | I/O COUNT PER SECOND | 1236.5 |
| 2007/07/07 6:00 | PORT G | I/O COUNT PER SECOND | 1224.3 |
| 2007/07/07 6:00 | PORT H | I/O COUNT PER SECOND | 1212.3 |
| 2007/07/07 6:00 | PORT I | I/O COUNT PER SECOND | 1452.3 |
| ... | ... | ... | ... |
| 2007/07/07 6:30 | PORT D | I/O COUNT PER SECOND | 1215.3 |
| 2007/07/07 6:30 | PORT E | I/O COUNT PER SECOND | 1265.3 |
| 2007/07/07 6:30 | PORT F | I/O COUNT PER SECOND | 1245.6 |
| 2007/07/07 6:30 | PORT T | I/O COUNT PER SECOND | 1243.6 |
| 2007/07/07 6:30 | PORT G | I/O COUNT PER SECOND | 1235.2 |
| 2007/07/07 6:30 | PORT H | I/O COUNT PER SECOND | 1425.6 |
| 2007/07/07 6:30 | PORT I | I/O COUNT PER SECOND | 1245.7 |
| ... | ... | ... | ... |

*FIG. 11*

INTERPORT COMMUNICATION PATH TABLE (SAN SWITCH)

| HOST SIDE PORT IDENTIFIER | STORAGE SIDE PORT IDENTIFIER | SWITCH PORT IDENTIFIER LIST |
|---|---|---|
| PORT A | PORT P | {PORT D, PORT G, PORT J, PORT M} |
| PORT B | PORT Q | {PORT E, PORT H, PORT K, PORT N} |
| PORT C | PORT R | {PORT F, PORT I, PORT L, PORT O} |
| PORT S | PORT R | {PORT T, PORT U, PORT V, PORT O} |

*FIG. 12*

METRICS VALUE TABLE (STORAGE SUBSYSTEM)

| DATE/TIME | RESOURCE IDENTIFIER | METRICS IDENTIFIER | METRICS VALUE |
|---|---|---|---|
| 2007/07/07 6:00 | PORT P | I/O COUNT PER SECOND | 1215.6 |
| 2007/07/07 6:00 | PORT Q | I/O COUNT PER SECOND | 1253.3 |
| 2007/07/07 6:00 | PORT R | I/O COUNT PER SECOND | 1100.2 |
| 2007/07/07 6:00 | LOGICAL VOLUME A | I/O COUNT PER SECOND | 1199.3 |
| 2007/07/07 6:00 | LOGICAL VOLUME B | I/O COUNT PER SECOND | 1238.7 |
| 2007/07/07 6:00 | LOGICAL VOLUME C | I/O COUNT PER SECOND | 1268.9 |
| 2007/07/07 6:00 | LOGICAL VOLUME D | I/O COUNT PER SECOND | 1425.3 |
| 2007/07/07 6:00 | ARRAY GROUP A | I/O COUNT PER SECOND | 1198.5 |
| 2007/07/07 6:00 | ARRAY GROUP B | I/O COUNT PER SECOND | 2238.9 |
| 2007/07/07 6:00 | ARRAY GROUP C | I/O COUNT PER SECOND | 2200.7 |
| ... | ... | ... | ... |
| 2007/07/07 6:30 | PORT P | I/O COUNT PER SECOND | 1217.5 |
| 2007/07/07 6:30 | PORT Q | I/O COUNT PER SECOND | 1242.3 |
| 2007/07/07 6:30 | PORT R | I/O COUNT PER SECOND | 1112.3 |
| 2007/07/07 6:30 | LOGICAL VOLUME A | I/O COUNT PER SECOND | 1200.5 |
| 2007/07/07 6:30 | LOGICAL VOLUME B | I/O COUNT PER SECOND | 1238.6 |
| 2007/07/07 6:30 | LOGICAL VOLUME C | I/O COUNT PER SECOND | 1268.7 |
| 2007/07/07 6:30 | LOGICAL VOLUME D | I/O COUNT PER SECOND | 1468.7 |
| 2007/07/07 6:30 | ARRAY GROUP A | I/O COUNT PER SECOND | 2200.4 |
| 2007/07/07 6:30 | ARRAY GROUP B | I/O COUNT PER SECOND | 2236.8 |
| 2007/07/07 6:30 | ARRAY GROUP C | I/O COUNT PER SECOND | 2135.7 |
| ... | ... | ... | ... |

*FIG. 13*

PER-MINUTE METRICS VALUE TABLE (PERFORMANCE MANAGEMENT SERVER)

| DATE/TIME | RESOURCE IDENTIFIER | METRICS IDENTIFIER | METRICS VALUE |
|---|---|---|---|
| 2007/07/07 6:00 | FILE D | I/O COUNT PER SECOND | 1214.5 |
| 2007/07/07 6:01 | FILE D | I/O COUNT PER SECOND | 1214.5 |
| 2007/07/07 6:02 | FILE D | I/O COUNT PER SECOND | 1214.5 |
| ... | ... | ... | ... |
| 2007/07/07 6:00 | VOLUME C | I/O COUNT PER SECOND | 1248.5 |
| 2007/07/07 6:01 | VOLUME C | I/O COUNT PER SECOND | 1232.5 |
| 2007/07/07 6:02 | VOLUME C | I/O COUNT PER SECOND | 2200.5 |
| ... | ... | ... | ... |
| 2007/07/07 6:00 | PORT C | I/O COUNT PER SECOND | 1237.5 |
| 2007/07/07 6:01 | PORT C | I/O COUNT PER SECOND | 1236.5 |
| 2007/07/07 6:02 | PORT C | I/O COUNT PER SECOND | 1224.3 |
| ... | ... | ... | ... |
| 2007/07/07 6:00 | PORT O | I/O COUNT PER SECOND | 1237.5 |
| 2007/07/07 6:01 | PORT O | I/O COUNT PER SECOND | 1236.5 |
| 2007/07/07 6:02 | PORT O | I/O COUNT PER SECOND | 1224.3 |
| ... | ... | ... | ... |
| 2007/07/07 6:00 | PORT R | I/O COUNT PER SECOND | 1237.5 |
| 2007/07/07 6:01 | PORT R | I/O COUNT PER SECOND | 1236.5 |
| 2007/07/07 6:02 | PORT R | I/O COUNT PER SECOND | 1224.3 |
| ... | ... | ... | ... |
| 2007/07/07 6:00 | LOGICAL VOLUME C | I/O COUNT PER SECOND | 1212.3 |
| 2007/07/07 6:01 | LOGICAL VOLUME C | I/O COUNT PER SECOND | 1452.3 |
| 2007/07/07 6:02 | LOGICAL VOLUME C | I/O COUNT PER SECOND | 1100.2 |
| ... | ... | ... | ... |
| 2007/07/07 6:00 | ARRAY GROUP B | I/O COUNT PER SECOND | 1425.3 |
| 2007/07/07 6:01 | ARRAY GROUP B | I/O COUNT PER SECOND | 2238.9 |
| 2007/07/07 6:02 | ARRAY GROUP B | I/O COUNT PER SECOND | 2238.9 |
| ... | ... | ... | ... |

FIG. 15

FILE-VOLUME RELATION TABLE (PERFORMANCE MANAGEMENT SERVER)

| FILE IDENTIFIER | VOLUME IDENTIFIER |
|---|---|
| FILE A | VOLUME A |
| FILE B | VOLUME B |
| FILE C | VOLUME B |
| FILE D | VOLUME C |
| FILE E | VOLUME D |

*FIG. 17A*

LOGICAL VOLUME-ARRAY GROUP RELATION TABLE (PERFORMANCE MANAGEMENT SERVER)

| LOGICAL VOLUME IDENTIFIER | ARRAY GROUP IDENTIFIER |
|---|---|
| LOGICAL VOLUME A | ARRAY GROUP A |
| LOGICAL VOLUME B | ARRAY GROUP A |
| LOGICAL VOLUME C | ARRAY GROUP B |
| LOGICAL VOLUME D | ARRAY GROUP C |

*FIG. 17B*

VOLUME-LOGICAL VOLUME-PORT CORRESPONDENCE TABLE (PERFORMANCE MANAGEMENT SERVER)

| VOLUME IDENTIFIER | LOGICAL VOLUME IDENTIFIER | HOST SIDE PORT IDENTIFIER | STORAGE SIDE PORT IDENTIFIER | SWITCH PORT IDENTIFIER LIST |
|---|---|---|---|---|
| VOLUME A | LOGICAL VOLUME A | PORT A | PORT P | {PORT D, PORT G, PORT J, PORT M} |
| VOLUME B | LOGICAL VOLUME B | PORT B | PORT Q | {PORT E, PORT H, PORT K, PORT N} |
| VOLUME C | LOGICAL VOLUME C | PORT C | PORT R | {PORT F, PORT I, PORT L, PORT O} |
| VOLUME D | LOGICAL VOLUME D | PORT S | PORT R | {PORT T, PORT U, PORT V, PORT O} |

FIG. 18

CONFIGURATION CHANGE DATE/TIME TABLE (PERFORMANCE MANAGEMENT SERVER)

| CONFIGURATION CHANGE DETECTION DATE/TIME | CONFIGURATION CHANGE IDENTIFIER | CONFIGURATION CHANGE SPECIFICS |
|---|---|---|
| 2007-07-07 07:00 | CONFIGURATION CHANGE A | ADDITION OF APPLICATION D |
| 2007-07-08 10:00 | CONFIGURATION CHANGE B | ADDITION OF LOGICAL VOLUME E |
| 2007-07-08 13:00 | CONFIGURATION CHANGE C | ALLOCATION TO LU |
| 2007-07-08 15:00 | CONFIGURATION CHANGE D | ALLOCATION OF I/O PATH |
| ... | ... | ... |

*FIG. 19A*

CONFIGURATION CHANGE INFORMATION TABLE (PERFORMANCE MANAGEMENT SERVER)

| CONFIGURATION CHANGE IDENTIFIER | RESOURCE IDENTIFIER | CHANGE SPECIFICS IDENTIFIER | COLLECTION PERIOD |
|---|---|---|---|
| CONFIGURATION CHANGE A | APPLICATION D | ADDITION | TWO WEEKS |
| CONFIGURATION CHANGE A | FILE E | ADDITION | TWO WEEKS |
| CONFIGURATION CHANGE A | VOLUME D | ADDITION | TWO WEEKS |
| CONFIGURATION CHANGE A | PORT S | ADDITION | TWO WEEKS |
| ... | ... | ... | ... |

*FIG. 19B*

CHANGED I/O PATH INFORMATION TABLE (PERFORMANCE MANAGEMENT SERVER)

| PATH IDENTIFIER | RESOURCE IDENTIFIER | CHANGE SPECIFICS IDENTIFIER | CONFIGURATION CHANGE IDENTIFIER |
|---|---|---|---|
| PATH D | APPLICATION D | ADDITION | CONFIGURATION CHANGE A |
| PATH D | FILE E | ADDITION | CONFIGURATION CHANGE A |
| PATH D | VOLUME D | ADDITION | CONFIGURATION CHANGE A |
| PATH D | ... | ADDITION | CONFIGURATION CHANGE A |
| PATH D | PORT O | ADDITION | CONFIGURATION CHANGE A |
| PATH D | PORT R | ADDITION | CONFIGURATION CHANGE A |
| PATH D | LOGICAL VOLUME D | ADDITION | CONFIGURATION CHANGE A |
| PATH D | ARRAY GROUP C | ADDITION | CONFIGURATION CHANGE A |
| ... | ... | ... | ... |

MANAGEMENT SYSTEM SELECTIVELY MONITORING AND STORING ADDITIONAL PERFORMANCE DATA ONLY WHEN DETECTING ADDITION OR REMOVAL OF RESOURCES

CLAIM OF PRIORITY

The present application claims priority from Japanese application JP2007-319749 filed on Dec. 11, 2007, the content of which is hereby incorporated by reference into this application.

BACKGROUND

This invention relates to performance management of a computer system which includes a storage system, and more particularly, to a method of monitoring performance of a computer system by using an agent.

Storage networks in which a plurality of computers access an integrated storage system via a network are available today. These storage networks enhance the utilization efficiency of storage systems ever increasing in scale and help reduce the management cost as well, which are making storage networks widely popular as architecture for data centers. In a storage network environment, there is a possibility that the processing loads of application systems interfere with one another in a component (e.g., a network system or a storage system) shared by a plurality of computers. The load interference could cause a performance problem (lowering of the performance of the application systems, for example) in the application systems. A computer system to which a storage network as those described above is introduced therefore needs to collect performance information on resources constituting the network in a comprehensive manner in order to monitor and adjust the performance of the application systems.

An example of a performance monitoring technique in a networked computer system is disclosed in U.S. Pat. No. 6,505,248. According to U.S. Pat. No. 6,505,248, performance is managed by an agent arranged for each of resources which are to be monitored, and management software for uniformly managing performance information of the entire system.

Each of the agents obtains the performance information by directly communicating with the monitoring target. Specifically, the agent executes polling with respect to the monitoring target to obtain a metrics value of resources.

On the other hand, the management software collects and stores the pieces of performance information obtained by the agents, and provides the stored pieces of performance information according to a request from an administrator or the like. Accordingly, it is possible to uniformly manage operation states and performance of the resource constituting the computer system.

When the size of the uniformly managed computer system increases, the number of resources to be monitored also increases. Along with an increase in the number of resources, an amount of the performance information which the management software must obtain also increases, whereby it is necessary to process a large amount of performance information. JP 2005-157933 A discloses a method of automatically adjusting a target range from which performance information is to be obtained and an obtaining frequency based on the information obtained by the management software.

SUMMARY

For reliable detection of performance problems (e.g., lowering of performance due to the interference) from performance information collected by the management software, detailed performance information has to be collected about each resource. An example of detailed performance information is performance information that has enough time resolution (i.e., performance information obtained at satisfactorily short time intervals).

However, the detection of performance problems does not always require collecting detailed performance information from all resources all the time. For instance, the performance could be lowered by a load interference newly caused as a result of a change in configuration of the computer system. The new interference is likely to involve only resources that are relevant to the changed configuration. Accordingly, performance information collected from resources that are irrelevant to the changed configuration will not be useful in detecting this interference.

Collecting detailed performance information exhaustively in such cases is not economical in terms of performance monitoring cost. In particular, in a large-scale computer system having numerous constituent resources, a huge storage capacity is required to hold detailed performance information collected from all those resources.

Further, an increase in scale of a computer system means a complication of the inter-resource relation in addition to a higher resource count, with the result that the time required to analyze collected performance information is prolonged. Collecting detailed performance information exhaustively all the time even in cases where not all of the pieces of detailed performance information are useful can therefore hinder a prompt detection of performance problems.

According to a representative invention disclosed in this application, there is provided a management computer coupled via a network to a computer system which comprises at least one host computer, a storage system coupled to the at least one host computer via the network, and a display device, the at least one host computer comprising a first interface coupled to the network, a first processor coupled to the first interface, and a first memory coupled to the first processor, the storage system comprising at least one physical disk device which stores data written by the at least one host computer, the management computer comprising: a second interface coupled to the at least one host computer and the storage system; a second processor coupled to the second interface; and a second memory coupled to the second processor, wherein each of a plurality of paths over which data is written and read in the at least one physical disk device by the at least one host computer includes a plurality of resources, wherein the second memory holds identification information of each of the plurality of resources, wherein the plurality of paths include a first path and a second path, wherein the second processor is configured to detect at least one of an addition and removal of the resource to the first path, wherein adding the resource to the first path includes newly setting the first path which includes the plurality of resources, and wherein the second processor is further configured to: store, in the second memory, performance information obtained from the plurality of resources that belong to the first path at first time intervals until a predetermined length of time elapses since the detection of the at least one of addition and removal of the resource to the first path; store, when at least one of the plurality of resources belonging to the first path also belongs to the second path, in the second memory, performance information obtained from the plurality of resources that belong to the second path at the first time intervals until the predetermined length of time elapses since the detection of the at least one of addition and removal of the resource to the first path; store, in the second memory, performance information obtained from the plurality of resources that belong to at least one of the first path and the second path at second time intervals, which are longer than the first time intervals, without storing performance information obtained from the plurality of resources that belong to at least one of the first path and the second path at the first time intervals after the predetermined length of time elapses since the detection of the at least one of addition and removal of the resource to the first path; and send an instruction that causes the display device to display the performance information obtained from the plurality of resources that belong to at least one of the plurality of paths at the first time intervals.

According to an embodiment of this invention, a performance problem due to a configuration change can be detected reliably and promptly while the amount of performance information held is kept to a manageable level.

BRIEF DESCRIPTION OF THE DRAWINGS

FIG. 5 is an explanatory diagram of a metrics value table regarding a first host server according to the embodiment of this invention.

FIG. 6A is an explanatory diagram of an application-file relation table for the first host server according to the embodiment of this invention.

FIG. 6B is an explanatory diagram of a file-volume relation table of the first host server according to the embodiment of this invention.

FIG. 6C is an explanatory diagram of a volume-logical volume-port relation table of the first host server according to the embodiment of this invention.

FIG. 8A is an explanatory diagram of an application-file relation table regarding the second host server according to the embodiment of this invention.

FIG. 8B is an explanatory diagram of a file-volume relation table regarding the second host server according to the embodiment of this invention.

FIG. 8C is an explanatory diagram of a volume-logical volume-port relation table regarding the second host server according to the embodiment of this invention.

FIG. 9 is an explanatory diagram of a metrics value table regarding a third host server according to the embodiment of this invention.

FIG. 10A is an explanatory diagram of an application-file relation table of the third host server according to the embodiment of this invention.

FIG. 10B is an explanatory diagram of a file-volume relation table of the third host server according to the embodiment of this invention.

FIG. 10C is an explanatory diagram of a volume-logical volume-port relation table of the third host server according to the embodiment of this invention.

FIG. 11 is an explanatory diagram of a metrics value table regarding SAN switches according to the embodiment of this invention.

FIG. 12 is an explanatory diagram of an interport communication path table of the SAN switches according to the embodiment of this invention.

FIG. 13 is an explanatory diagram of a metrics value table regarding a storage subsystem according to the embodiment of this invention.

FIG. 15 is an explanatory diagram of a per-minute metrics value table which is used by a storage network performance management program according to the embodiment of this invention.

FIG. 17A is an explanatory diagram of a file-volume relation table used by the storage network performance management program according to the embodiment of this invention.

FIG. 17B is an explanatory diagram of a logical volume-array group relation table used by the storage network performance management program according to the embodiment of this invention.

FIG. 18 is an explanatory diagram of a volume-logical volume-port correspondence table used by the storage network performance management program according to the embodiment of this invention.

FIG. 19A is an explanatory diagram of a configuration change date/time table which is used by the storage network performance management program according to the embodiment of this invention.

FIG. 19B is an explanatory diagram of a configuration change information table which is used by the storage network performance management program according to the embodiment of this invention.

FIG. 21 is an explanatory diagram of a changed I/O path information table which is used by the storage network performance management program according to the embodiment of this invention.

DETAILED DESCRIPTION OF THE PREFERRED EMBODIMENT

Hereinafter, description will be made of an embodiment of this invention with reference to the drawings.

Figure 1:
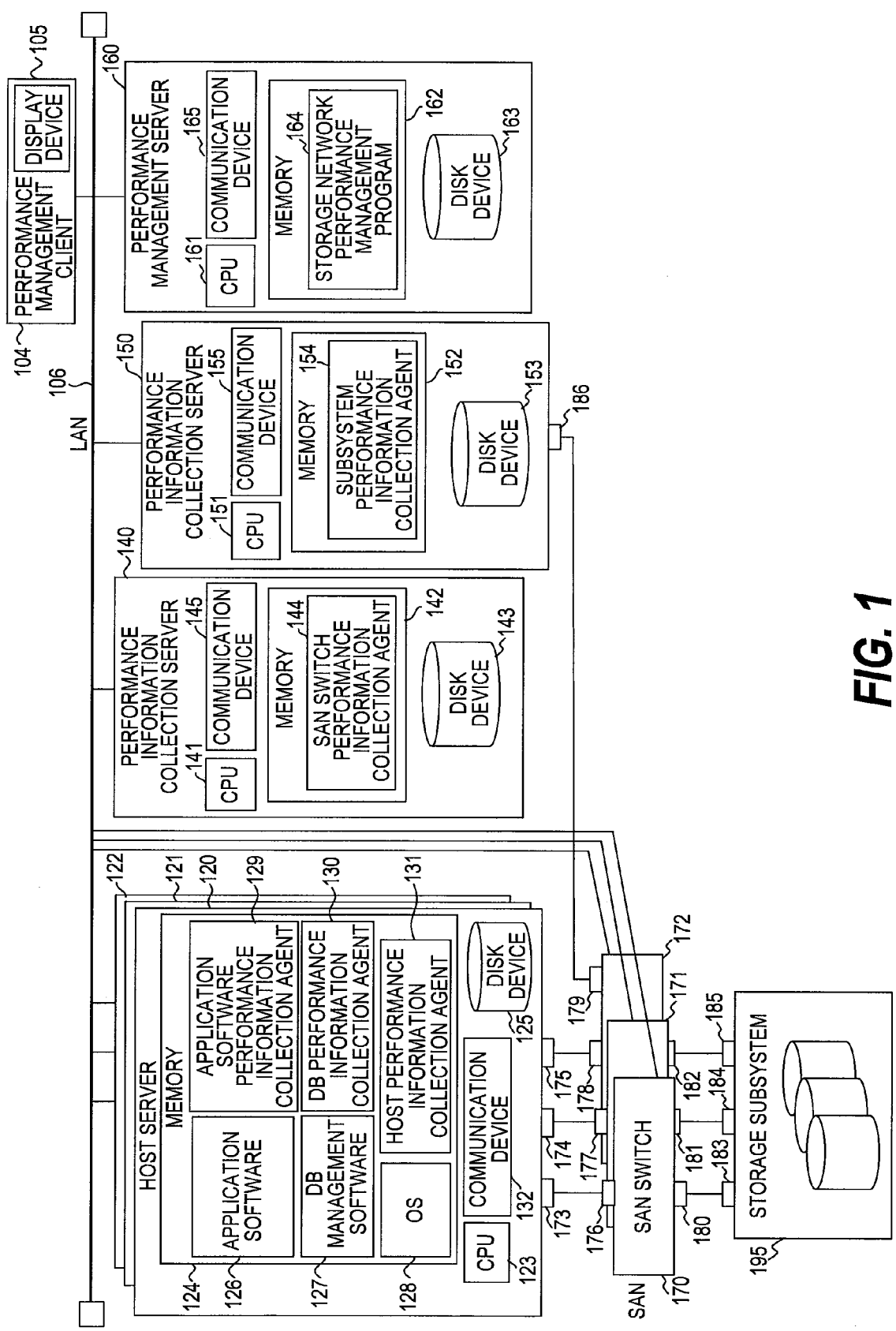
FIG. 1 is a block diagram showing a configuration of a computer system according to an embodiment of this invention.

FIG. 1 is a block diagram showing the configuration of a computer system according to the embodiment of this invention.

The computer system of this embodiment has a performance management client 104, host servers 120 to 122, a performance information collection server 140, a performance information collection server 150, a performance management server 160, a storage subsystem 195, and storage area network (SAN) switches 170 to 172. The above constituent devices except the storage subsystem 195 are coupled to one another via a local area network (LAN) 106.

One or more client computers (not shown in the drawings) may additionally be coupled to the LAN 106. The client computer(s) may be personal computers, work stations, thin client terminals, or similar others that provide a user interface function of an application system. The client computer(s) may communicate with application software 126 or the like of the host servers 120 to 122 via the LAN 106.

The host servers 120 to 122 are computers that execute various types of processing in response to requests received via the LAN 106. These requests may be sent from, for example, the client computer(s) coupled to the LAN 106.

The host server 120 has a CPU 123, a memory 124, a disk device 125, and a communication device 132, which are coupled to one another.

The CPU 123 is a processor that executes software stored in the memory 124.

The memory 124 is, for example, a semiconductor memory, and stores software executed by the CPU 123 and other data. In the example of FIG. 1, the memory 124 stores the application software 126, database (DB) management software 127, an operating system (OS) 128, an application software performance information collection agent 129, a DB performance information collection agent 130, and a host performance information collection agent 131. These software programs may be stored in the disk device 125 to be copied to the memory 124 as the need arises.

The disk device 125 is, for example, a hard disk drive (HDD), and stores software executed by the CPU 123 and other data. The disk device 125 may be any other type of disk device other than an HDD, for example, an optical disk device. Also, the disk device 125 is replaceable with a semiconductor memory such as a flash memory.

The communication device 132 is an interface through which the host server 120 communicates with other constituent devices. The host server 120 may have a plurality of communication devices 132. In this case, one of the communication devices 132 may be a network interface card (NIC) which is coupled to the LAN 106 to communicate with the performance management server 160, the client computer(s), and others upon instruction from the CPU 123. Another of the communication devices 132 may be a host bus adapter (HBA) which is coupled to the SAN switches 170 to 172 to communicate with the storage subsystem 195 upon instruction from the CPU 123. The host bus adapter has ports 173 to 175. The HBA uses the Fibre Channel (FC) protocol, for example, but may use any other protocol.

The hardware configuration of the host servers 121 and 122 is the same as that of the host server 120, and its description will be omitted.

The software held in the host servers 120 to 122 will now be described.

The application software 126 is a software program for providing an application logical function. Specifically, the application software 126 requests the DB management software 127 to refer to or update data when necessary in response to processing requests from the client computer. The host server 120 to 122 may hold a plurality of pieces of application software 126.

The DB management software 127 is a software program for providing a data management function. Specifically, the DB management software 127 executes processing regarding definition, an operation, and management of data stored in the storage subsystem 195 in response to a request from the application software 126. The application software 126 and the DB management software 127 used by the application software 126 may be executed by the same host server among the host servers 120 to 122, or respectively by dedicated one of the host severs 120 to 122.

Data access (i.e., data I/O) from the DB management software 127 to the storage subsystem 195 is executed via the OS 128, ports 173 to 175 of a HBA, host side ports 176 to 178 of the SAN switches 170 to 172, storage side ports 180 to 182 of the SAN switches 170 to 172, and ports 183 to 185 of the storage subsystem 195.

The performance management client 104, the performance management server 160, and the performance information collection servers 140, and 150 are computers disposed to manage performance of the computer system.

The performance management server 160 includes a CPU 161, a memory 162, a disk device 163, and a communication device 165 coupled to one another.

The CPU 161 is a processor for executing a software program stored in the memory 162.

The memory 162 is, for example, a semiconductor memory, and stores software executed by the CPU 161 and other data. In the example of FIG. 1, the memory 162 stores a storage network performance management program 164. The storage network performance management program 164 may be stored in the disk device 163 to be copied to the memory 162 as the need arises.

For example, the disk device 163 is an HDD to store the software program executed by the CPU 161 or other data. For the disk device 163, any type of disk device or semiconductor memory may be used as in the case of the disk device 125.

The communication device 165 is an interface coupled to the LAN 106. The communication device 165 communicates with other computers or the like coupled to the LAN 106.

The performance management client 104 is a device that provides a user interface function of the storage network performance management program 164. The performance management client 104 has at least a display device 105, which is for displaying information to the user, and an input device (not shown in the drawings), which is for receiving an input from the user. The display device 105 is an image display device such as a cathode ray tube (CRT) or a liquid crystal display device. Examples of windows displayed on the display device 105 will be described later with reference to FIG. 29 and other drawings. The performance management client 104 communicates with the storage network performance management program 164 over the LAN 106.

The performance information collection server 150 includes a CPU 151, a memory 152, a disk device 153, and a communication device 155 coupled to one another.

The CPU 151 is a processor for executing a software program stored in the memory 152.

The memory 152 is, for example, a semiconductor memory, and stores software executed by the CPU 151 and other data. In the example of FIG. 1, the memory 152 stores a subsystem performance information collection agent 154. The subsystem performance information collection agent 154 may be stored in the disk device 153 to be copied to the memory 152 as the need arises.

For example, the disk device 153 is an HDD to store the software program executed by the CPU 151 or other data. For the disk device 153, any type of disk device or semiconductor memory may be used as in the case of the disk device 125.

The communication device 155 is an interface through which the performance information collection server 150 communicates with other constituent devices. The performance information collection server 150 may have a plurality of the communication devices 155. In this case, one of the communication devices 155 may be an NIC which is coupled to the LAN 106. The NIC communicates with other computers and the like that are coupled to the LAN 106. Another of the communication devices 155 may be an HBA which is coupled to the SAN switches 170 to 172. The HBA has one or more ports 186 coupled to the SAN switches 170 to 172. The HBA obtains performance information about the storage subsystem 195 by communicating with the storage subsystem 195 via the SAN switches 170 to 172. The HBA can use the FC protocol or any other protocol.

The performance information collection server 140 includes a CPU 141, a memory 142, a disk device 143, and a communication device 145 coupled to one another.

The CPU 141 is a processor for executing a software program stored in the memory 142.

The memory 142 is, for example, a semiconductor memory, and stores software executed by the CPU 141 and other data. In the example of FIG. 1, the memory 142 stores a SAN switch performance information collection agent 144. The SAN switch performance information collection agent 144 may be stored in the disk device 143 to be copied to the memory 142 as the need arises.

For example, the disk device 143 is an HDD to store the software program executed by the CPU 141 or other data. For the disk device 143, any type of disk device or semiconductor memory may be used as in the case of the disk device 125.

The communication device 145 is an interface coupled to the LAN 106. The communication device 145 communicates with other computers or the like coupled to the LAN 106.

The storage network performance management program 164, the SAN switch performance information collection agent 144, the subsystem performance information collection agent 154, the application software performance information collection agent 129, the DB performance information collection agent 130, and the host performance information collection agent 131 are software for managing the performance of a computer system.

The storage network performance management program 164 is software that provides a function of collecting and analyzing performance information of a computer system to which a storage network has been introduced. Performance information is information that indicates the performance of hardware resources and software resources constituting the computer system. The storage network performance management program 164 obtains performance information from various hardware resources and software resources constituting the computer system by utilizing performance information collection agent software which is dedicated to each hardware resource and each software resource. Performance information collection agents can be configured and arranged in various manners, and an example thereof will be given below.

The application software performance information collection agent 129 and the DB performance information collection agent 130 are software for obtaining performance information about the application software 126 and the DB management software 127, respectively.

The host performance information collection agent 131 obtains performance information about the host servers 120 to 122, the OS 128, and the ports 173 to 175.

The subsystem performance information collection agent 154 obtains performance information about the storage subsystem 195 and ports 183 to 185 of the storage subsystem 195 via the port 186 and the SAN switches 170 to 172.

The storage subsystem 195 may be coupled to the LAN 106. In this case, the subsystem performance information collection agent 154 may obtain performance information about the storage subsystem 195 and the ports 183 to 185 from the storage subsystem 195 via the LAN 106.

The SAN switch performance information collection agent 144 obtains performance information about the SAN switches 170 to 172 and ports 176 to 182 of the SAN switches 170 to 172 via the LAN 106.

The subsystem performance information collection agent 154 and the SAN switch performance information collection agent 144 may be executed by their respective dedicated computers as shown in FIG. 1, or may be executed by one computer.

The configurations of these performance information collection agents and of the storage network performance management program 164 will be described later with reference to FIGS. 2A and 2B.

Figure 3:
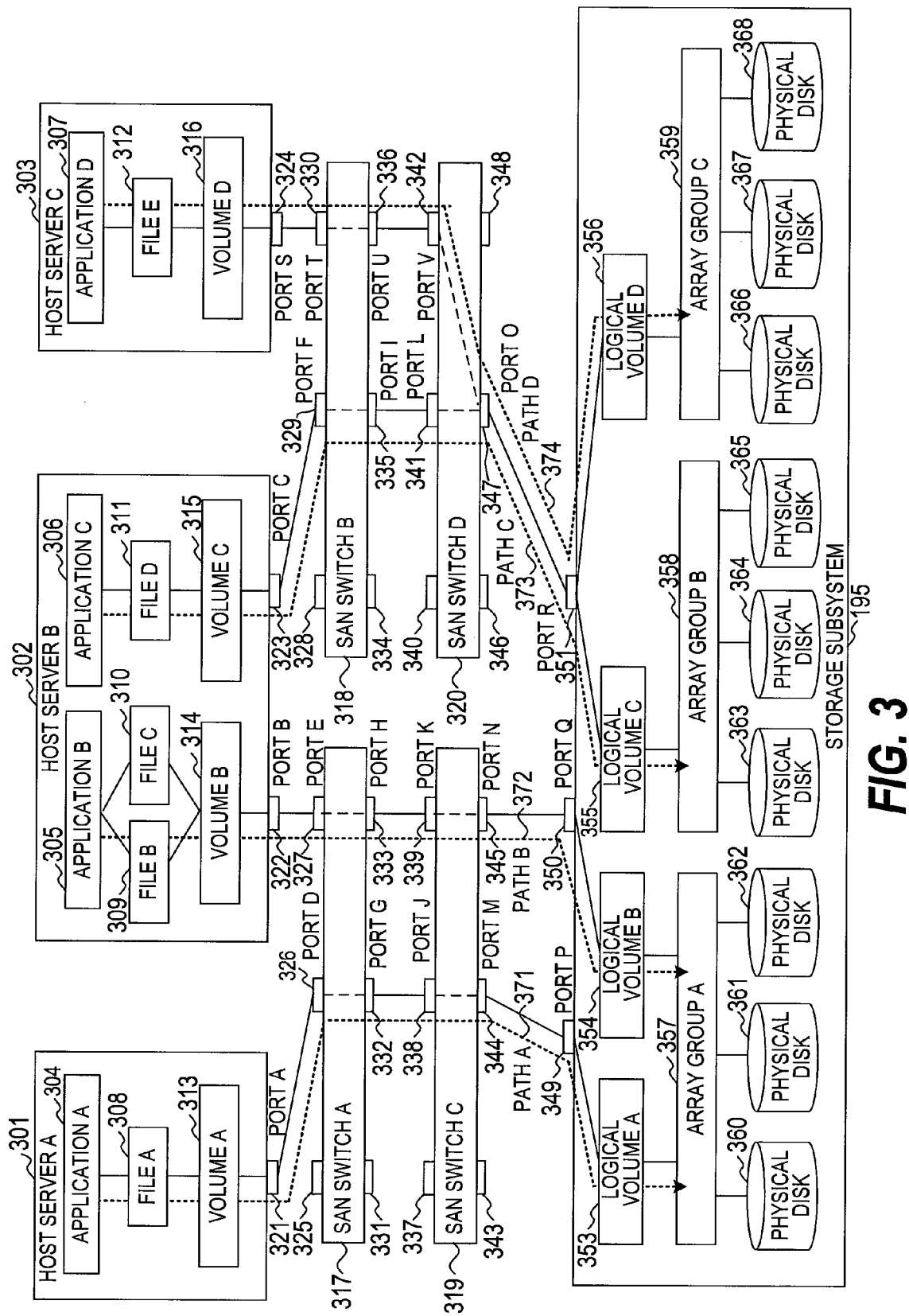
FIG. 3 is an explanatory diagram showing a performance dependent relation among resources according to the embodiment of this invention.

The storage subsystem 195 is a data storage apparatus that provides data storage areas to the host servers 120 to 122. Specifically, the storage subsystem 195 has physical disks 360 to 368, which store data as shown in FIG. 3, and a controller (not shown in the drawings), which controls data write and read in the physical storage areas. Data that the application software 126 and DB management software 127 of the host servers 120 to 122 write in the storage subsystem 195 through the OS 128 is ultimately stored in the physical disks 360 to 368.

The storage subsystem 195 is coupled to the host servers 120 to 122 via a storage area network (SAN). In the example of FIG. 1, the SAN is constituted of a plurality of the SAN switches 170 to 172.

Figure 2A:
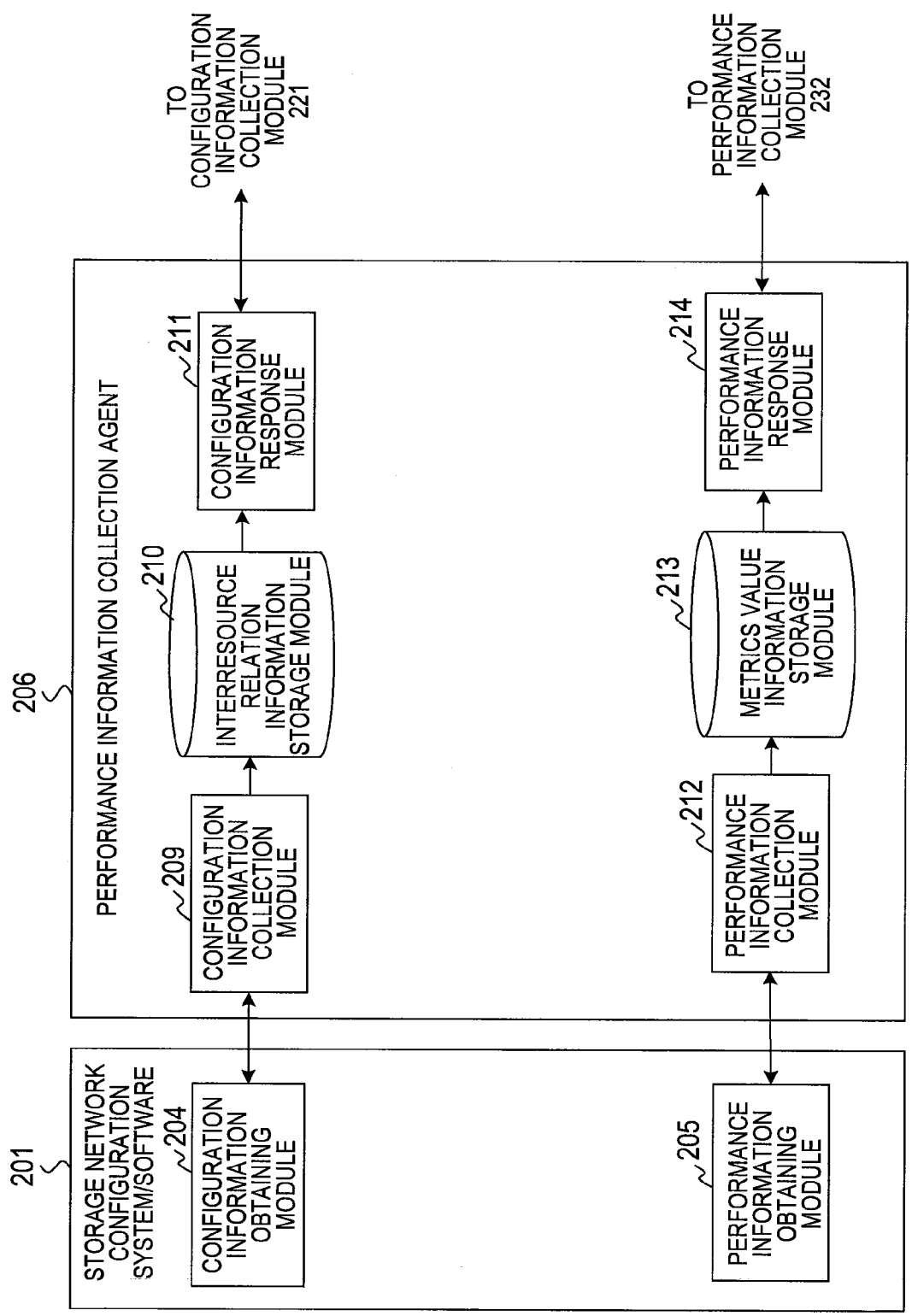
FIGS. 2A and 2B are function block diagrams of the computer system according to the embodiment of this invention.
Figure 2B:
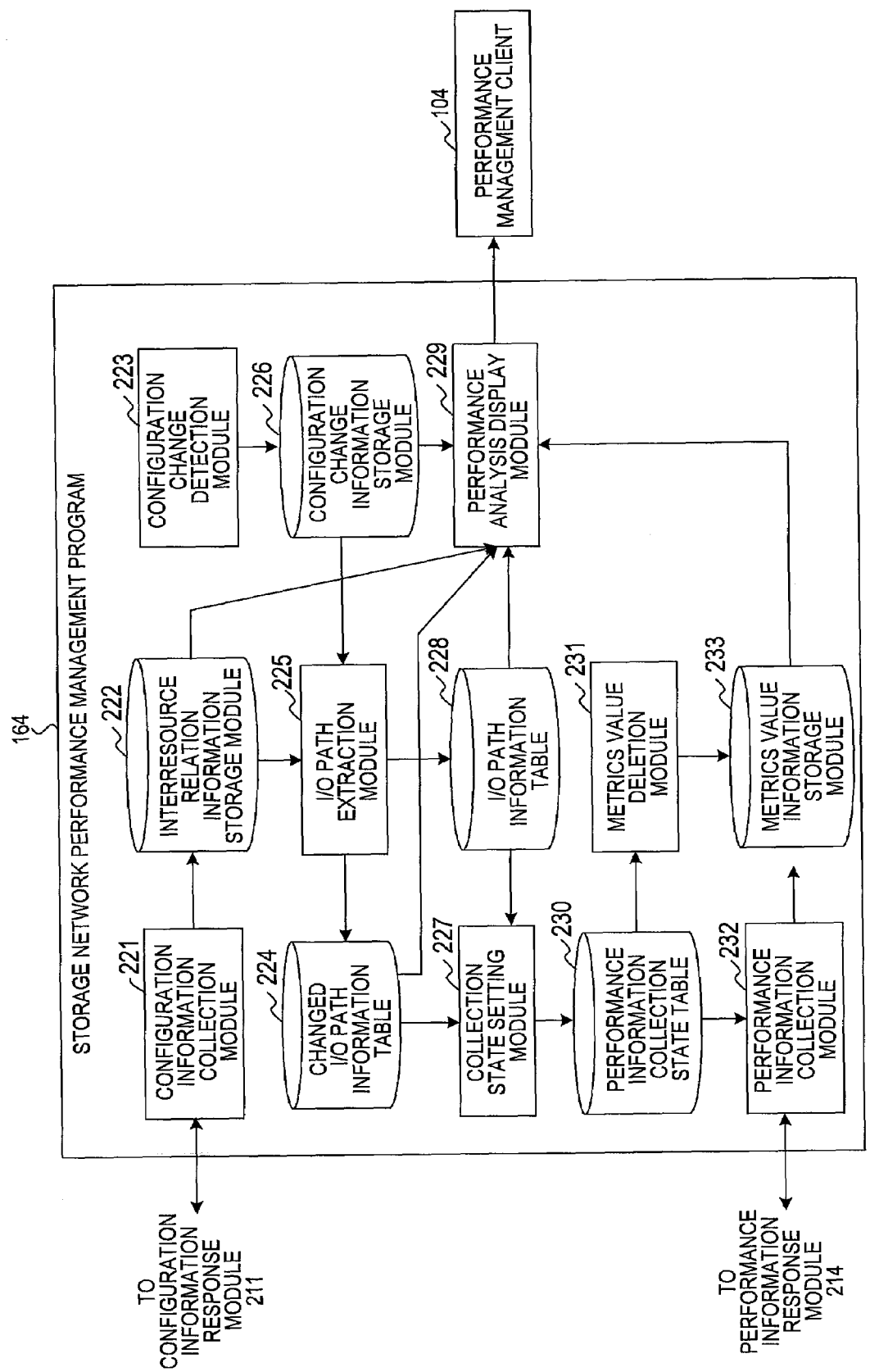

FIGS. 2A and 2B are function block diagrams of the computer system according to the embodiment of this invention.

In FIG. 2A, storage network configuration system/software 201 is hardware or software constituting the computer system of this embodiment. The storage network configuration system/software 201 includes one or more resources to be monitored by the storage network performance management program 164 (i.e., monitoring target of the storage network performance management program 164).

Specifically, the storage network configuration system/software 201 corresponds to any one of the host servers 120 to 122, the application software 126, the DB management software 127, the OS 128, the storage subsystem 195, the SAN switches 170 to 172, and the ports 173 to 185 of FIG. 1. FIG. 2A shows only one storage network configuration system/software 201. In reality, however, the storage network configuration system/software 201 is provided in a number same as that of pieces of the hardware and software to be the monitoring targets.

The storage network configuration system/software 201 includes a configuration information obtaining module 204 and a performance information obtaining module 205. These modules are program modules constituting part of software when the storage network configuration system/software 201 is software. Alternatively, when the storage network configuration system/software 201 is hardware, these modules are part of the hardware, or program modules executed in the hardware.

The performance information collection agent 206 is a software program for obtaining performance information from the storage network configuration system/software 201. Specifically, the performance information collection agent 206 corresponds to any one of the application software performance information collection agent 129, the DB performance information collection agent 130, the host performance information collection agent 131, the SAN switch performance information collection agent 144, and the subsystem performance information collection agent 154 of FIG. 1. FIG. 2A shows only one performance information collection agent 206. In reality, however, an arbitrary number of performance information collection agents 206 may be present.

The performance information collection agent 206 includes a configuration information collection module 209, an interresource relation information storage module 210, a configuration information response module 211, a performance information collection module 212, a metrics value information storage module 213, and a performance information response module 214.

The configuration information collection module 209, the configuration information response module 211, the performance information collection module 212, and the performance information response module 214 are program modules constituting part of the performance information collection agent 206. The interresource relation information storage module 210 and the metrics value information storage module 213 are storage areas such as a memory 124 or a disk device 125 managed by the performance information collection agent 206. These modules will be described below in detail.

The storage network performance management program 164 contains a configuration information collection module 221, an interresource relation information storage module 222, a configuration change detection module 223, a changed I/O path information table 224, an I/O path extraction module 225, a configuration change information storage module 226, a collection state setting module 227, an I/O path information table 228, a performance analysis display module 229, a performance information collection state table 230, a metrics value deletion module 231, a performance information collection module 232, and a metrics value information storage module 233.

The configuration information collection module 221, the configuration change detection module 223, the I/O path extraction module 225, the collection state setting module 227, the performance analysis display module 229, the metrics value deletion module 231, and the performance information collection module 232 are each a program module constituting a part of the storage network performance management program 164. The interresource relation information storage module 222, the changed I/O path information table 224, the configuration change information storage module 226, the I/O path information table 228, the performance information collection state table 230, and the metrics value information storage module 233 are storage areas of the memory 162 or the disk device 163 which are managed by the storage network performance management program 164.

Referring to FIGS. 2A and 2B, an outline of collection and monitoring of performance information of the computer system will be described.

A failure that occurs somewhere in the computer system can affect the performance. The failure may be a hardware or software failure, or a temporary operational failure such as a load interference caused by a plurality of processing operations. For example, when a load interference occurs in a hardware resource, a drop in performance is sometimes observed in the hardware resource and a resource that has a performance dependent relation with the hardware resource.

The storage network performance management program 164 detects a performance problem (e.g., performance deterioration), and obtains resource performance information of the computer system from the performance information collection agent 206 to provide information useful for specifying a failure or the like causing the problem to the user.

The performance information collection module 212 of the performance information collection agent 206 is started by a timer (not shown) according to a predetermined scheduling setting or by the storage network performance management program 164.

When started, the performance information collection module 212 requests transmission of a measured value (metrics value) from the performance information obtaining module 205 of the monitoring target of the storage network configuration system/software 201.

The performance information obtaining module 205 measures metrics values regarding the storage network configuration system/software 201. The metrics values are values referred to as pieces of performance information of the storage network configuration system/software 201, e.g., time to respond, a number of I/Os per second, and an I/O data amount per second. The performance information obtaining module 205 transmits the measured metrics values in response to a request from the performance information collection module 212.

The performance information collection module 212 stores the metrics values received from the performance information obtaining module 205 in the metrics value information storage module 213.

Upon reception of the request from the performance information collection module 232 of the storage network performance management program 164, the performance information response module 214 reads the requested metrics value from the metrics value information storage module 213 to transmit the value to the performance information collection module 232.

The performance information collection module 232 of this embodiment requests, as will be described later, the transmission of at least one of a per-minute metrics value and a per-hour metrics value.

The performance information collection module 212 may request the performance information obtaining module 205 to send a metrics value every minute, for example, and store the received metrics value in the metrics value information storage module 213. In this case, when requested by the performance information collection module 232 to send the per-minute metrics value, the performance information collection module 212 may send the metrics value read out of the metrics value information storage module 213 as the per-minute metrics value without any changes.

When requested by the performance information collection module 232 to send the per-hour metrics value, the performance information collection module 212 may identify which ones of metrics values stored in the metrics value information storage module 213 have been obtained over an hour-long period specified by the request to calculate the mean value of the identified metrics values and send the mean value as the per-hour metrics value. Alternatively, the performance information collection module 212 may send as the per-hour metrics value a chosen one of metrics values stored in the metrics value information storage module 213 (for example, a metrics value obtained hourly at 0 minute).

The configuration information collection module 209 is started by the timer according to the predetermined scheduling setting or by the storage network performance management program 164.

When started, the configuration information collection module 209 requests transmission of interresource relation information from the storage network configuration system/software 201 which is the monitoring target.

The interresource relation information is information indicating a performance dependent relation among resources. The performance dependent relation will be described below by referring to FIG. 3.

The configuration information obtaining module 204 transmits interresource relation information regarding the storage network configuration system/software 201 according to a request from the configuration information collection module 209.

The configuration information collection module 209 stores the interresource relation information received from the configuration information obtaining module 204 in the interresource relation information storage module 210.

Upon reception of a request from the configuration information collection module 221 of the storage network performance management program 164, the configuration information response module 211 reads the requested interresource relation information from the interresource relation information storage module 210 to transmit the information to the configuration information collection module 221.

For example, the configuration information collection module 221 of the storage network performance management program 164 periodically transmits a transmission request of interresource relation information to the configuration information response module 211 according to the predetermined scheduling setting. The configuration information collection module 221 stores the interresource relation information received from the configuration information response module 211 in the interresource relation information storage module 222.

For example, the performance information collection module 232 of the storage network performance management program 164 periodically requests transmission of a metrics value to the performance information response module 214 according to the predetermined scheduling setting. The performance information response module 214 that has received this request reads the requested metrics value from the metrics value information storage module 213 to transmit the value to the performance information collection module 232. The performance information collection module 232 stores the metrics value received from the performance information response module 214 in the metrics value information storage module 233.

Processing executed by the respective modules of the storage network performance management program 164 and information stored in the respective modules will be described later in detail.

FIG. 3 is an explanatory diagram showing a performance dependent relation among resources according to the embodiment of this invention.

The resources are physical or logical components of the computer system which become targets of metrics value acquisition. The metrics values are values of performance monitoring items (e.g., CPU utilization rate, number of I/Os, and the like) constituting resource performance information. The hardware and the software constituting the computer system each include various resources. The resources of the computer system affect one another in terms of performance. Specifically, for example, when performance of one resource drops due to a fault or the like, the other resources may be affected by this deteriorated performance to also drop in performance. Such a relation in which the resources affect one anther through performance fluctuation will be referred to as "performance dependent relation" in the description below. In other words, the resources which affect one anther through performance fluctuation have a performance dependent relation.

For instance, a change in configuration of the computer system may create a new load interference, causing a performance problem. The performance problem can propagate to a resource that has a performance dependent relation with a resource whose configuration has been changed. Therefore, in looking into the effect of a configuration change or the like, it is necessary to understand the extent of propagation of a performance problem by referring to the performance dependent relation between resources.

FIG. 3 shows an example of the performance dependent relation between resources contained in the computer system of the embodiment which is illustrated in FIG. 1. The count of resources (e.g., the count of ports) shown in FIG. 3 does not necessarily match the one in FIG. 1. This is because FIG. 1 and FIG. 3 each omit resources that are unnecessary for explanation.

In the example of FIG. 3, the hardware constituting the computer system of this embodiment includes host servers A 301, B 302, and C 303, SAN switches A 317, B 318, C 319, and D 320, and the storage subsystem 195.

The host server A 301 to the host server C 303 each correspond to one of the host servers 120 to 122. An application A 304 is run on the host server A 301. An application B 305 and an application C 306 are run on the host server B 302. An application D 307 is run on the host server C 303. These applications correspond to the application software 126 of FIG. 1. The application A 304 to the application D 307 are resources whose information is to be obtained by the application software performance information collection agent 129.

Files A 308 to E 312, volumes A 313 to D 316, and ports A 321 to S 324 are resources which become targets of information acquisition of the host performance information collection agent 131. The files A 308 to E 312 are units by which the OS 128 provides data I/O services.

In the example of FIG. 3, the file A 308 is allocated to the application A 304. The files B 309 and C 310 are allocated to the application B 305. The file D 311 is allocated to the application C 306. The file E 312 is allocated to the application D 307. The files A 308 to E 312 each store data read/written by the applications to which the files have been allocated.

The volumes A 313 to D 316 are managed as areas for storing the files A 308 to E 312 in an external storage system (e.g., storage subsystem 195) by the OS 128.

In the example of FIG. 3, the file A 308 is stored in the volume A 313. The files B 309 to C 310 are stored in the volume B 314. The file D 311 is stored in the volume C 315. The file E 312 is stored in the volume D 316.

Thus, the files A 308 to E 312 are allocated in the applications A 304 to D 307, and the files A 308 to E 312 are stored to the volumes A 313 to D 316. For example, in a case where the application A 304 uses the file A 308 and the file A 308 is stored in the volume A 313, when a load of accessing the file A 308 from the application A 304 increases, loads of the application A 304, the file A 308, and the volume A 313 increase. Accordingly, there is a performance dependent relation among these resources.

The SAN switches A 317 to D 320 correspond to the SAN switches 170 to 172 of FIG. 1. The SAN switches A 317 to D 320 become targets of information acquisition for the SAN switch performance information collection agent 144. Specifically, the SAN switch performance information collection agent 144 obtains performance information regarding ports 325 to 348 disposed in the SAN switches A 317 to D 320. In other words, the ports 325 to 348 are resources which are the targets of information acquisition. The ports 325 to 348 correspond to the ports 176 to 182 of FIG. 1. Alphabetical identifiers such as a port D 326 are added to those referred to in the description below among the ports 325 to 348.

The storage subsystem 195 contains resources whose information is to be obtained by the subsystem performance information collection agent 154. Specifically, the storage subsystem 195 contains, as the resources, a port P 349 to a port R 351, a logical volume A 353 to a logical volume D 356, an array group A 357 to an array group C 359, and the physical disks 360 to 368.

The physical disks 360 to 368 are physical HDDs. The physical disks 360 to 368 may also be physical storage devices other than HDD (e.g., optical disk devices or semiconductor memory devices).

The array group A 357 to the array group C 359 are each logically one disk device of high performance and reliability created from a plurality of the physical disks 360 to 368 by a function of the storage subsystem 195. Array groups are also called as parity groups. For example, the array group A 357 is created from the physical disks 360 to 362, the array group B 358 is created from the physical disks 363 to 365, and the array group C 359 is created from the physical disks 366 to 368.

The logical volumes A 353 to D 356 are logical disk devices generated by dividing the array groups A 357 to C 359 due to the function of the storage subsystem 195. The storage subsystem 195 can generate logical volumes A 353 to D 356 having sizes suited to uses of the host servers A 301 to C 303.

The volumes A 313 to D 316 of the host servers A 301 to C 303 are each allocated to any one of the logical volumes A 353 to D 356 of the storage subsystem 195. The logical volumes A 353 to D 356 are each allocated to any one of the array groups A 357 to C 359. In the example of FIG. 3, three of the physical disks 360 to 368 are allocated to each of the array groups A 357 to C 359. Accordingly, there is a performance dependent relation among the resources.

When a correlation is established between the logical volumes A 353 to D 356 and the volumes A 313 to D 316 allocated thereto, the ports 321 to 351, through which exchanged data passes, are determined.

Data I/O loads applied on the volumes A 313 to D 316 become loads of communication on the ports 321 to 351 of the data paths. Accordingly, there is a performance dependent relation among the volumes A 313 to D 316, the logical volumes A 353 to D 356 to which the volumes A 313 to D 316 are allocated, and the ports 321 to 351 on the data paths.

In the example of FIG. 3, the volume A 313 is allocated to the logical volume A 353. Data exchanged between the volume A 313 and the logical volume A 353 passes through the port A 321, the port D 326, the port G 332, the port J 338, the port M 344, and the port P 349. A drop in I/O count per-second in one of the ports on the path due to, for example, a load interference, lowers the I/O count per-second in all other ports on the path. These resources therefore have a performance dependent relation with one another.

Similarly, in the example of FIG. 3, the volume B 314 is allocated to the logical volume B 354. Data to be exchanged between the volume B 314 and the logical volume B 354 passes through the ports B 322, E 327, H 333, K 339, N 345, and Q 350.

The volume C 315 is allocated to the logical volume C 355. Data to be exchanged between the volume C 315 and the logical volume C 355 passes through the ports C 323, F 329, I 335, L 341, O 347, and R 351.

The volume D 316 is allocated to the logical volume D 356. Data exchanged between the volume D 316 and the logical volume D 356 passes through the ports S 324, T 330, U 336, V 342, O 347, and R 351.

In the following description, a path from the application A 304 to the array group A 357 via the file A 308, the volume A 313, the port A 321, the port D 326, the port G 332, the port J 338, the port M 344, the port P 349, and the logical volume A 353 will be denoted as a path A 371.

A path from the application B 305 to the array group A 357 via the file B 309, the volume B 314, the port B 322, the port E 327, the port H 333, the port K 339, the port N 345, the port Q 350, and the logical volume B 354 will be denoted as a path B 372.

A path from the application C 306 to the array group B 358 via the file D 311, the volume C 315, the port C 323, the port F 329, the port I 335, the port L 341, the port O 347, the port R 351, and the logical volume C 355 will be denoted as a path C 373.

A path from the application D 307 to the array group C 359 via the file E 312, the volume D 316, the port S 324, the port T 330, the port U 336, the port V 342, the port O 347, the port R 351, and the logical volume D 356 will be denoted as a path D 374.

Figure 4:
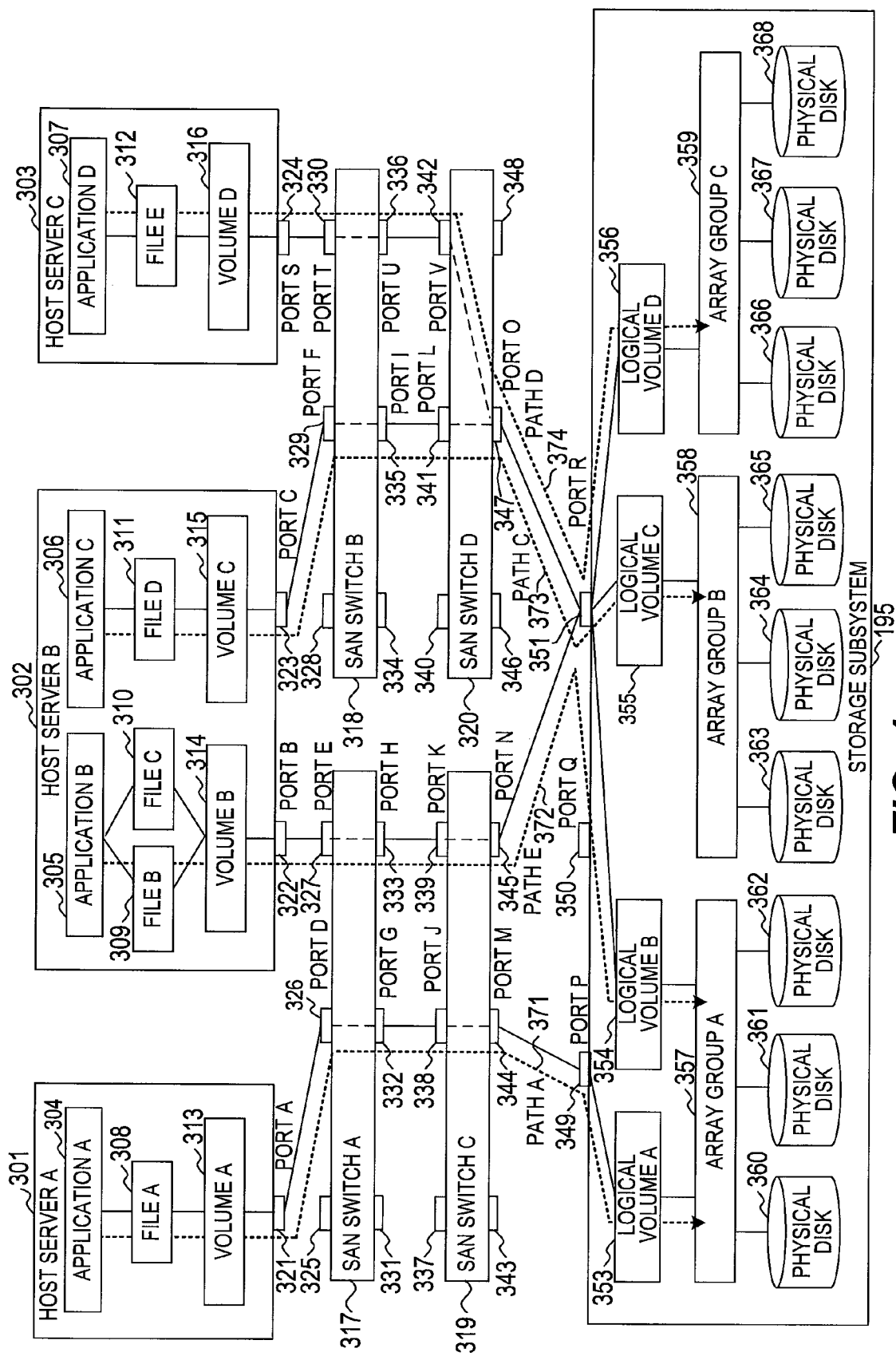
FIG. 4 is an explanatory diagram showing another example of the performance dependent relation among resources according to the embodiment of this invention.

FIG. 4 is an explanatory diagram showing another example of the performance dependent relation among resources according to the embodiment of this invention.

The example of FIG. 4 is the same as the example of FIG. 3 except that data exchanged between the volume B 314 and the logical volume B 354 passes through the port R 351 instead of the port Q 350.

In the following description, a path from the application B 305 to the array group A 357 via the file B 309, the volume B 314, the port B 322, the port E 327, the port H 333, the port K 339, the port N 345, the port R 351, and the logical volume B 354 will be denoted as a path E 375.

An outline of this embodiment will be given with reference to FIG. 3 and FIG. 4.

The extent of propagation of a performance problem due to a load interference in one resource differs between FIG. 3 and FIG. 4.

For instance, an example in which the host server C 303 is not in FIG. 3 at first will be described. The path D 374 has not been set at this point. When the host server C 303 is added later and the path D 374 is newly set, the application D 307 of the host server C 303 starts data I/O through the path D 374. Setting the path D 374 newly means that the application D 307, the file E 312, the volume D 316, the port S 324, the port T 330, the port U 336, the port V 342, the port O 347, the port R 351, the logical volume D 356, and the array group C 359 are added as resources that belong to the path D 374.

As shown in FIG. 3, the port O 347 and the port R 351 belong to the path C 373 and the path D 374 both. In other words, the path C 373 and the path D 374 share the port O 347 and the port R 351. The load of data I/O through the path D 374 can therefore interfere with the load of data I/O through the path C 373.

For example, in the case where data is input/output through the port O 347 and the port R 351 on the path C 373 and the path D 374 at the same time, and the total amount of the input/output data exceeds the processing abilities of the port O 347 and the port R 351, it causes a performance problem (lowering of the performance such as increased response time) along the path C 373 and the path D 374. A performance problem as this which results from a load interference (a collision of data I/O) is also called congestion.

Thus, when a load interference is caused between the path D 374 where the configuration has been changed and another path, the path C 373, a performance problem due to the load interference not only affects resources that belong to the path D 374 but also propagates to resources that belong to the path C 373.

The path A 371 and the path B 372 in the example of FIG. 3, on the other hand, share resources with neither the path C 373 nor the path D 374. A performance problem in the path C 373 or the path D 374 therefore does not propagate to the path A 371 and the path B 372.

In the example of FIG. 4, the path E 375 shares the port R 351 with the path D 374. A performance problem due to a load interference in the port R 351 can therefore propagate to resources that belong to the path E 375. The path E 375 also shares the array group A 357 with the path A 371. A performance problem in the path E 375 can therefore propagate to the path A 371 through the array group A 357. In short, in the example of FIG. 4, when a load interference is caused between the path D 374 where the configuration has been changed and another path (e.g., the path C 373), a performance problem due to the load interference may propagate to the path C 373, the path E 375, and the path A 371.

In the case where one resource is shared among a plurality of paths, a load interference does not always occur in the resource. This is because the load on each path is not constant. For example, a load interference does not occur in the port R 351 when the application B 305 and the application C 306 do not apply loads to the path E 375 and the path C 373, respectively, while the application D 307 is applying a load to the path D 374. Even when the application D 307, the application B 305, and the application C 306 concurrently apply loads to their respective paths, the interference among the loads does not cause a performance problem if the total of the loads does not exceed the processing ability of the port R 351.

Figure 20:
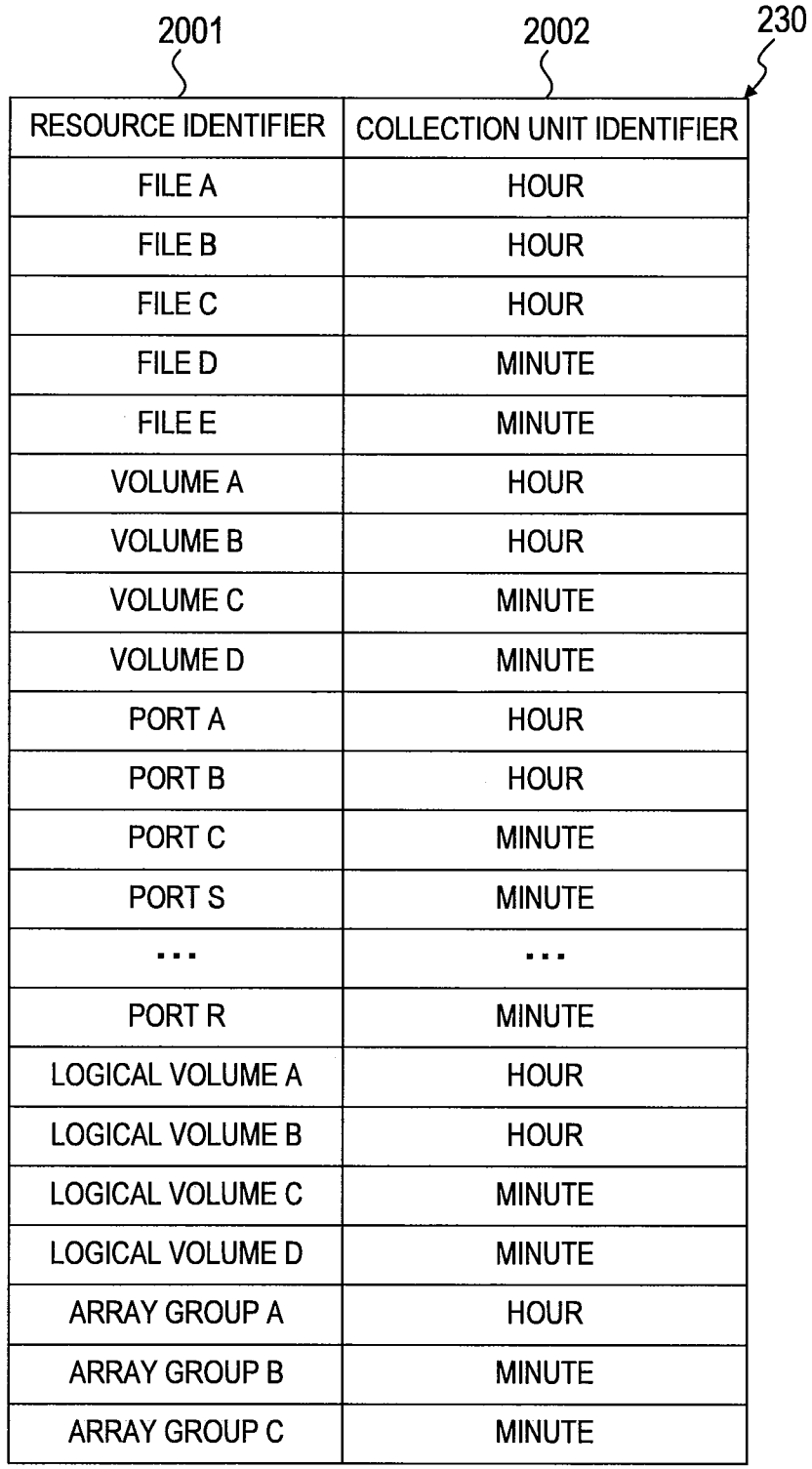
FIG. 20 is an explanatory diagram of the performance information collection state table which is used by the storage network performance management program according to the embodiment of this invention.

It is therefore necessary to compare among the paths timings when a load is applied in order to detect a performance problem due to a load interference. For an effective comparison, metrics values having a time resolution fit to the time scale of load fluctuations must be obtained from resources belonging to the respective paths and compared. In this embodiment, metrics values are obtained every minute (per-minute metrics values) from the resources belonging to the respective paths as shown in FIG. 15, FIG. 20, and other drawings.

Figure 16:
FIG. 16 is an explanatory diagram of a per-hour metrics value table which is used by the storage network performance management program according to the embodiment of this invention.

In the example of FIG. 3, the path A 371 and the path B 372 are not influenced by the addition of the path D 374. Accordingly, there is no need to compare between the path A 371 and the path B 372 timings when a load is applied in detecting a performance problem due to the addition of the path D 374. It can even be said that metrics values obtained from resources that belong to the path A 371 and the path B 372 are not useful for detection of a performance problem due to the addition of the path D 374. Therefore, it is not necessary to obtain metrics values having a time resolution fit to the time scale of load fluctuations from resources that belong to the path A 371 and the path B 372. In this embodiment, metrics values (per-hour metrics values) are obtained hourly from resources that belong to the path A 371 and path B 372 of FIG. 3 as shown in FIG. 16, FIG. 20, and other drawings.

Per-hour metrics values may be obtained from every resource on every path irrespective of whether the resource is affected by a performance problem due to a configuration change or not. In other words, per-hour metrics values in addition to per-minute metrics values may be obtained from resources that are within the possible extent of propagation of a performance problem due to a configuration change (see Step 2304 of FIG. 23 which will be described later).

While minutely metrics values and hourly metrics values are obtained in this embodiment as described above, these one-minute interval and one-hour interval are given as an example, and arbitrary time intervals can be set to obtain the two sets of metrics values. However, the time interval for the former set of metrics values has to be shorter than the time interval for the latter set of metrics values.

This embodiment can thus achieve reliable detection of a performance problem resulting from a configuration change by obtaining metrics values at relatively short time intervals from resources within the possible extent of propagation of the performance problem and by comparing the metrics values. From resources outside the possible extent of propagation of the performance problem resulting from a configuration change, metrics values are obtained at relatively long time intervals, to thereby avoid spending storage areas for keeping a huge number of metrics values. This also speeds up performance problem detection since the possible extent of propagation of a performance problem is narrowed down in advance.

Information held by the respective performance information collection agents of this embodiment will be described next with reference to FIG. 5 to FIG. 14.

FIG. 5 is an explanatory diagram of a metrics value table 500 regarding the host server A 301 according to the embodiment of this invention.

The metrics value table 500 of FIG. 5 holds metrics values obtained regarding the resources included in the host server A 301. These metrics values are obtained by the performance information collection module 212 belonging to at least one of the application software performance information collection agent 129, the DB performance information collection agent 130, and the host performance information collection agent 131, which are held by the host server A 301. In other words, the metrics value table 500 is stored in the metrics value information storage module 213 held by at least one of the application software performance information collection agent 129, the DB performance information collection agent 130, and the host performance information collection agent 131, which are held by the host server A 301.

The metrics value table 500 includes columns of a date/time 501, a resource identifier 502, a metrics identifier 503, and a metrics value 504.

A date and time of metrics value collection are registered in the date/time 501.

Identifiers of resources which are targets of metrics value collection are registered in the resource identifier 502. In the example of FIG. 5, identifiers for the targets of metrics value collection (e.g., file A, volume A, and port A) among the hardware or software included in the host server A 301 are registered.

Types of collected metrics values are registered in the metrics identifier 503. In the example of FIG. 5, the number of I/Os per second is registered. However, other types of metrics values (e.g., I/O data amount per second, CPU utilization rate or the like) may also be registered.

Collected metrics values are registered in the metrics value 504.

Each row of the metrics value table 500 corresponds to a metrics value collected for a certain resource at a certain date/time. For example, a top row of FIG. 5 indicates that a metrics value regarding the file A 308 obtained at 6:00 on Jul. 7, 2007, is 1214.5 (number of I/Os per second). In other words, the number of I/Os for the file A 308 is 1214.5 at a point of time 6:00 on Jul. 7, 2007.

FIGS. 6A to 6C show tables included in the interresource relation information storage module 210 for the host server A 301.

FIG. 6A is an explanatory diagram of an application-file relation table 600 for the host server A 301 according to the embodiment of this invention.

The application-file relation table 600 shown in FIG. 6A shows the correlation between the application among the applications A 304 to D 307, which is run on the host server A 301, and the file A 308 or another file that is allocated to the operating application. There is a performance dependent relation between the application A 304 and the like and the file A 308 and the like allocated thereto.

The application-file relation table 600 is generated based on information obtained by the configuration information collection module 209 belonging to at least one of the application software performance information collection agent 129, the DB performance information collection agent 130, and the host performance information collection agent 131, which are held by the host server A 301, and is stored in the interresource relation information storage module 210.

The application-file relation table 600 includes columns of an application identifier 601 and a file identifier 602.

Among applications A 304 to D 307, the identifier of the application operated in the host server A 301 is registered in the application identifier 601.

Identifiers of the file A 308 and the like allocated to each of the applications A 304 and the like are registered in the file identifier 602.

In the example of FIG. 6A, "file A" is registered as the file identifier 602 in association with the value "application A" of the application identifier 601. This indicates that the file A 308 is allocated to the application A 304 as shown in FIG. 3.

FIG. 6B is an explanatory diagram of a file-volume relation table 610 of the host server A 301 according to the embodiment of this invention.

The file-volume relation table 610 shown in FIG. 6B shows a correlation between the file among the files A 308 to E 312, which is managed by the host server A 301, and the volume A 313 and the like storing the file A 308 and the like. There is a performance dependent relation between the file A 308 and the like and the volume A 313 and the like storing the file A 308 and the like.

The file-volume relation table 610 is generated based on information obtained by the configuration information collection module 209 belonging to at least one of the application software performance information collection agent 129, the DB performance information collection agent 130, and the host performance information collection agent 131, which are held by the host server A 301, and is stored in the interresource relation information storage module 210.

The file-volume relation table 610 includes columns of a file identifier 611 and a volume identifier 612.

Among the files A 308 to E 312, the identifier of the file managed by the host server A 301 is registered in the file identifier 611.

Identifiers of the volume A 313 and the like storing the file A 308 and the like are registered in the volume identifier 612.

In the example of FIG. 6B, "volume A" is registered as the volume identifier 612 in association with the value "file A" of the file identifier 611. This indicates that the file A 308 is stored in the volume A 313 as shown in FIG. 3.

FIG. 6C is an explanatory diagram of a volume-logical volume-port relation table 620 of the host server A 301 according to the embodiment of this invention.

The volume-logical volume-port relation table 620 shown in FIG. 6C shows a correlation between the volume among the volumes A 313 to D 316, which is managed by the host server A 301, the logical volume A 353 and the like to which the volume A 313 and the like are allocated, and the port A 321 and the like of the host server A 301 and the port P 349 and the like of the storage subsystem 195 through which data exchanged between the volume and the logical volume passes. There is a performance dependent relation among these resources.

The volume-logical volume-port relation table 620 is generated based on information obtained by the configuration information collection module 209 belonging to at least one of the application software performance information collection agent 129, the DB performance information collection agent 130, and the host performance information collection agent 131, which are held by the host server A 301, and is stored in the interresource relation information storage module 210.

The volume-logical volume-port relation table 620 includes columns of a volume identifier 621, a logical volume identifier 622, a host side port identifier 623, and a storage side port identifier 624.

Among the volumes A 313 to D 316, the identifier of the volume managed by the host server A 301 is registered in the volume identifier 621.

Identifiers of the logical volume A 353 and the like to which the volume A 313 and the like are allocated are registered in the logical volume identifier 622.

Identifiers of the port A 321 and the like of the host server A 301 through which data exchanged between the volume A 313 and the like and the logical volume A 353 and the like allocated to those volumes passes are registered in the host side port identifier 623.

Identifiers of the port P 349 and the like of the storage subsystem 195 through which data exchanged between the volume A 313 and the like and the logical volume A 353 and the like allocated to those volumes passes are registered in the storage side port identifier 624.

For example, in FIG. 6C, a volume A, a logical volume A, a port A, and a port P are registered as the volume identifier 621, the logical volume identifier 622, the host side port identifier 623, and the storage side port identifier 624, respectively. This indicates that the volume A 313 is allocated to the logical volume A 353, and that the data exchanged between the volume A 313 and the logical volume A 353 passes through the port A 321 and the port P 349.

Figure 7:
FIG. 7 is an explanatory diagram of a metrics value table regarding a second host server according to the embodiment of this invention.

FIG. 7 is an explanatory diagram of a metrics value table 700 regarding the host server B 302 according to the embodiment of this invention.

The metrics value table 700 shown in FIG. 7 holds metrics values that are obtained from resources contained in the host server B 302. The metrics value table 700 is, similarly to the metrics value table 500 shown in FIG. 5, stored in the metrics value information storage module 213 kept by at least one of the application software performance information collection agent 129, DB performance information collection agent 130, and host performance information collection agent 131 of the host server B 302.

The metrics value table 700 includes columns of a date/time 701, a resource identifier 702, a metrics identifier 703, and a metrics value 704. Description thereof will be omitted as it is similar to that of the date/time 501, the resource identifier 502, the metrics identifier 503, and the metrics value 504 of the metrics value table 500.

FIG. 8A to FIG. 8C show tables contained in the interresource relation information storage module 210 for the host server B 302.

FIG. 8A is an explanatory diagram of an application-file relation table 800 regarding the host server B 302 according to the embodiment of this invention.

The application-file relation table 800 shown in FIG. 8A shows the correlation between the application among the applications A 304 to D 307, which is operating on the host server B 302, and the file A 308 or another file allocated to the operating application.

The application-file relation table 800 is generated based on information that is obtained by the configuration information collection module 209 belonging to at least one of the application software performance information collection agent 129, DB performance information collection agent 130, and host performance information collection agent 131 of the host server B 302, and is stored in the interresource relation information storage module 210.

The application-file relation table 800 includes columns of an application identifier 801 and a file identifier 802. Description thereof will be omitted as it is similar to that of the application identifier 601 and the file identifier 602 of the application-file relation table 600.

In the example of FIG. 8A, "file B" and "file C" are registered as the file identifier 802 in association with a value "application B" of the application identifier 801. A value "file D" is registered in association with "application C". This means that the file B 309 and the file C 310 are allocated to the application B 305 while the file D 311 is allocated to the application C 306 as shown in FIG. 3.

FIG. 8B is an explanatory diagram of a file-volume relation table 810 regarding the host server B 302 according to the embodiment of this invention.

The file-volume relation table 810 shown in FIG. 8B shows the correlation between the file among the files A 308 to E 312, which is managed by the host server B 302, and the volume A 313 or another volume that stores the managed file.

The file-volume relation table 810 is generated based on information that is obtained by the configuration information collection module 209 belonging to at least one of the application software performance information collection agent 129, DB performance information collection agent 130, and host performance information collection agent 131 of the host server B 302, and is stored in the interresource relation information storage module 210.

The file-volume relation table 810 includes columns of a file identifier 811 and a volume identifier 812. Description thereof will be omitted as it is similar to that of the file identifier 611 and the volume identifier 612 of the file-volume relation table 610.

In the example of FIG. 8B, "volume B", "volume B", and "volume C" are registered as the volume identifier 812 in association with values "file B", "file C", and "file D" of the file identifier 811, respectively. This means that the file B 309 and the file C 310 are stored in the volume B 314 while the file D 311 is stored in the volume C 315 as shown in FIG. 3.

FIG. 8C is an explanatory diagram of a volume-logical volume-port relation table 820 regarding the host server B 302 according to the embodiment of this invention.

The volume-logical volume-port relation table 820 shown in FIG. 8C shows the correlation between the volume among the volumes A 313 to D 316, which is managed by the host server B 302, the logical volume A 353 or the like to which the managed volume is allocated, and the port B 322 or the like of the host server B 302 and the port P 349 or the like of the storage subsystem 195 through which data is exchanged between the managed volume and its allocated logical volume.

The volume-logical volume-port relation table 820 is generated based on information obtained by the configuration information collection module 209 belonging to at least one of the application software performance information collection agent 129, the DB performance information collection agent 130, and the host performance information collection agent 131, which are held by the host server B 302, and is stored in the interresource relation information storage module 210.

The volume-logical volume-port relation table 820 includes columns of a volume identifier 821, a logical volume identifier 822, a host side port identifier 823, and a storage side port identifier 824. Description thereof will be omitted as it is similar to that of the volume identifier 621, the logical volume identifier 622, the host side port identifier 623, and the storage side port identifier 624 of the volume-logical volume-port relation table 620.

For example, in the top row of FIG. 8C, a volume B, a logical volume B, a port B, and a port Q are registered as the volume identifier 821, the logical volume identifier 822, the host side port identifier 823, and the storage side port identifier 824, respectively. This indicates that the volume B 314 is allocated to the logical volume B 354, and that the data exchanged between the volume B 314 and the logical volume B 354 passes through the port B 322 and the port Q 350.

FIG. 9 is an explanatory diagram of a metrics value table 900 regarding the host server C 303 according to the embodiment of this invention.

The metrics value table 900 of FIG. 9 holds metrics values obtained regarding the resources included in the host server C 303. As in the metrics value table 500 shown in FIG. 5, the metrics value table 900 is stored in the metrics value information storage module 213 held by at least one of the application software performance information collection agent 129, the DB performance information collection agent 130, and the host performance information collection agent 131 held by the host server C 303.

The metrics value table 900 includes columns of a date/time 901, a resource identifier 902, a metrics identifier 903, and a metrics value 904. Description thereof will be omitted as it is similar to that of the date/time 501, the resource identifier 502, the metrics identifier 503, and the metrics value 504 of the metrics value table 500.

FIGS. 10A to 10C show tables included in the interresource relation information storage module 210 of the host server C 303.

FIG. 10A is an explanatory diagram of an application-file relation table 1000 of the host server C 303 according to the embodiment of this invention.

The application-file relation table 1000 shown in FIG. 10A shows a correlation between the application among the applications A 304 to D 307, which is operated in the host server C 303, and the file A 308 and the like allocated to the application A 304 and the like.

The application-file relation table 1000 is generated based on information obtained by the configuration information collection module 209 belonging to at least one of the application software performance information collection agent 129, the DB performance information collection agent 130, and the host performance information collection agent 131 held by the host server C 303 to be stored in the interresource relation information storage module 210.

The application-file relation table 1000 includes columns of an application identifier 1001 and a file identifier 1002. Description of these columns will be omitted as it is similar to that of the application identifier 601 and the file identifier 602 of the application-file relation table 600.

In the example of FIG. 10A, "file E" is registered as the file identifier 1002 in association with a value "application D" of the application identifier 1001. This means that the file E 312 is allocated to the application D 307 as shown in FIG. 3.

FIG. 10B is an explanatory diagram of a file-volume relation table 1010 of the host server C 303 according to the embodiment of this invention.

The file-volume relation table 1010 shown in FIG. 10B shows a correlation between the file among the files A 308 to E 312, which is managed by the host server C 303, and the volume A 313 and the like storing the files A 308 and the like.

The file-volume relation table 1010 is generated based on information obtained by the configuration information collection module 209 belonging to at least one of the application software performance information collection agent 129, the DB performance information collection agent 130, and the host performance information collection agent 131 held by the host server C 303 to be stored in the interresource relation information storage module 210.

The file-volume relation table 1010 includes columns of a file identifier 1011 and a volume identifier 1012. Description of these columns will be omitted as it is similar to that of the file identifier 611 and the volume identifier 612 of the file-volume relation table 610.

In the example of FIG. 10B, "volume D" is registered as the volume identifier 1012 in association with a value "file E" of the file identifier 1011. This means that the file E 312 is stored in the volume D 316 as shown in FIG. 3.

FIG. 10C is an explanatory diagram of a volume-logical volume-port relation table 1020 of the host server C 303 according to the embodiment of this invention.

The volume-logical volume-port relation table 1020 shown in FIG. 10C shows a correlation between the volume among the volumes A 313 to D 316, which is managed by the host server C 303, the logical volume A 353 and the like to which the volume A 313 and the like are allocated, and the port S 324 and the like of the host server C 303 through which data exchanged between the volume and the logical volume passes.

The volume-logical volume-port relation table 1020 is generated based on information obtained by the configuration information collection module 209 belonging to at least one of the application software performance information collection agent 129, the DB performance information collection agent 130, and the host performance information collection agent 131 held by the host server C 303 to be stored in the interresource relation information storage module 210.

The volume-logical volume-port relation table 1020 includes columns of a volume identifier 1021, a logical volume identifier 1022, a host side port identifier 1023, and a storage side port identifier 1024. Description of these columns will be omitted as it is similar to that of the volume identifier 621, the logical volume identifier 622, the host side port identifier 623, and the storage side port identifier 624 of the volume-logical volume-port relation table 620.

For example, in the top row of FIG. 10C, a volume D, a logical volume D, a port S, and a port R are registered as the volume identifier 1021, the logical volume identifier 1022, the host side port identifier 1023, and the storage side port identifier 1024, respectively. This indicates that the volume D 316 is allocated to the logical volume D 356, and that the data exchanged between the volume D 316 and the logical volume D 356 passes through the port S 324 and the port R 351.

FIG. 11 is an explanatory diagram of a metrics value table 1100 regarding the SAN switches A 317 to D 320 according to the embodiment of this invention.

The metrics value table 1100 of FIG. 11 holds metrics values obtained regarding the resources included in the SAN switches A 317 to D 320. These metrics values are obtained by the performance information collection module 212 belonging to the SAN switch performance information collection agent 144. In other words, the metrics value table 1100 is stored in the metrics value information storage module 213 held by the SAN switch performance information collection agent 144.

The metrics value table 1100 includes columns of a date/time 1101, a resource identifier 1102, a metrics identifier 1103, and a metrics value 1104. Description of these columns will be omitted as it is similar to that of the columns of the date/time 501, the resource identifier 502, the metrics identifier 503, and the metrics value 504 of the metrics value table 500.

In the example of FIG. 11, a top row indicates that a metrics value obtained from the port D 326 at 6:00 on Jul. 7, 2007 is 1213.6 (number of I/Os per second).

FIG. 12 is an explanatory diagram of an interport communication path table 1200 of the SAN switches A 317 to D 320 according to the embodiment of this invention.

The interport communication path table 1200 shown in FIG. 12 holds information indicating ports D 326 to O 347 of the SAN switches A 317 to D 320 which become paths through which data exchanged between the ports A 321 to S 324 of the host servers A 301 to C 303 and the ports P 349 to R 351 of the storage subsystem 195 passes. When one data path passes through a plurality of ports, there is a performance dependent relation among the ports.

The interport communication path table 1200 is generated based on information obtained by the configuration information collection module 209 belonging to the SAN switch performance information collection agent 144 to be stored in the interresource relation information storage module 210.

The interport communication path table 1200 includes columns of a host side port identifier 1201, a storage side port identifier 1202, and a switch port identifier list 1203.

In the host side port identifier 1201, identifiers of the ports A 321 to S 324 of the host servers A 301 to C 303 through which data exchanged between the host servers A 301 to C 303 and the storage subsystem 195 passes are registered.

In the storage side port identifier 1202, identifiers of the ports P 349 to R 351 of the storage subsystem 195 through which data exchanged between the host servers A 301 to C 303 and the storage subsystem 195 passes are registered.

In the switch port identifier list 1203, identifiers of the ports D 326 to O 347 of the SAN switches A 317 to D 320 through which data exchanged between the ports A 321 to S 324 of the host servers A 301 to C 303 and the ports P 349 to R 351 of the storage subsystem 195 passes are registered.

In the example of FIG. 12, a top row indicates that a data path from the port A 321 of the host server A 301 to the port P 349 of the storage subsystem 195 passes through the ports D 326, G 332, J 338, and M 344 as shown in FIG. 3.

FIG. 13 is an explanatory diagram of a metrics value table 1300 regarding the storage subsystem 195 according to the embodiment of this invention.

A metrics value table 1300 of FIG. 13 holds metrics values obtained regarding the resources included in the storage subsystem 195. These metrics values are obtained by the performance information collection module 212 belonging to the subsystem performance information collection agent 154. In other words, the metrics value table 1300 is stored in the metrics value information storage module 213 held by the subsystem performance information collection agent 154.

The metrics value table 1300 includes columns of a date/time 1301, a resource identifier 1302, a metrics identifier 1303, and a metrics value 1304. Description of these columns will be omitted as it is similar to that of the columns of the date/time 501, the resource identifier 502, the metrics identifier 503, and the metrics value 504 of the metrics value table 500.

Figure 14:
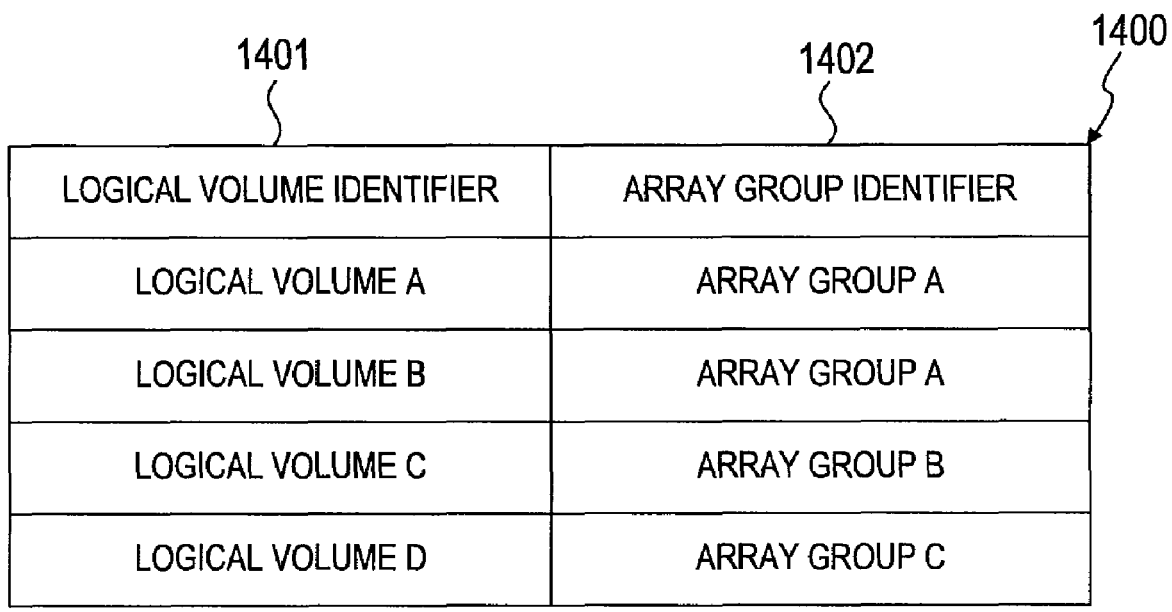
FIG. 14 is an explanatory diagram of a logical volume-array group relation table of the storage subsystem according to the embodiment of this invention.

FIG. 14 is an explanatory diagram of a logical volume-array group relation table 1400 of the storage subsystem 195 according to the embodiment of this invention.

The logical volume-array group relation table 1400 of FIG. 14 holds information indicating a correlation between logical volumes A 353 to D 356 and array groups A 357 to C 359 to which the logical volumes A 353 to D 356 are allocated. There is a performance dependent relation among these resources.

The logical volume-array group relation table 1400 is generated based on information obtained by the configuration information collection module 209 belonging to the subsystem performance information collection agent 154 to be stored in the interresource relation information storage module 210.

The logical volume-array group relation table 1400 includes columns of a logical volume identifier 1401 and an array group identifier 1402.

In the logical volume identifier 1401, identifiers of the logical volumes A 353 to D 356 managed by the storage subsystem 195 are registered.

In the array group identifier 1402, identifiers of the array groups A 357 to C 359 to which the logical volumes A 353 to D 356 are allocated are registered.

The example of FIG. 14 shows that the logical volume A 353 and the logical volume B 354 are allocated to the array group A 357 while the logical volume C 355 and the logical volume D 356 are allocated to the array group B 358 and the array group C 359, respectively, as shown in FIG. 3.

Information held by the storage network performance management program 164 of this embodiment will be described next with reference to FIG. 15 to FIG. 22.

FIG. 15 is an explanatory diagram of a per-minute metrics value table 1500 which is used by the storage network performance management program 164 according to the embodiment of this invention.

The per-minute metrics value table 1500 shown in FIG. 15 is stored in the metrics value information storage module 233 which is kept by the storage network performance management program 164 shown in FIG. 2B.

Figure 23:
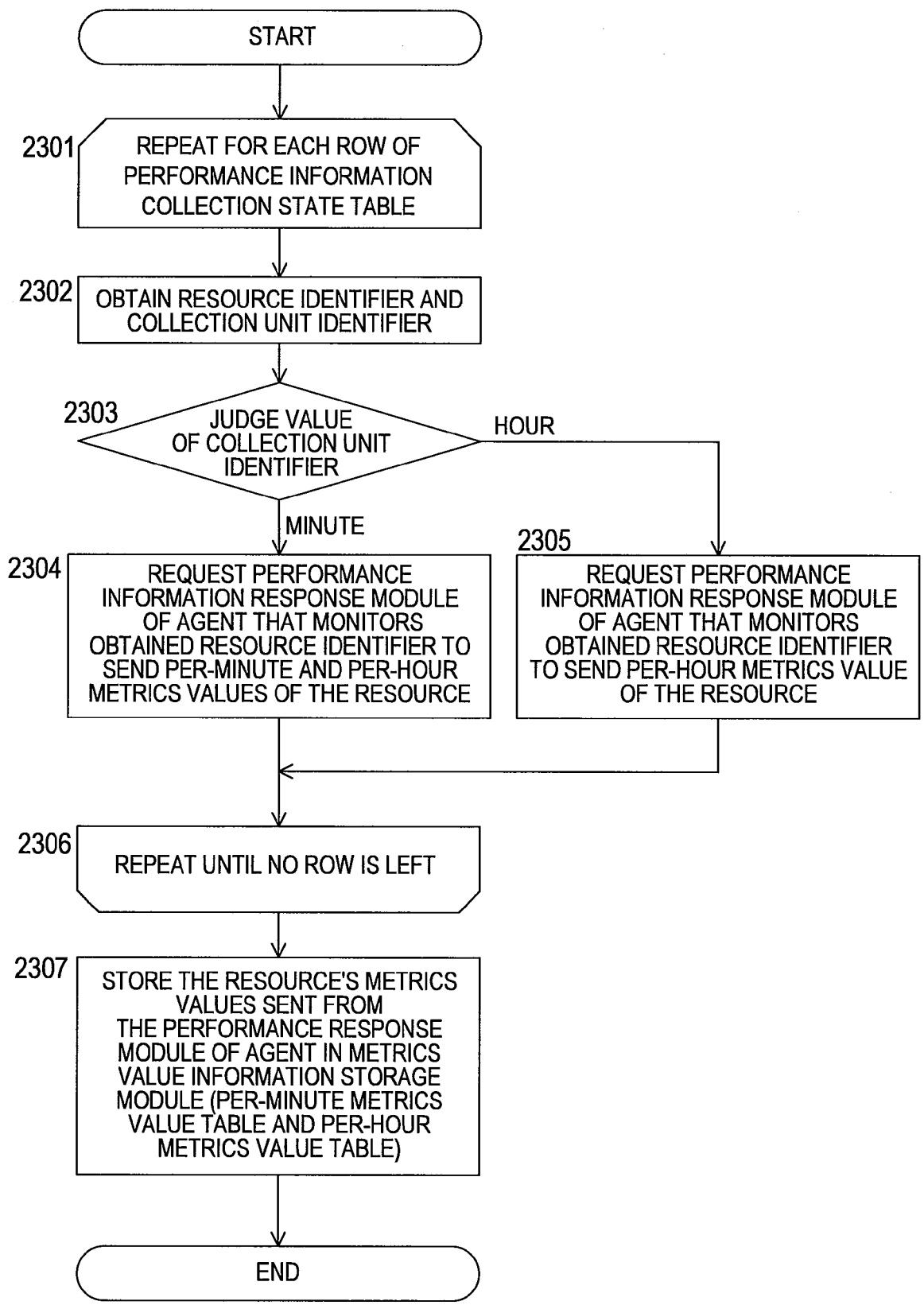
FIG. 23 is a flow chart showing processing that is executed by the storage network performance management program according to the embodiment of this invention to collect performance information.

The performance information collection module 232 periodically executes polling on the performance information collection agents to obtain information stored in the metrics value information storage module 213 of each performance information collection agent, and stores the obtained information in the metrics value information storage module 233. In obtaining the information, the performance information collection module 232 refers to the performance information collection state table 230 to request the performance information collection agents to send per-minute metrics values or per-hour metrics values as shown in FIG. 23, which will be described later. When it is per-minute metrics values that are requested to be sent, the performance information collection module 232 stores per-minute metrics values sent in response to the request in the per-minute metrics value table 1500.

The per-minute metrics value table 1500 includes columns of a date/time 1501, a resource identifier 1502, a metrics identifier 1503, and a metrics value 1504. Description of these columns will be omitted as it is similar to that of the columns of the date/time 501, the resource identifier 502, the metrics identifier 503, and the metrics value 504 of the metrics value table 500.

As shown in FIG. 15, the per-minute metrics value table 1500 holds minutely metrics values obtained from the respective resources by the respective performance information collection agents.

FIG. 16 is an explanatory diagram of a per-hour metrics value table 1600 which is used by the storage network performance management program 164 according to the embodiment of this invention.

The per-hour metrics value table 1600 shown in FIG. 16 is stored in the metrics value information storage module 233 which is kept by the storage network performance management program 164 shown in FIG. 2B.

When it is per-hour metrics values that are requested to be sent, the performance information collection module 232 stores per-hour metrics values sent in response to the request in the per-hour metrics value table 1600.

The per-hour metrics value table 1600 includes columns of a date/time 1601, a resource identifier 1602, a metrics identifier 1603, and a metrics value 1604. Description of these columns will be omitted as it is similar to that of the columns of the date/time 501, the resource identifier 502, the metrics identifier 503, and the metrics value 504 of the metrics value table 500.

As shown in FIG. 16, the per-hour metrics value table 1600 holds hourly metrics values of the respective resources.

FIG. 17A is an explanatory diagram of a file-volume relation table 1700 used by the storage network performance management program 164 according to the embodiment of this invention.

The file-volume relation table 1700 shown in FIG. 17A is stored in the interresource relation information storage module 222 held by the storage network performance management program 164 shown in FIG. 2B. The configuration information collection module 221 obtains pieces of information held by the file-volume relation tables 610, 810, and 1010 included in the interresource relation information storage module 210 by executing polling for each performance information collection agent to store the information in the file-volume relation table 1700. Accordingly, the file-volume relation table 1700 holds all of the pieces of information held by the file-volume relation tables 610, 810, and 1010.

The file-volume relation table 1700 includes columns of a file identifier 1701 and a volume identifier 1702. Description of these columns is similar to that of the file identifier 611 and the volume identifier 612 of the file-volume relation table 610, and thus it will be omitted.

FIG. 17B is an explanatory diagram of a logical volume-array group relation table 1710 used by the storage network performance management program 164 according to the embodiment of this invention.

The logical volume-array group relation table 1710 shown in FIG. 17B is stored in the interresource relation information storage module 222 held by the storage network performance management program 164 shown in FIG. 2B. The configuration information collection module 221 obtains pieces of information held by the logical volume-array group relation table 1400 included in the interresource relation information storage module 210 by executing polling for the subsystem performance information collection agent 154 to store the information in the logical volume-array group relation table 1710. Accordingly, the logical volume-array group relation table 1710 holds the same information as that held by the logical volume-array group relation table 1400.

The logical volume-array group relation table 1710 includes columns of a logical volume identifier 1711 and an array group identifier 1712. Description of these columns is similar to that of the logical volume identifier 1401 and the array group identifier 1402 of the logical volume-array group relation table 1400, and thus it will be omitted.

FIG. 18 is an explanatory diagram of a volume-logical volume-port correspondence table 1800 used by the storage network performance management program 164 according to the embodiment of this invention.

The volume-logical volume-port correspondence table 1800 shown in FIG. 18 is stored in the interresource relation information storage module 222 held by the storage network performance management program 164 shown in FIG. 2B.

The configuration information collection module 221 obtains pieces of information held by the volume-logical volume-port relation tables 620, 820 and 1020 and the interport communication path table 1200 included in the interresource relation information storage module 210 by executing polling for each performance information collection agent to store the pieces of information in the volume-logical volume-port correspondence table 1800. Accordingly, the volume-logical volume-port correspondence table 1800 holds the pieces of information held by the volume-logical volume-port relation tables 620, 820, and 1020 and the interport communication path table 1200.

The volume-logical volume-port correspondence table 1800 includes columns of a volume identifier 1801, a logical volume identifier 1802, a host side port identifier 1803, a storage side port identifier 1804, and a switch port identifier list 1805.

The volume identifier 1801 corresponds to the volume identifiers 621, 821 and 1021 (see FIGS. 6, 8, and 10). Accordingly, description of the volume identifier 2221 will be omitted.

The logical volume identifier 1802 corresponds to the logical volume identifiers 622, 822, and 1022 (see FIGS. 6, 8, and 10). Accordingly, description of the logical volume identifier 1802 will be omitted.

The host side port identifier 1803 corresponds to the host side port identifiers 623, 823, and 1023 (see FIGS. 6, 8, and 10). Further, the host side port identifier 1803 corresponds to the host side port identifier 1201 (see FIG. 12). Accordingly, description of the host side port identifier 1803 will be omitted.

The storage side port identifier 1804 corresponds to the storage side port identifiers 624, 824, and 1024 (see FIGS. 6, 8, and 10). Further, the storage side port identifier 1804 corresponds to the storage side port identifier 1202 (see FIG. 12). Accordingly, description of the storage side port identifier 1804 will be omitted.

The switch port identifier list 1805 corresponds to the switch port identifier list 1203 (see, FIG. 12). Accordingly, the switch port identifier list 1805 will be omitted.

In the example of FIG. 18, a top row indicates that the volume A 313 is allocated to the logical volume A 353, and that a data path from the volume A 313 to the logical volume A 353 passes through the ports A 321, D 326, G 332, J 338, M 344, and P 349.

FIG. 19A is an explanatory diagram of a configuration change date/time table 1900 which is used by the storage network performance management program 164 according to the embodiment of this invention.

The configuration change date/time table 1900 is a table that holds the date and time at which a change in configuration of the computer system is detected, and is stored in the configuration change information storage module 226. A configuration change of the computer system is an addition or removal of a resource that constitutes the computer system. The configuration change date/time table 1900 is created and updated by the configuration change detection module 223, and is referred to by the I/O path extraction module 225 and the performance analysis display module 229.

Specifically, a configuration change means that a new resource is added to a data path leading from software that is run on the host server A 301 or other host servers (for example, the application A 304) to a physical storage device that stores data read and written by this software (for example, the array group A 357), or that a resource is removed from such a path. The addition of a new resource includes setting a new path which is composed of a plurality of resources (in other words, adding all resources that constitute a newly set path to the path).

For instance, an example in which the computer system shown in FIG. 3 does not have the host server C 303 at first will be described. The path D 374 which leads from the application D 307 to the array group C 359 has not been set at this point. When the host server C 303 is added later and the path D 374 is set as shown in FIG. 3, the fact that the path D 374 has newly been set (i.e., the addition of resources from the application D 307 to the array group C 359 to the newly set path D 374) is detected as a configuration change.

When the host server C 303 is taken out and the path D 374 is removed, on the other hand, the removal of all the resources on the removed path D 374 is detected as a configuration change.

To give another example, when the path B 372 which leads from the application B 305 to the array group A 357 via the port Q 350 is changed to the path E 375 which runs through the port R 351 instead of the port Q 350 as shown in FIG. 3 and FIG. 4, the removal of the port Q 350 and the addition of the port R 351 are detected as a configuration change.

The configuration change date/time table 1900 includes columns for a configuration change detection date/time 1901, a configuration change identifier 1902, and configuration change specifics 1903.

The date and time at which a configuration change is detected is registered as the configuration change detection date/time 1901.

Information by which a detected configuration change is identified is registered as the configuration change identifier 1902. A configuration change identified by one configuration change identifier 1902 may contain an addition or removal of one resource alone or may contain an addition or removal of a plurality of resources detected. Specifically, an addition or removal of a plurality of resources detected at the same instant of time may be identified as one configuration change by one configuration change identifier.

For example, in the case where a plurality of resources are added by the addition of the host server C 303 as above, the addition of those resources may be identified by one configuration change identifier (e.g., "configuration change A"). The configuration change identifier may be determined automatically by the configuration change detection module 223.

Registered as the configuration change specifics 1903 is information that indicates specifics of a configuration change. This information may be determined at the administrator's discretion, or may be determined automatically by the configuration change detection module 223. For example, in the case where a configuration change identified by "configuration change A" is the addition of resources on the path leading from the application D 307 to the array group C 359, the configuration change specifics 1903 may hold "addition of application D" as information that represents this configuration change.

FIG. 19B is an explanatory diagram of a configuration change information table 1910 which is used by the storage network performance management program 164 according to the embodiment of this invention.

The configuration change information table 1910 is a table that holds information for managing resources that are added or removed through a configuration change, and is stored in the configuration change information storage module 226. The configuration change information table 1910 is created and updated by the configuration change detection module 223, and is referred to by the I/O path extraction module 225 and the performance analysis display module 229.

The configuration change information table 1910 includes columns of a configuration change identifier 1911, a resource identifier 1912, a change specifics identifier 1913, and a collection period 1914.

Information by which a detected configuration change is identified is registered as the configuration change identifier 1911.

The identifier of a resource added or removed through a configuration change is registered as the resource identifier 1912.

Information that indicates whether the identified resource has been added or removed is registered as the change specifics identifier 1913.

Information that indicates a period during which per-minute metrics values are collected from the identified resource is registered as the collection period 1914. This period may be set at the administrator's discretion.

For example, in the case where a configuration change identified by "configuration change A" is the addition of resources on the path leading from the application D 307 to the array group C 359 as a result of the addition of the host server C 303, the identifiers of resources on the path leading from the application D 307 to the array group C 359 are registered as the resource identifier 1912 in association with a value "configuration change A" of the configuration change identifier 1911. In association with these resources, "addition" is registered as the change specifics identifier 1913. A value "two weeks" is registered as the collection period 1914 in association with these resources in the example of FIG. 19B. This means that per-minute metrics values are collected for two weeks from these resources.

FIG. 20 is an explanatory diagram of the performance information collection state table 230 which is used by the storage network performance management program 164 according to the embodiment of this invention.

The performance information collection state table 230 holds information that indicates what kind of metrics value (per-minute metrics value or per-hour metrics value) is to be collected from the respective resources by the performance information collection module 232.

The performance information collection state table 230 includes columns of a resource identifier 2001 and a collection unit identifier 2002.

The identifier of each resource is registered as the resource identifier 2001.

Information that indicates the type of metrics value to be collected by the performance information collection module 232 from the identified resource is registered as the collection unit identifier 2002. "MINUTE" indicates that per-minute metrics values are to be collected, and "HOUR" indicates that per-hour metrics values are to be collected.

The performance information collection module 232 collects per-minute metrics values or per-hour metrics values from each resource based on information registered as the collection unit identifier 2002 in association with the resource.

For example, in the case where a value "two weeks" is registered as the collection period 1914 in association with the file E 312 as shown in FIG. 19B, "MINUTE" is registered for two weeks as the collection unit identifier 2002 in association with a value "file E" of the resource identifier 2001. During this period, the performance information collection module 232 collects per-minute metrics values of the file E 312 and stores the values in the per-minute metrics value table 1500.

"MINUTE" may also be registered as the collection unit identifier 2002 in association with a resource that is within the extent of propagation of a performance problem caused by a configuration change. This will be described later in detail.

FIG. 21 is an explanatory diagram of the changed I/O path information table 224 which is used by the storage network performance management program 164 according to the embodiment of this invention.

The changed I/O path information table 224 holds information that indicates to which path a resource added or removed through a configuration change belongs.

The changed I/O path information table 224 includes columns of a path identifier 2101, a resource identifier 2102, a change specifics identifier 2103, and a configuration change identifier 2104.

Information for identifying a path to which a resource added or removed through a configuration change belongs is registered as the path identifier 2101.

Information for identifying a resource added or removed through a configuration change is registered as the resource identifier 2102.

As the change specifics identifier 2103, information that indicates whether the identified resource has been added or removed is registered.

Information for identifying a detected configuration change is registered as the configuration change identifier 2104.

For example, in the case where the host server C 303 is added to the computer system shown in FIG. 3 and the setting of the new path D 374 from the application D 307 to the array group C 359 is detected as the configuration change A, "path D" is registered as the path identifier 2101 as shown in FIG. 21.

In this case, "application D", "file E", "volume D", "port S", "port T", "port U", "port V", "port O", "port R", "logical volume D", and "array group C" which are the identifier of resources belonging to the path D 374 are registered as the resource identifier 2102 in association with "path D" (resources from "port S" to "port V" are omitted from FIG. 21).

The value registered as the change specifics identifier 2103 in association with these resources is "addition", which indicates that these resources have been added. The value registered as the configuration change identifier 2104 in association with these resources is "configuration change A", which indicates that these resources have been added through the configuration change A.

Figure 22:
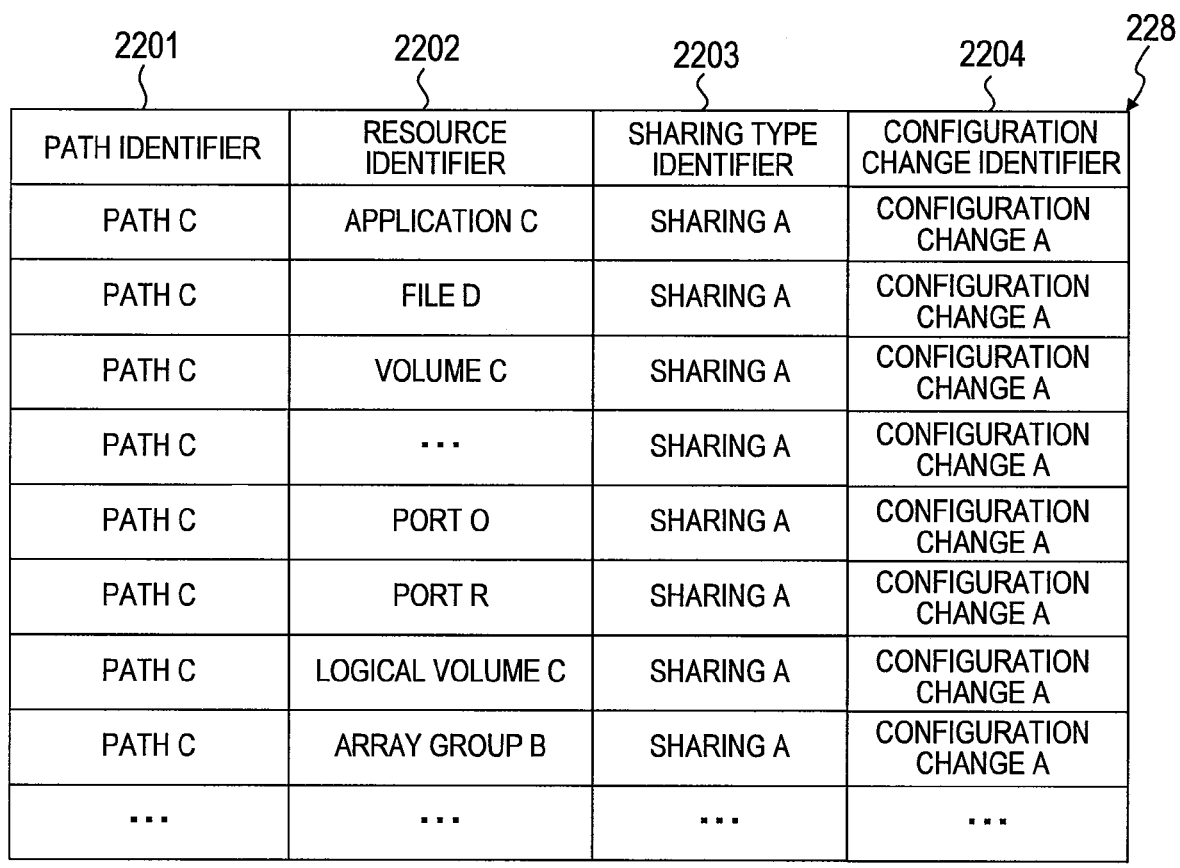
FIG. 22 is an explanatory diagram of an I/O path information table which is used by the storage network performance management program according to the embodiment of this invention.

FIG. 22 is an explanatory diagram of the I/O path information table 228 which is used by the storage network performance management program 164 according to the embodiment of this invention.

The I/O path information table 228 holds information that indicates which path could be affected by a performance problem resulting from a configuration change.

The I/O path information table 228 includes columns of a path identifier 2201, a resource identifier 2202, a sharing type identifier 2203, and a configuration change identifier 2204.

Information for identifying a path to which a performance problem caused by a configuration change could propagate is registered as the path identifier 2201.

Registered as the resource identifier 2202 is information for identifying a resource that belongs to a path to which a performance problem caused by a configuration change could propagate.

Registered as the sharing type identifier 2203 is information that indicates the relation between a path identified by the path identifier 2201 and a path where a configuration change has been detected.

Specifically, when a path identified by the path identifier 2201 and a path where a configuration change has been detected share the same resource, there is a possibility that a performance problem propagates via the shared resource, and "sharing A" is registered as the sharing type identifier 2203.

When a path identified by the path identifier 2201 and a path where a configuration change has been detected do not share the same resource but the path identified by the path identifier 2201 and another path for which "sharing A" is registered as the sharing type identifier 2203 share the same resource, there is a possibility that a performance problem propagates via the shared resource. Then "sharing B" is registered as the sharing type identifier 2203 in association with the path identified by the path identifier 2201.

When a path identified by the path identifier 2201 does not share a resource in the manner of either "sharing A" or "sharing B" but shares the same resource with another path for which "sharing B" is registered as the sharing type identifier 2203, there is a possibility that a performance problem propagates via the shared resource. Then "sharing C" is registered as the sharing type identifier 2203 in association with the path identified by the path identifier 2201.

Registered as the configuration change identifier 2204 is information for identifying a configuration change that causes a performance problem that could propagate to a path identified by the path identifier 2201.

For example, in the case where the host server C 303 is added to the computer system shown in FIG. 3 and the setting of the new path D 374 from the application D 307 to the array group C 359 is detected as the configuration change A, the port O 347 and the port R 351 which belong to the path D 374 also belong to the path C 373; in other words, the port O 347 and the port R 351 are shared by the path C 373 and the path D 374.

In this case, the load of data communication over the newly added path D 374 can interfere with the load of data communication over the path C 373 in the port O 347 and the port R 351. The interference may affect the performance of data communication over the path C 373. Then resources belonging to the path C 373 are registered in the I/O path information table 228, and "sharing A" is registered as the sharing type identifier 2203 in association with these resources as shown in FIG. 22.

In the example of FIG. 3, the path A 371 and the path B 372 do not share resources with either the path C 373 or the path D 374, and a performance problem caused by the addition of the path D 374 does not propagate to the path A 371 or the path B 372. Accordingly, the path A 371 and the path B 372 are not registered in the I/O path information table 228.

In the example of FIG. 4, on the other hand, the port R 351 belonging to the path D 374 also belongs to the path B 372; in other words, the port R 351 is shared by the path B 372 and the path D 374. The load interference in the port R 351 can affect the performance of data communication over the path B 372 in this case. Then resources belonging to the path B 372, too, are registered in the I/O path information table 228, and "sharing A" is registered as the sharing type identifier 2203 in association with these resources.

The path A 371 in the example of FIG. 4 does not share a resource with the path D 374 but shares the array group A 357 with the path B 372, and a performance problem in the path B 372 can propagate to the path A 371 through the array group A 357. Then resources belonging to the path A 371, too, are registered in the I/O path information table 228, and "sharing B" is registered as the sharing type identifier 2203 in association with these resources.

Similarly, when there is a path (not shown in the drawing) that shares any other resources belonging to the path A 371 than the array group A 357 (the port M 344, for example), all resources belonging to this path are registered in the I/O path information table 228, and "sharing C" is registered as the sharing type identifier 2203 in association with the resources belonging to this path.

In short, in the example of FIG. 4, a performance problem caused by the addition of the path D 374 can be propagated to the path B 372 and the path C 373 through the load interference in the port O 347 and the port R 351, and further to the path A 371 through the load interference in the array group A 357. Then all resources belonging to these paths are registered in the I/O path information table 228.

Processing executed by the storage network performance management program 164 of the embodiment of this invention will be described next with reference to flow charts.

FIG. 23 is a flow chart showing processing that is executed by the storage network performance management program 164 according to the embodiment of this invention to collect performance information.

The performance information collection module 232 of the storage network performance management program 164 is activated at predetermined timing to obtain performance information (i.e., metrics values) from the performance information response module 214 of each performance information collection agent 206 and store the obtained metrics values in the metrics value information storage module 233 as shown in FIG. 2B. The performance information collection module 232 may be activated regularly, for example, in accordance with predetermined scheduling settings.

Once activated, the performance information collection module 232 executes a loop from Step 2301 to Step 2306. Specifically, the performance information collection module 232 executes Step 2302 to Step 2305 for each row of the performance information collection state table 230.

The performance information collection module 232 first obtains an identifier registered as the resource identifier 2001 from each row of the performance information collection state table 230 and a value registered as the collection unit identifier 2002 in association with the identifier (Step 2302).

The performance information collection module 232 next judges whether the obtained value of the collection unit identifier 2002 is "MINUTE" or "HOUR" (Step 2303).

When the obtained value of the collection unit identifier 2002 is "MINUTE", the performance information collection module 232 requests the performance information response module 214 of the performance information collection agent 206 that monitors a resource identified by the obtained resource identifier 2001 to send per-minute metrics values and per-hour metrics values of this resource (Step 2304).

When the obtained value of the collection unit identifier 2002 is "HOUR", on the other hand, the performance information collection module 232 requests the performance information response module 214 of the performance information collection agent 206 that monitors a resource identified by the obtained resource identifier 2001 to send per-hour metrics values of this resource (Step 2305).

After executing Step 2302 to Step 2305 for every row in the performance information collection state table 230, the performance information collection module 232 stores in the metrics value information storage modules 233 the metrics values sent from the performance information response module 214 of each performance information collection agent 206 in response to the requests of Step 2304 and Step 2305 (Step 2307). Specifically, the performance information collection module 232 stores the received per-minute metrics values in the per-minute metrics value table 1500 and stores the received per-hour metrics values in the per-hour metrics value table 1600.

The processing of the performance information collection module 232 is thus completed.

Figure 24:
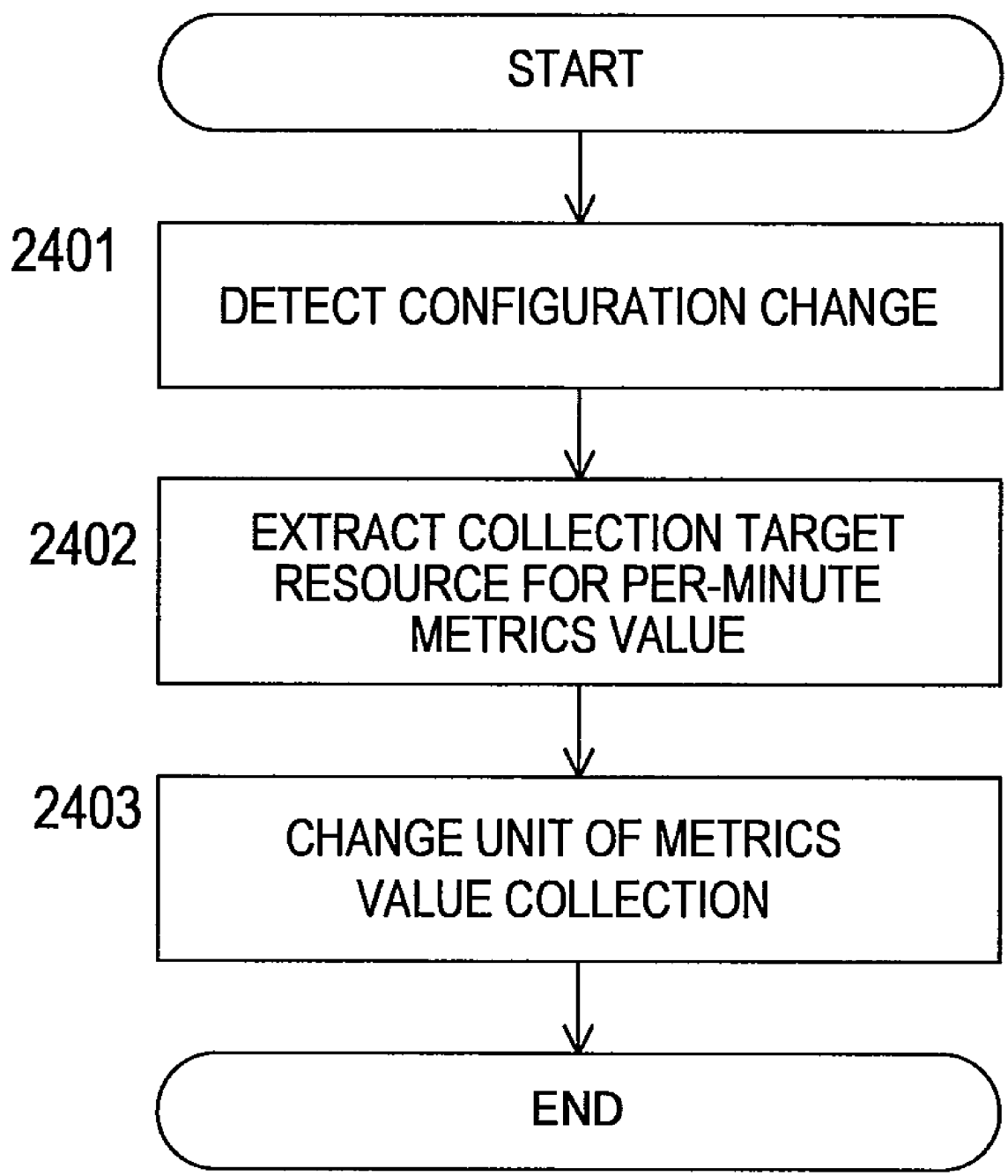
FIG. 24 is a flow chart showing processing that is executed by the storage network performance management program according to the embodiment of this invention to determine a type of performance information to be collected.

FIG. 24 is a flow chart showing processing that is executed by the storage network performance management program 164 according to the embodiment of this invention to determine the type of performance information to be collected.

First, the configuration change detection module 223 of the storage network performance management program 164 detects a configuration change (Step 2401). The configuration change detection module 223 stores information about the detected configuration change in the configuration change information storage module 226 as shown in FIG. 2B. Details of Step 2401 will be described later with reference to FIG. 25.

Next, the I/O path extraction module 225 of the storage network performance management program 164 extracts a resource from which per-minute metrics values are to be collected (Step 2402). Specifically, the I/O path extraction module 225 identifies a path where the configuration change has been detected and a path to which a performance problem due to the configuration change could propagate from information stored in the interresource relation information storage module 222 and the configuration change information storage module 226, and registers the identified paths in the changed I/O path information table 224 and the I/O path information table 228 as shown in FIG. 2B. Details of Step 2402 will be described later with reference to FIG. 26.

Next, the collection state setting module 227 of the storage network performance management program 164 updates the performance information collection state table 230 according to the result of Step 2402 (Step 2403). Specifically, the collection state setting table 227 changes the metrics value collection unit ("MINUTE" or "HOUR") registered in the performance information collection state table 230 in accordance with the information registered in the changed I/O path information table 224 and the I/O path information table 228 as shown in FIG. 2B. Details of Step 2403 will be described later with reference to FIG. 27.

FIG. 24 shows an example in which Step 2401 is executed at predetermined timing and then Step 2402 and Step 2403 are executed in order, but the execution of Step 2401 to Step 2403 may be timed independently from one another. Specifically, schedules may be set individually for Step 2401 to Step 2403 so that the configuration change detection module 223, the I/O path extraction module 225, and the collection state setting module 227 are activated in accordance with the schedules.

Figure 25:
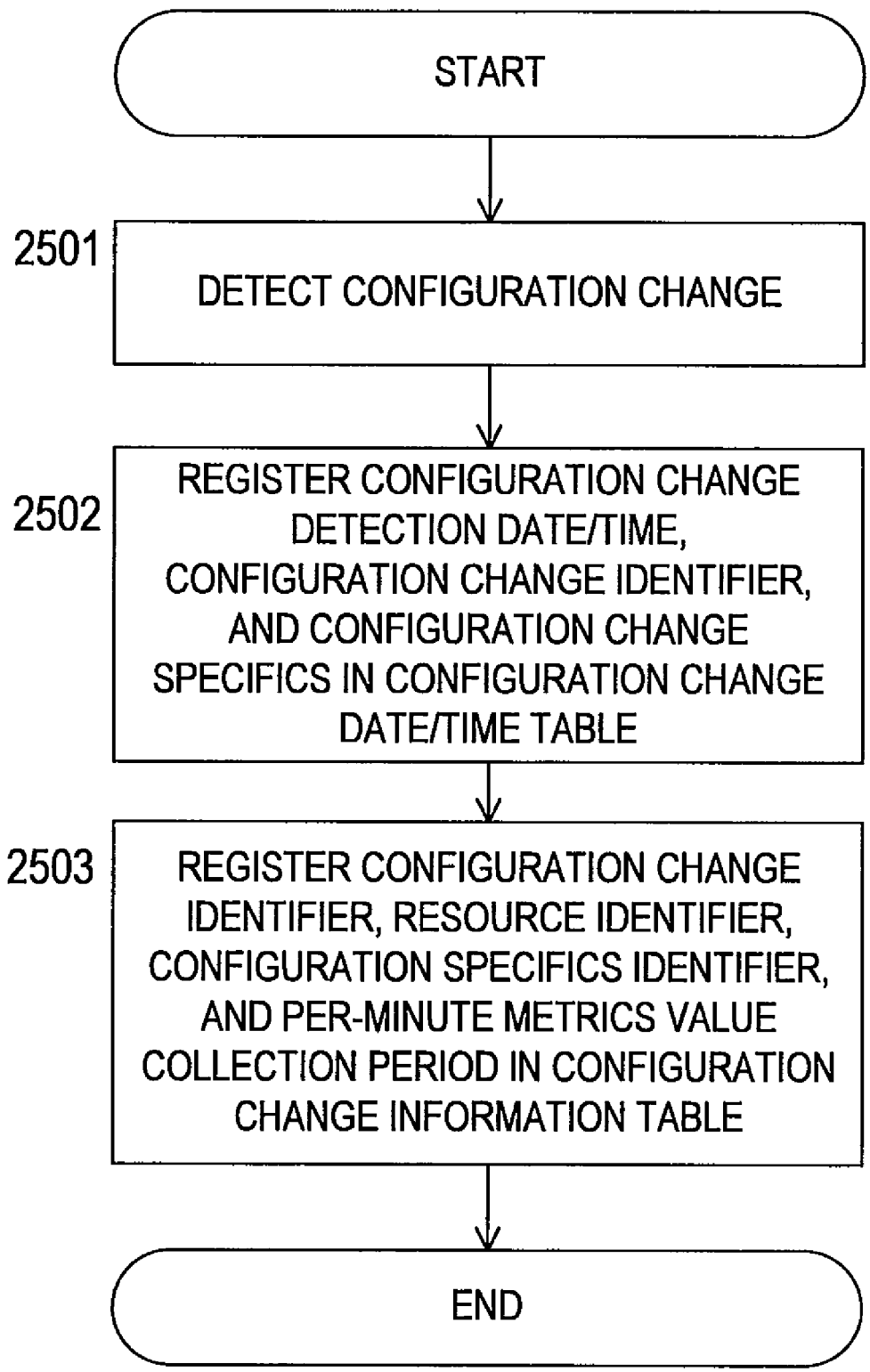
FIG. 25 is a flow chart showing processing that is executed by a configuration change detection module of the storage network performance management program according to the embodiment of this invention.

FIG. 25 is a flow chart showing processing that is executed by the configuration change detection module 223 of the storage network performance management program 164 according to the embodiment of this invention.

The processing of FIG. 25 is executed in Step 2401 of FIG. 24.

The configuration change detection module 223 first detects a configuration change (Step 2501).

Detecting a configuration change, the configuration change detection module 223 registers the date and time at which the configuration change is detected, and the identifier and specifics of the detected configuration change in the configuration change date/time table 1900 shown in FIG. 19A (Step 2502).

The configuration change detection module 223 next registers the identifier of the detected configuration change, the identifier of a resource added or removed, a change specifics identifier, and a per-minute metrics value collection period in the configuration change information table 1910 shown in FIG. 19B (Step 2503). A value set by the administrator or a user in advance may be registered as the per-minute metrics value collection period.

The processing of the configuration change detection module 223 is thus completed.

Figure 26:
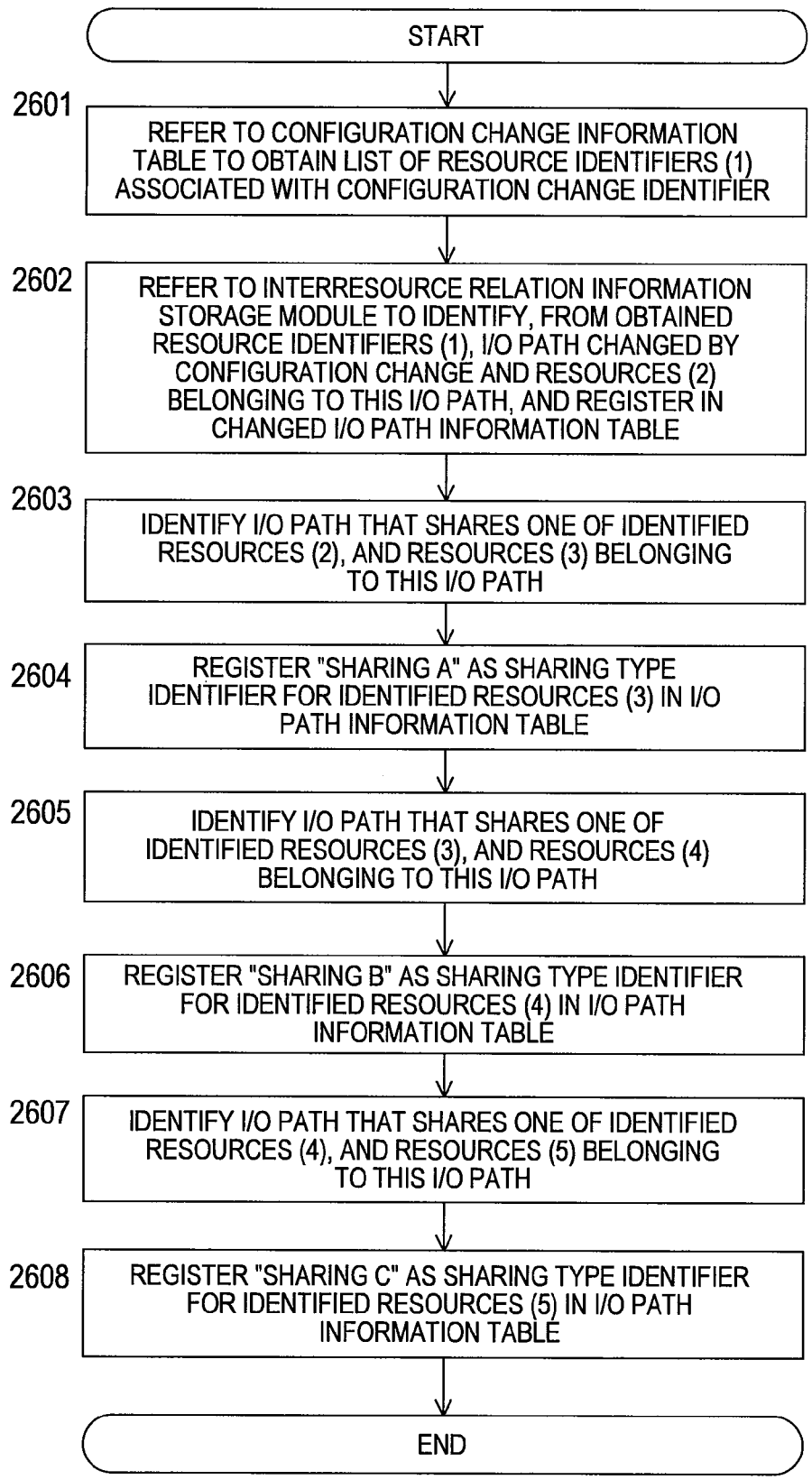
FIG. 26 is a flow chart showing processing that is executed by an I/O path extraction module of the storage network performance management program according to the embodiment of this invention.

FIG. 26 is a flow chart showing processing that is executed by the I/O path extraction module 225 of the storage network performance management program 164 according to the embodiment of this invention.

The processing of FIG. 26 is executed in Step 2402 of FIG. 24.

The I/O path extraction module 225 first obtains from the configuration change information table 1910 a list of values registered as the resource identifier 1912 in association with the value of the configuration change identifier 1911 (Step 2601).

The I/O path extraction module 225 next refers to the interresource information storage module 222 to identify a path where the configuration change has been detected and resources that belong to this path from the resource identifiers obtained in Step 2601, and registers the identified path and resources in the changed I/O path information table 224 (Step 2602).

The I/O path extraction module 225 then identifies a path that shares at least one of the resources identified in Step 2602 and resources that belong to this path (Step 2603).

The I/O path extraction module 225 registers the path and resources identified in Step 2603 in the I/O path information table 228 (Step 2604). "Sharing A" is registered as the sharing type identifier 2203 in association with these resources.

The I/O path extraction module 225 then identifies a path that shares at least one of the resources identified in Step 2603 and resources that belong to this path (Step 2605).

The I/O path extraction module 225 registers the path and resources identified in Step 2605 in the I/O path information table 228 (Step 2606). "Sharing B" is registered as the sharing type identifier 2203 in association with these resources.

The I/O path extraction module 225 then identifies a path that shares at least one of the resources identified in Step 2605 and resources that belong to this path (Step 2607).

The I/O path extraction module 225 registers the path and resources identified in Step 2607 in the I/O path information table 228 (Step 2608). "Sharing C" is registered as the sharing type identifier 2203 in association with these resources.

Step 2608 may be followed by identification of resources that belong to such paths as one that shares at least one of the resources identified in Step 2607 and one that shares at least one of resources that belong to the former path as in Step 2603 to Step 2607.

The processing of the I/O path extraction module 225 is thus completed.

Figure 27:
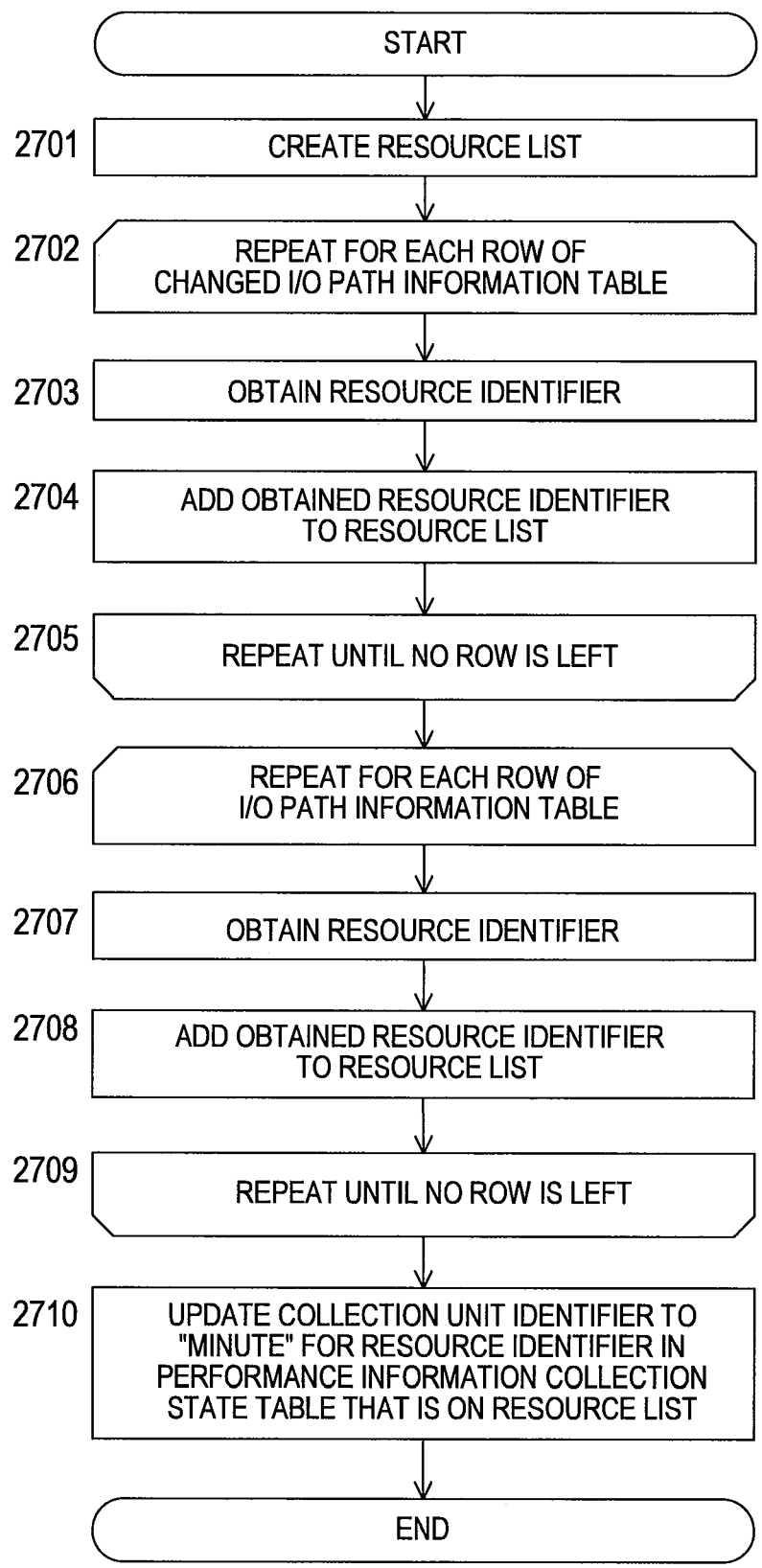
FIG. 27 is a flow chart showing processing that is executed by a collection state setting module of the storage network performance management program according to the embodiment of this invention.

FIG. 27 is a flow chart showing processing that is executed by the collection state setting module 227 of the storage network performance management program 164 according to the embodiment of this invention.

The processing of FIG. 27 is executed in Step 2403 of FIG. 24.

The collection state setting module 227 first creates a resource list (not shown in the drawings) (Step 2701). The resource list is a list in which resource identifiers are registered in order in Step 2702 and subsequent steps. At the time Step 2701 is executed, the resource list is empty.

The collection state setting module 227 next executes a loop from Step 2702 to Step 2705. Specifically, the collection state setting module 227 executes Step 2703 and Step 2704 for each row of the changed I/O path information table 224.

The collection state setting module 227 obtains a value registered as the resource identifier 2102 from each row of the changed I/O path information table 224 (Step 2703).

The collection state setting module 227 adds the value (resource identifier) obtained in Step 2703 to the resource list (Step 2704).

After executing Step 2703 and Step 2704 for every row in the changed I/O path information table 224, the collection state setting module 227 executes a loop from Step 2706 to Step 2709. Specifically, the collection state setting module 227 executes Step 2707 and Step 2708 for each row of the I/O path information table 228.

The collection state setting module 227 obtains a value registered as the resource identifier 2202 from each row of the I/O path information table 228 (Step 2707).

The collection state setting module 227 adds the value (resource identifier) obtained in Step 2707 to the resource list (Step 2708).

After executing Step 2707 and Step 2708 for every row in the I/O path information table 228, the collection state setting module 227 refers to the created resource list and the performance information collection state table 230 to find the resource identifier 2001 that matches one on the resource list and update the value of the collection unit identifier 2002 that is associated with the found resource identifier 2001 to "MINUTE" (Step 2710). Other collection unit identifiers 2002 are not updated, which means that, if their values are "HOUR", the values remain "HOUR".

The collection state setting module 227 changes the value updated to "MINUTE" in Step 2710 back to "HOUR" after a period registered as the collection period 1914 in the configuration change information table 1910 elapses since the time of the update.

The processing of the collection state setting module 227 is thus completed.

The collection state setting module 227 in the above example keeps the value of the collection unit identifier 2002 associated with a resource identifier that is not on the resource list to "HOUR". Alternatively, the collection state setting module 227 may update the value of the collection unit identifier 2002 associated with a resource identifier that is not on the resource list to a value that indicates "no collection". The performance information collection module 232 in this case performs the processing of FIG. 23 without collecting metrics values of a resource for which the value indicating that collection is prohibited is registered.

Through the processing of FIG. 24 to FIG. 27, "MINUTE" is set to only the collection unit identifier 2002 that is associated with a resource to which a performance problem caused by a configuration change could propagate. As a result, per-minute metrics values are collected in the processing of FIG. 23 from a resource that can be affected by a performance problem due to a configuration change. A performance problem caused by a configuration change can thus be detected from per-minute metrics values reliably.

From a resource that is not affected by a performance problem due to a configuration change, per-hour metrics values alone are collected. This means that storage areas are not spent for storing metrics values that are unnecessary in detecting a performance problem caused by a configuration change. Further, since the extent of propagation of a performance problem caused by a configuration change is narrowed down in advance, the performance problem is detected quickly.

Figure 28:
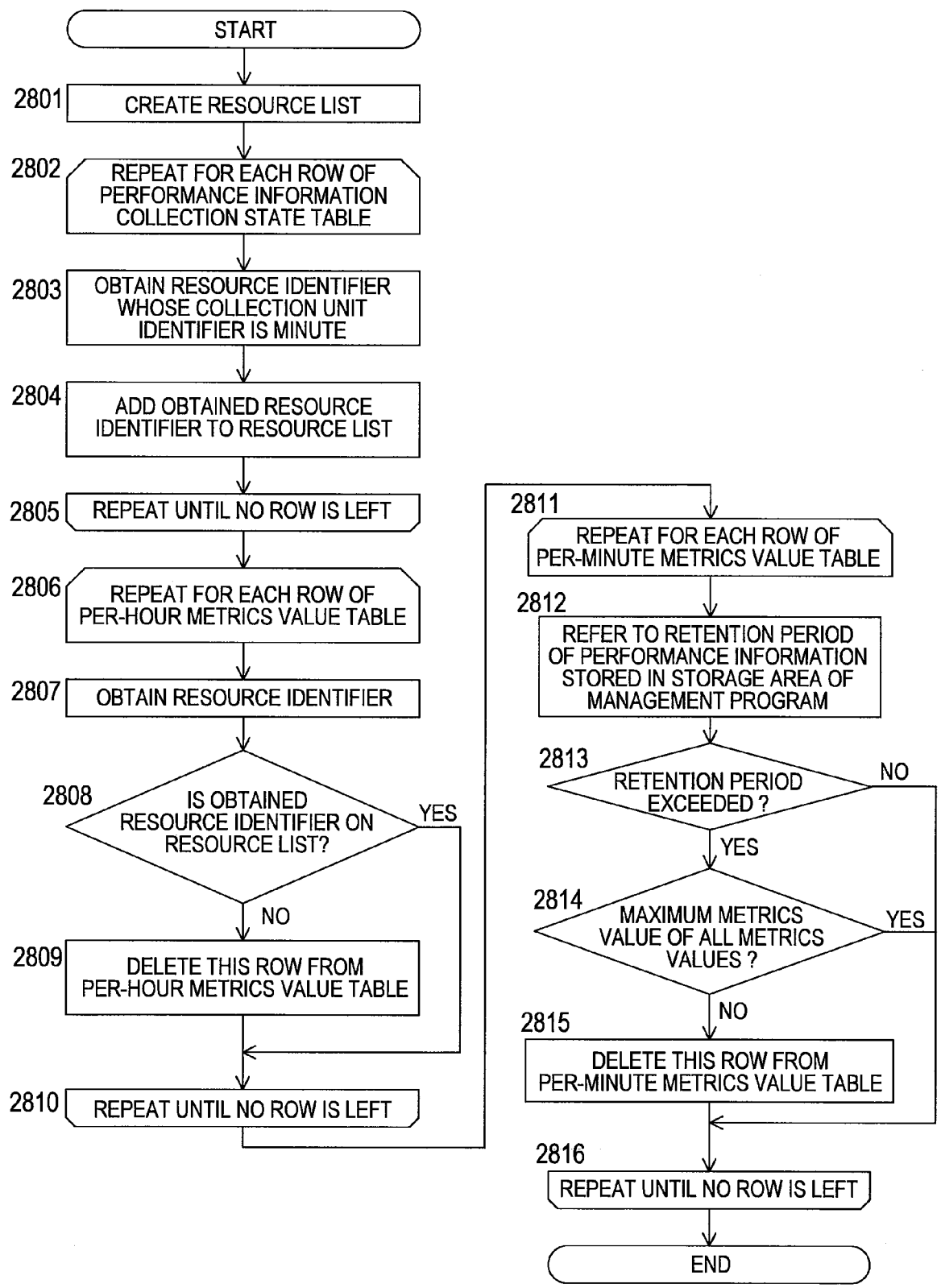
FIG. 28 is a flow chart showing processing that is executed by the storage network performance management program according to the embodiment of this invention to delete metrics values.

FIG. 28 is a flow chart showing processing that is executed by the storage network performance management program 164 according to the embodiment of this invention to delete metrics values.

The performance information collection module 232 stores metrics values in the metrics value information storage module 233 by executing the processing shown in FIG. 23. In order to prevent the metrics value information storage module 233 from overflowing, the metrics value deletion module 231 deletes metrics values from the metrics value information storage module 233 by executing processing shown in FIG. 28. The metrics value deletion module 231 refers to the performance information collection state table 230 to delete metrics values that are estimated to be unuseful in detection of a performance problem caused by a configuration change preferentially from the metrics value information storage module 233 as shown in FIG. 2B.

The metrics value deletion module 231 starts executing the processing shown in FIG. 28 when the amount of data stored in the metrics value information storage module 233 exceeds a predetermined threshold.

First, the metrics value deletion module 231 creates a resource list (not shown in the drawings) (Step 2801). This resource list is similar to the one created in the manner shown in FIG. 27, and is empty at the time Step 2801 is executed.

Next, the metrics value deletion module 231 executes a loop from Step 2802 to Step 2805. Specifically, the metrics value deletion module 231 executes Step 2803 and Step 2804 for each row of the performance information collection state table 230.

The metrics value deletion module 231 obtains the value of the resource identifier 2001 that is associated with the value "MINUTE" of the collection unit identifier 2002 (Step 2803).

The metrics value deletion module 231 adds the value (resource identifier) obtained in Step 2803 to the resource list (Step 2804).

After executing Step 2803 and Step 2804 for every row in the performance information collection state table 230, the metrics value deletion module 231 executes a loop from Step 2806 to Step 2810. Specifically, the metrics value deletion module 231 executes Step 2807 to Step 2809 for each row of the per-hour metrics value table 1600.

The metrics value deletion module 231 obtains the value of the resource identifier 1602 from each row of the per-hour metrics value table 1600 (Step 2807).

The metrics value deletion module 231 judges whether or not the resource identifier obtained in Step 2807 matches one on the resource list (Step 2808).

When it is judged in Step 2808 that the resource list does not have the resource identifier obtained in Step 2807, it means that per-hour metrics values alone are collected from the resource that is identified by the resource identifier obtained in Step 2807, and that a performance problem caused by a recent configuration change does not propagate to this resource. The term "recent configuration change" refers to a configuration change that is detected after a time point that is obtained by counting back from the present a length of time indicated by the collection period 1914. In other words, metrics values of this resource are unuseful in detection of a performance problem caused by a recent configuration change. Then the metrics value deletion module 231 deletes the row from which the resource identifier 1602 is obtained in Step 2807 from the per-hour metrics value table 1600 (Step 2809).

When it is judged in Step 2808 that the resource list has the resource identifier obtained in Step 2807, on the other hand, it means that per-minute metrics values in addition to per-hour metrics values are collected from a resource that is identified by the resource identifier obtained in Step 2807, and that a performance problem caused by a recent configuration change could propagate to this resource. In other words, metrics values of this resource may be useful in detection of a performance problem caused by a recent configuration change. Then the metrics value deletion module 231 does not execute Step 2809.

After executing Step 2807 to Step 2809 for every row in the per-hour metrics value table 1600, the metrics value deletion module 231 executes a loop from Step 2811 to Step 2816. Specifically, the metrics value deletion module 231 executes Step 2812 to Step 2815 for each row of the per-minute metrics value table 1500.

The metrics value deletion module 231 refers to the retention period of performance information (2812). A performance information retention period is a period during which collected metrics values must be kept. For example, the administrator may set an arbitrary period as a performance information retention period. Information indicating the set period may be stored in, for example, a storage area managed by the storage network performance management program 164.

The metrics value deletion module 231 judges for each row of the per-minute metrics value table 1500 whether or not the actual length of time the registered metrics value has been kept exceeds the performance information retention period referred to in Step 2812 (Step 2813). The actual length of time a metrics value has been kept is a period counted from the date and time registered as the date/time 1501 to the present.

When it is judged in Step 2813 that the actual retention period exceeds the performance information retention period referred to, the metrics value deletion module 231 judges for each row of the per-minute metrics value table 1500 whether or not the row's metrics value is the largest of all the metrics values registered in the per-minute metrics value table 1500 (in other words, whether or not the relevant metrics value represents the heaviest load) (Step 2814).

When it is judged in Step 2814 that the metrics value of the row in question is not the largest of all the metrics values registered in the per-minute metrics value table 1500, the metrics value deletion module 231 deletes this row from the per-minute metrics value table 1500 (Step 2815).

When it is judged in Step 2813 that the actual length of time the metrics value of the row in question has been kept does not exceed the performance information retention period referred to in Step 2812, the metrics value registered in this row cannot be deleted yet. The metrics value deletion module 231 therefore does not execute Step 2815 for this row.

When it is judged in Step 2814 that the metrics value of the row in question is the largest of all the metrics values registered in the per-minute metrics value table 1500, the metrics value registered in this row has exceeded its set retention period but is likely to be useful in detection of a performance problem. The metrics value deletion module 231 therefore does not execute Step 2815 for this row.

The processing of the metrics value deletion module 231 is thus completed.

The processing of FIG. 28 described above makes it possible to secure storage areas for storing new metrics values while keeping metrics values that are estimated as useful in detection of a performance problem due to a configuration change.

Described next is how a result of analysis of collected and kept metrics values is displayed in this embodiment.

The performance analysis display module 229 analyzes information stored in the interresource relation information storage module 222, the changed I/O path information table 224, the configuration change information storage module 226, the I/O path information table 228, and the metrics value information storage module 233, and instructs the performance management client 104 to display the result of the analysis as shown in FIG. 2B. The descriptions given below are about what analysis is conducted by the performance analysis display module 229 and about windows displayed on the display device 105 of the performance management client 104 based on the result of the analysis.

Processing of analyzing and displaying a transition in metrics value will be described first with reference to FIG. 29. A metrics value transition indicates, for example, whether the metrics value is on a rising trend or a falling trend. For instance, in the case where the response time is obtained as a metrics value, a performance problem in a resource can be predicted if the response time of the resource is on a rising trend.

The performance analysis display module 229 calculates a metrics value transition of a resource that can be affected by a performance problem resulting from a configuration change in response to a request from the performance management client 104.

Specifically, the performance analysis display module 229 refers to the changed I/O path information table 224 and the I/O path information table 228 to obtain a list of all resources on the paths registered in the tables.

The performance analysis display module 229 next refers to the per-minute metrics value table 1500 to calculate for each of the resources obtained in the above step the transition trend of the resource's metrics values. This calculation may employ a known statistical analysis method (e.g., regression analysis).

Based on the calculated metrics value transition trend, the performance analysis display module 229 detects a resource whose metrics values are on a rising trend or a falling trend.

The performance analysis display module 229 instructs the performance management client 104 to display the result of the above analysis. An example of how the analysis result is displayed is shown in FIG. 29.

Figure 29:
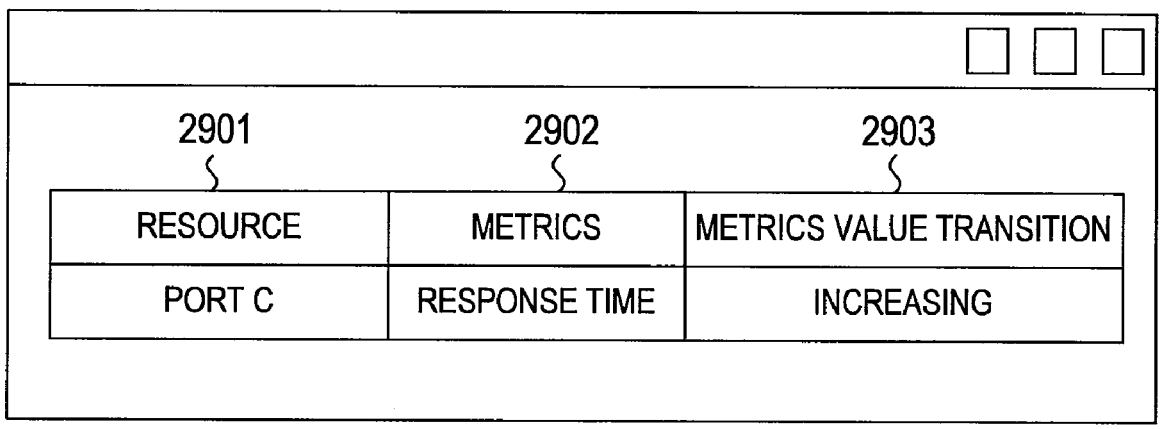
FIG. 29 is an explanatory diagram of a window that displays a metrics value transition according to the embodiment of this invention.

FIG. 29 is an explanatory diagram of a window that displays a metrics value transition according to the embodiment of this invention.

The display window shown in FIG. 29 contains a resource display field 2901, a metrics display field 2902, and a metrics value transition display field 2903.

The resource display field 2901 displays a resource identifier.

The metrics display field 2902 displays information that indicates the type of metrics value.

The metrics value transition display field 2903 displays information that indicates a metrics value transition, for example, whether the metrics value is on a rising trend or a falling trend.

In the example of FIG. 29, "port C", "response time" and "increasing" are displayed in the resource display field 2901, the metrics display field 2902 and the metrics value transition display field 2903, respectively. This shows that the response time of the port C 323 is on a rising trend.

Processing of displaying a detected configuration change and the collection period of metrics values relevant to the configuration change will be described next with reference to FIG. 30 and FIG. 31.

Figure 30:
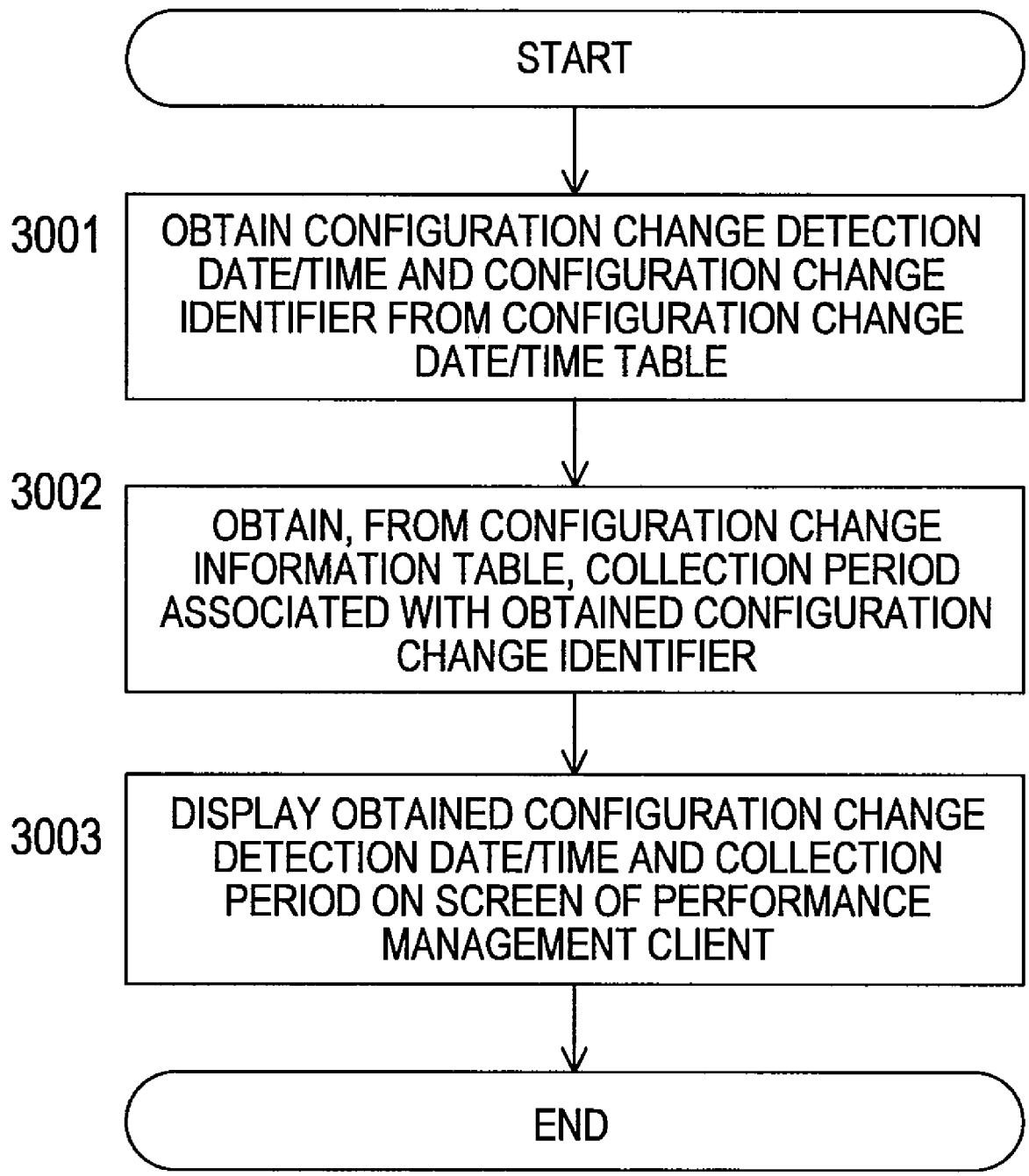
FIG. 30 is a flow chart showing processing that is executed by a performance analysis display module according to the embodiment of this invention to display a detected configuration change and a collection period of metrics values relevant to a configuration change.

FIG. 30 is a flow chart showing processing that is executed by the performance analysis display module 229 according to the embodiment of this invention to display a detected configuration change and the collection period of metrics values relevant to the configuration change.

The performance analysis display module 229 first obtains from the configuration change date/time table 1900 values registered as the configuration change detection date/time 1901 and the configuration change identifier 1902 (Step 3001).

The performance analysis display module 229 next obtains from the configuration change information table 1910 a value registered as the collection period 1914 in association with the configuration change identifier obtained in Step 3001 (Step 3002).

The performance analysis display module 229 instructs the performance management client 104 to display the configuration change detection date/time obtained in Step 3001 and the collection period obtained in Step 3002 (Step 3003). Following the instruction, the performance management client 104 displays the configuration change detection date/time and the collection period on the display device 105. An example of how the information is displayed is shown in FIG. 31.

Figure 31:
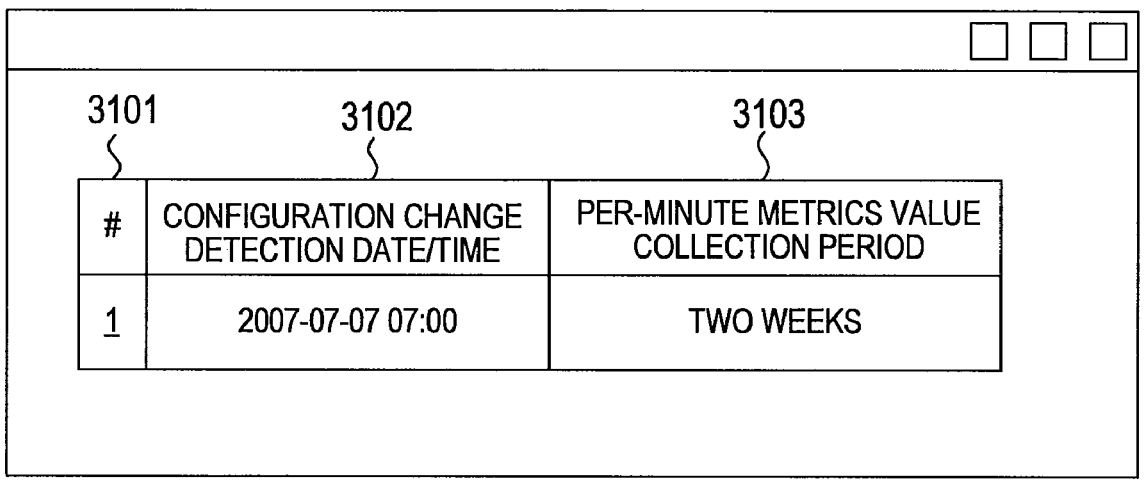
FIG. 31 is an explanatory diagram of a window that displays a detected configuration change and the collection period of metrics values relevant to the configuration change according to the embodiment of this invention.

FIG. 31 is an explanatory diagram of a window that displays a detected configuration change and the collection period of metrics values relevant to the configuration change according to the embodiment of this invention.

The display window shown in FIG. 31 contains an item number display field 3101, a detection date/time display field 3102, and a collection period display field 3103.

The item number display field 3101 displays a number assigned to the detected configuration change. This displayed number may be hyper-linked, for example, to be linked with information shown in FIG. 33 which will be described later.

The detection date/time display field 3102 displays the date and time at which the configuration change is detected.

The collection period display field 3103 displays a period in which per-minute metrics values are collected after the detection of the configuration change.

In the example of FIG. 31, "1", "2007-07-07 07:00" and "two weeks" are displayed in the item number display field 3101, the detection date/time display field 3102 and the collection period display field 3103, respectively. This shows that a configuration change assigned an item number "1", is detected on Jul. 7, 2007, and that per-minute metrics values of a resource to which a performance problem caused by the configuration change could propagate are collected for two weeks.

Processing of displaying detailed information about a configuration change will be described next with reference to FIG. 32 and FIG. 33.

Figure 32:
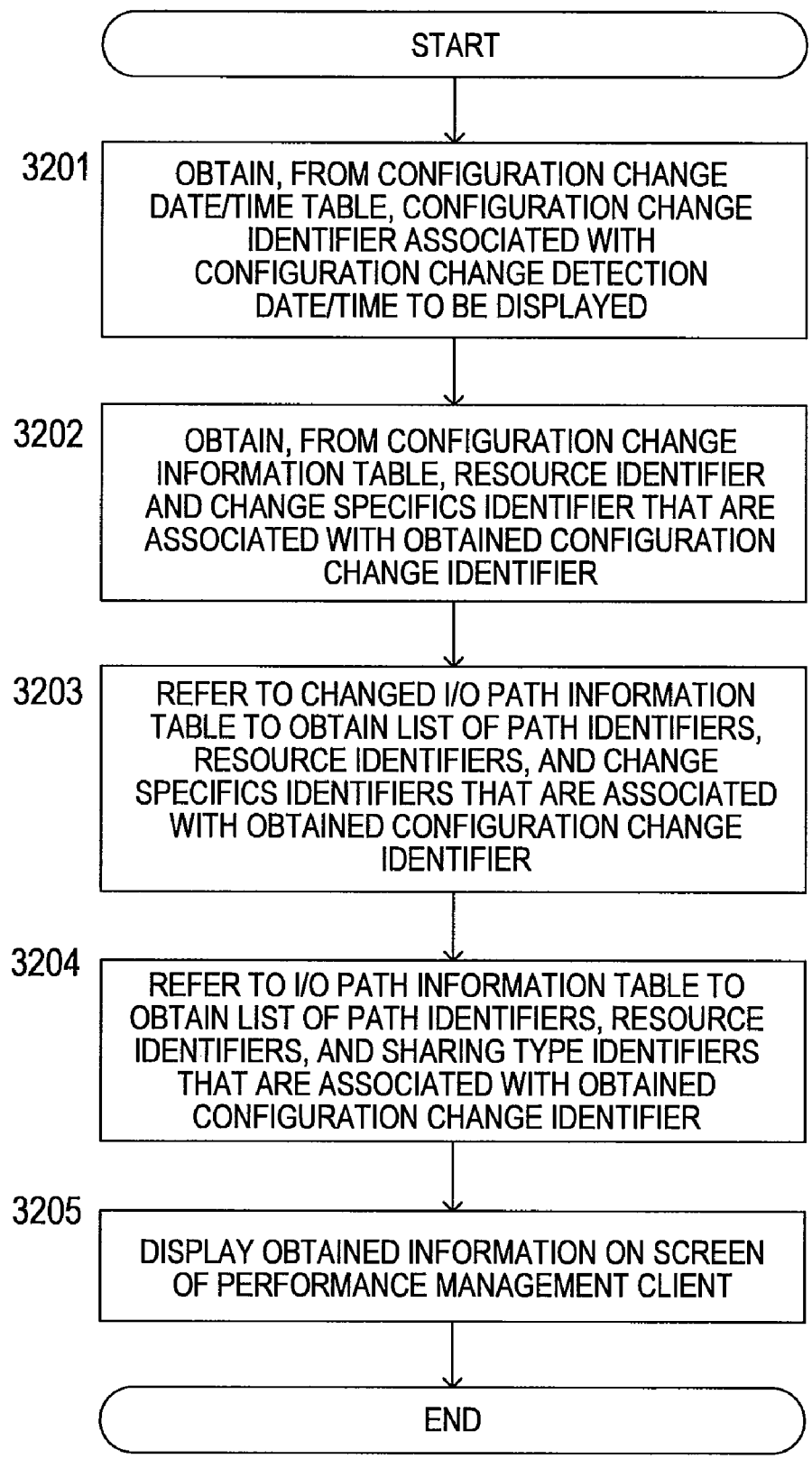
FIG. 32 is a flow chart showing processing that is executed by the performance analysis display module according to the embodiment of this invention to display detailed information about a configuration change.

FIG. 32 is a flow chart showing processing that is executed by the performance analysis display module 229 according to the embodiment of this invention to display detailed information about a configuration change.

The processing shown in FIG. 32 may be executed when, for example, the administrator or a user selects a hyper-linked item number displayed in FIG. 31.

The performance analysis display module 229 first obtains from the configuration change date/time table 1900 a value registered as the configuration change identifier 1902 in association with the configuration change detection date/time to be displayed (Step 3201). The configuration change detection date/time to be displayed is, for example, a date and time displayed in the detection date/time display field 3102 that is associated with an item number selected by the administrator or a user.

The performance analysis display module 229 next obtains from the configuration change information table 1900 values registered as the resource identifier 1912 and the change specifics identifier 1913 in association with the configuration change identifier obtained in Step 3201 (Step 3202).

The performance analysis display module 229 next obtains from the changed I/O path information table 224 a list of values registered as the path identifier 2101, the resource identifier 2102, and the change specifics identifier 2103 in association with the configuration change identifier obtained in Step 3201 (Step 3203). The performance analysis display module 229 thus obtains a list of the identifiers of resources that belong to a path where a resource has been added or removed through the configuration change.

The performance analysis display module 229 then obtains from the I/O path information table 228 a list of values registered as the path identifier 2201, the resource identifier 2202, and the sharing type identifier 2203 in association with the configuration change identifier obtained in Step 3201 (Step 3204). The performance analysis display module 229 thus obtains a list of the identifiers of resources to which a performance problem caused by the configuration change could propagate.

Next, the performance analysis display module 229 instructs the performance management client 104 to display the information obtained in Steps 3201 to 3204 (Step 3205). Following the instruction, the performance management client 104 displays the above information on the display device 105. An example of how the information is displayed is shown in FIG. 33.

Figure 33:
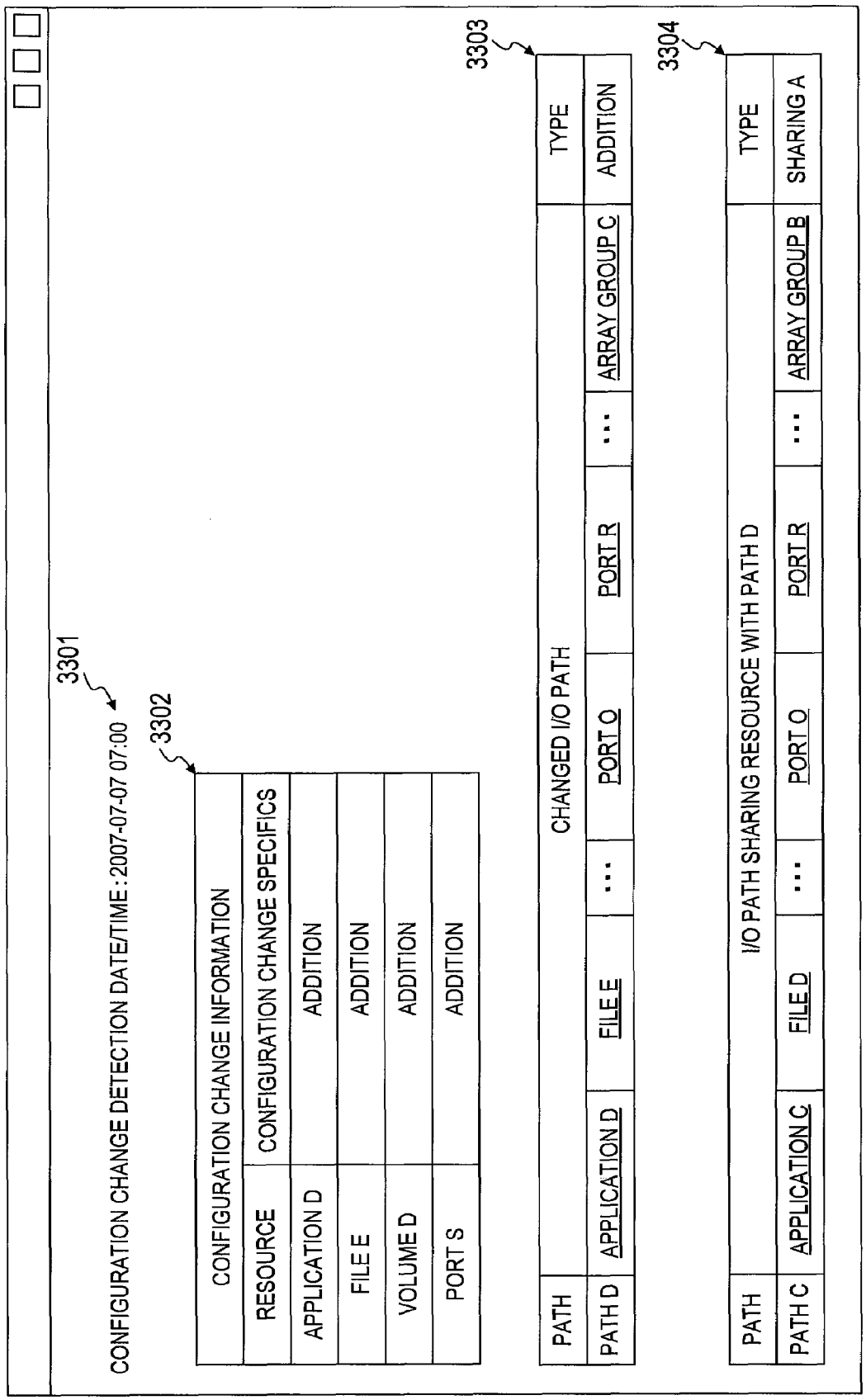
FIG. 33 is an explanatory diagram of a window that displays detailed information about a detected configuration change according to the embodiment of this invention.

FIG. 33 is an explanatory diagram of a window that displays detailed information about a detected configuration change according to the embodiment of this invention.

Specifically, FIG. 33 shows as an example a window that is displayed when the host server C 303 is newly added to the computer system shown in FIG. 3 and the path D 374 leading from the application D 307 to the array group C 359 is newly set.

The display window shown in FIG. 33 contains a detection date/time display field 3301, a configuration change information display field 3302, a changed I/O path display field 3303, and a resource sharing I/O path display field 3304.

The detection date/time display field 3301 displays a date and time at which a configuration change displayed on this display window is detected.

The configuration change information display field 3302 displays the identifier of a resource added or removed through the configuration change. Specifically, the values of the resource identifier 1912 and the change specifics 1913 that are obtained in Step 3202 are displayed in the configuration change information display field 3302.

The changed I/O path display field 3303 displays the identifier of resources that belongs to a path where a resource has been added or removed through the configuration change. Specifically, the values of the path identifier 2101, the resource identifier 2102, and the change specifics identifier 2103 that are obtained in Step 3203 are displayed in the changed I/O path display field 3303.

The resource sharing I/O path display field 3304 displays the identifier of resources to which a performance problem caused by the configuration change could propagate. Specifically, the values of the path identifier 2201, the resource identifier 2202, and the sharing type identifier 2203 that are obtained in Step 3204 are displayed in the resource sharing I/O path display field 3304. Since the example of FIG. 33 reflects FIG. 3, the resource sharing I/O path display field 3304 displays only the identifiers of resources that belong to the path C 373.

Figure 36:
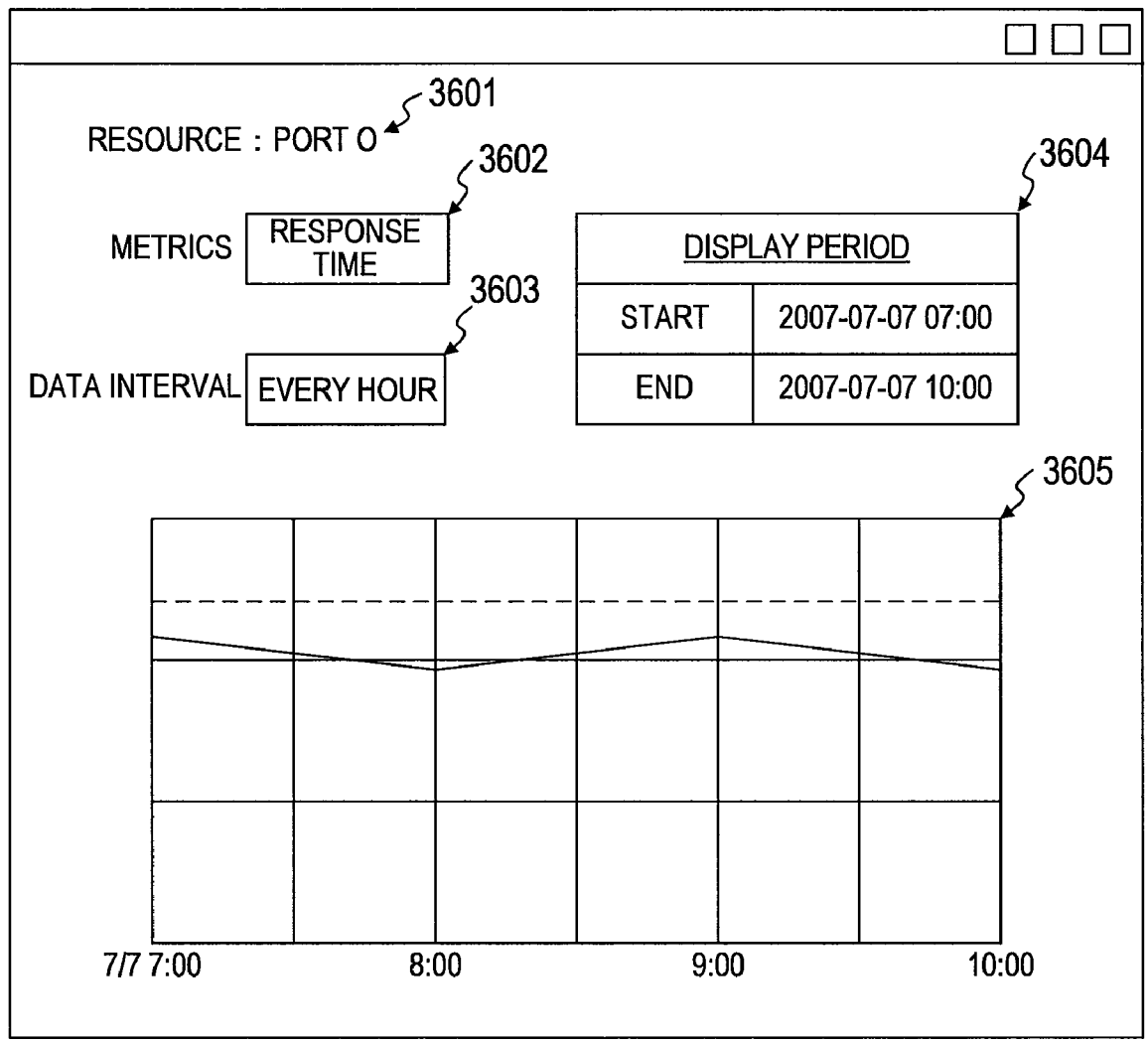
FIG. 36 is an explanatory diagram of per-hour metrics values displayed according to the embodiment of this invention.
Figure 37:
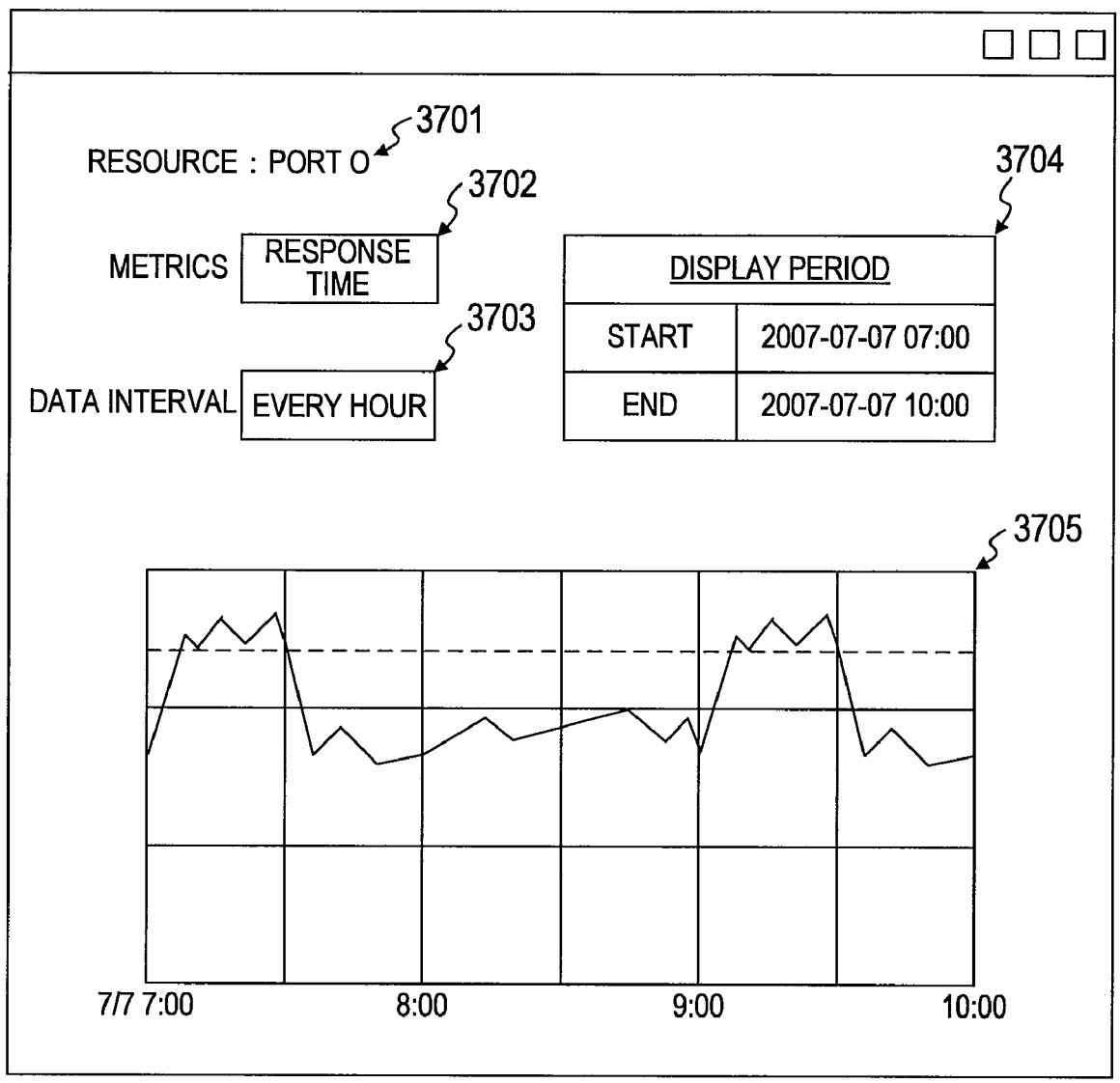
FIG. 37 is an explanatory diagram of per-minute metrics values displayed according to the embodiment of this invention.

Resource identifiers displayed in the changed I/O path display field 3303 and the resource sharing I/O path display field 3304 may be hyper-linked so that resource identifiers displayed in FIG. 33 are linked to a metrics value display window (FIG. 36 or FIG. 37, for example).

Processing of displaying metrics values will be described next with reference to FIG. 34 to FIG. 37.

Figure 34:
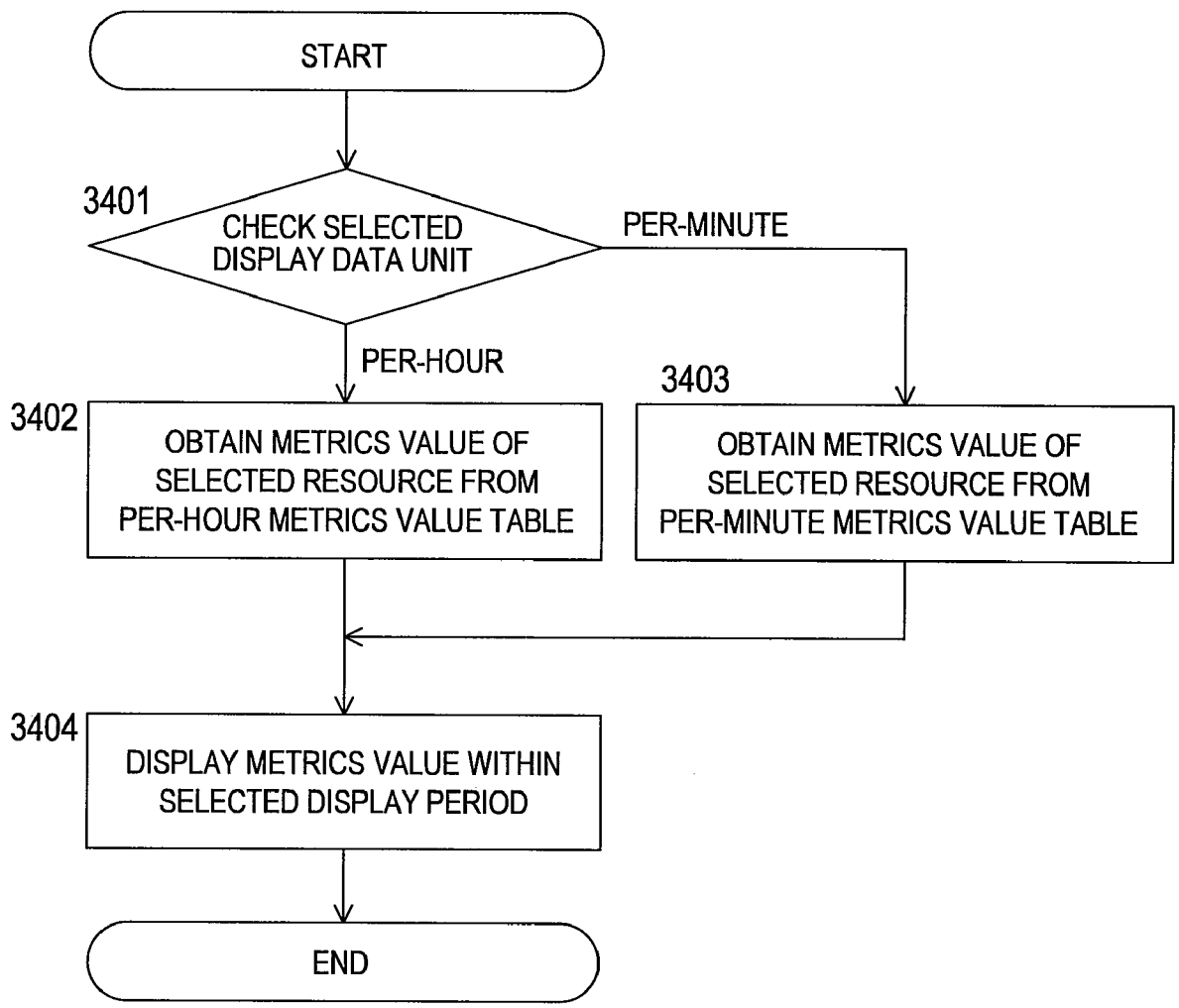
FIG. 34 is a flow chart showing processing that is executed by the performance analysis display module according to the embodiment of this invention to display metrics values.

FIG. 34 is a flow chart showing processing that is executed by the performance analysis display module 229 according to the embodiment of this invention to display metrics values.

The processing shown in FIG. 34 may be executed when, for example, the administrator or a user selects a hyper-linked resource identifier displayed in FIG. 33 for the selected resource.

The performance analysis display module 229 first checks a display data unit selected (Step 3401). Specifically, the performance analysis display module 229 judges whether it is display of per-minute metrics values or display of per-hour metrics values that has been selected. The selection may be made at the administrator's or a user's discretion, for example, and will be described later with reference to FIG. 35.

When it is judged in Step 3401 that display of per-hour metrics values has been selected, the performance analysis display module 229 obtains a per-hour metrics value of the selected resource from the per-hour metrics value table 1600 (Step 3402). The selected resource is a resource designated by the administrator or a user as an object to be processed by the processing of FIG. 34.

When it is judged in Step 3401 that display of per-minute metrics values has been selected, on the other hand, the performance analysis display module 229 obtains a per-minute metrics value of the selected resource from the per-minute metrics value table 1500 (Step 3403).

Figure 35:
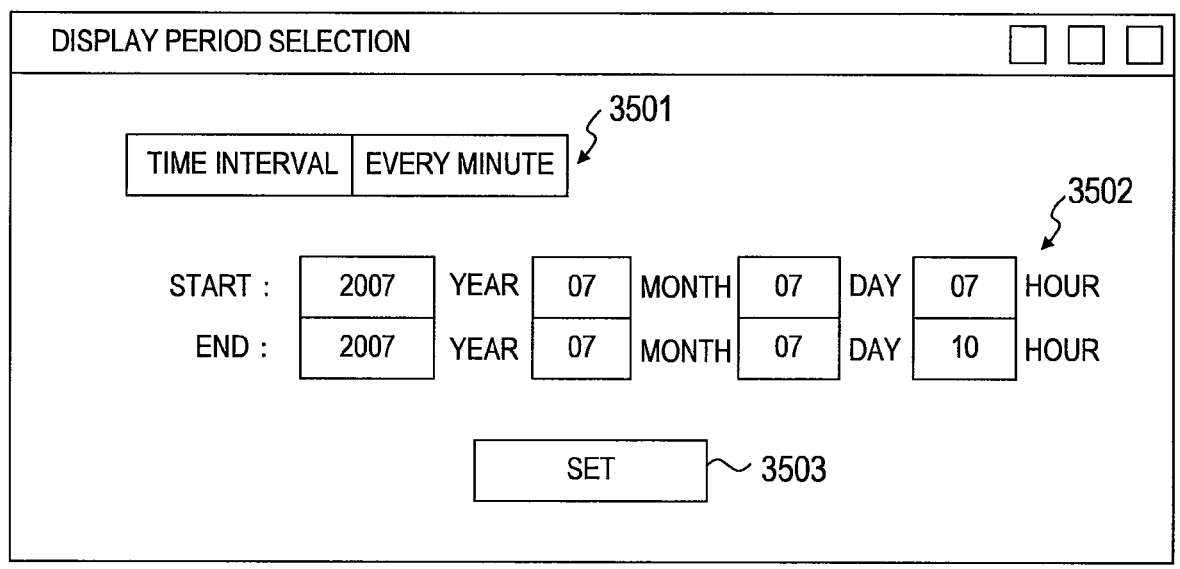
FIG. 35 is an explanatory diagram of a window that is displayed to select a display period according to the embodiment of this invention.

Next, the performance analysis display module 229 instructs the performance management client 104 to display a metrics value that is obtained in Step 3402 or Step 3403 and that has been collected during a selected display period (Step 3404). Following the instruction, the performance management client 104 displays the metrics value on the display device 105. An example of how a display period is selected is shown in FIG. 35. Examples of windows displayed on the display device 105 are shown in FIG. 36 and FIG. 37.

FIG. 35 is an explanatory diagram of a window that is displayed to select a display period according to the embodiment of this invention.

The window of FIG. 35 may be displayed when, for example, the administrator or a user selects a hyper-linked resource identifier displayed in FIG. 33.

The window of FIG. 35 contains a time interval input field 3501, a display period input field 3502, and a "set" button 3503.

The time interval input field 3501 is displayed in order to receive an input of the time interval of metrics values to be displayed. Specifically, the administrator or a user inputs information that specifies which of the per-minute metrics value and the per-hour metrics value is to be displayed in the time interval input field 3501. The judgment in Step 3401 of FIG. 34 may be made based on the value input in the time interval input field 3501.

The display period input field 3502 is displayed in order to receive an input of the period of metrics values to be displayed. Specifically, the administrator or a user inputs a start date/time, which is the start point of the period to be displayed, and an end date/time, which is the end point of the period, in the display period input field 3502.

The "set" button 3503 is operated in order to confirm input values of the time interval input field 3501 and the display period input field 3502. When the administrator or a user operates the "set" button, values that are in the time interval input field 3501 and the display period input field 3502 at that point are confirmed and metrics values are displayed in a manner determined by the entered values.

In the example of FIG. 35, "every minute" is input in the time interval input field 3501, and the start date/time and the end date/time are "7 o'clock, Jul. 7, 2007" and "10 o'clock, Jul. 7, 2007", respectively. Metrics values displayed in this case are, as shown in FIG. 37, for example, per-minute metrics values of the selected resource that have been obtained during a period from 7 o'clock, Jul. 7, 2007 to 10 o'clock, Jul. 7, 2007.

FIG. 36 is an explanatory diagram of per-hour metrics values displayed according to the embodiment of this invention.

FIG. 36 shows an example of per-hour metrics values that are displayed when "port O" is selected from the changed I/O path display field 3303 or resource sharing I/O path display field 3304 of FIG. 33 and "every hour" is input in the time interval input field 3501 of FIG. 35.

The window of FIG. 36 contains a resource identifier display field 3601, a metrics value type display field 3602, a data interval display field 3603, a display period display field 3604, and a metrics value display field 3605.

The resource identifier display field 3601 displays the identifier of the selected resource ("port O" in the example of FIG. 36).

The metrics value type display field 3602 displays the type of metrics value to be displayed in the metrics value display field 3605. "Response time" is displayed in the metrics value type display field 3602 in the example of FIG. 36. This shows that a response time is displayed as a metrics value in the metrics value display field 3605.

The data interval display field 3603 displays an interval specified in the time interval input field 3501. The data interval display field 3603 in the example of FIG. 36 displays "every hour" input in the time interval input field 3501. This shows that per-hour metrics values are displayed in the metrics value display field 3605.

The display period display field 3604 displays a period input in the display period input field 3502 of FIG. 35.

The metrics value display field 3605 displays per-hour metrics values. The metrics value display field 3605 in the example of FIG. 36 displays per-hour metrics values using a sequential line graph with the axis of abscissa indicating time and the axis of ordinate indicating metrics value (response time).

The dashed line in the metrics value display field 3605 indicates a threshold used to judge whether a performance problem has occurred or not. When the metrics value of a resource exceeds this threshold, it is judged that the resource is having a performance problem.

FIG. 37 is an explanatory diagram of per-minute metrics values displayed according to the embodiment of this invention.

FIG. 37 shows an example of per-minute metrics values that are displayed when "port O" is selected from the changed I/O path display field 3303 or resource sharing I/O path display field 3304 of FIG. 33 and "every minute" is input in the time interval input field 3501 of FIG. 35 as shown in the example of FIG. 35. In short, FIG. 37 shows per-minute metrics values of the same resource during the same period as in FIG. 36.

The window of FIG. 37 contains a resource identifier display field 3701, a metrics value type display field 3702, a data interval display field 3703, a display period display field 3704, and a metrics value display field 3705. These display fields are the same as the resource identifier display field 3601, metrics value type display field 3602, data interval display field 3603, display period display field 3604, and metrics value display field 3605 of FIG. 36, except that, in FIG. 37, the data interval display field 3703 displays "every minute" and the metrics value display field 3705 accordingly displays per-minute metrics values.

FIG. 36 and FIG. 37 are examples of displaying metrics values of the same resource during the same period. However, since metrics values in the display example of FIG. 37 (per-minute metrics values) are higher in time resolution than metrics values in the display example of FIG. 36 (per-hour metrics values), a peak is observed in FIG. 37 which is absent from FIG. 36.

For instance, a peak that exceeds the threshold indicated by the dashed line is observed in FIG. 37 at around 7:25 on July 7, whereas no such peaks are found in FIG. 36. This is because a per-hour metrics value is calculated by averaging per-minute matrix values that are collected for an hour. Therefore, in the examples of FIG. 36 and FIG. 37, a performance problem that is detected when per-minute metrics values are referred to is not detectable when per-hour metrics values are referred to.

Instead of calculating the mean value, a per-minute metrics value collected at one point within an hour may be used as a per-hour metrics value without modifying the collected value any way. However, a peak that appears in a graph of per-minute metrics values that are not employed as a per-hour metrics value is not observed in a graph of per-hour metrics values.

Thus, referring to per-minute metrics values makes detection of performance problems more reliable than when per-hour metrics values are referred to.

Metrics values in the examples of FIG. 36 and FIG. 37 are response time but other metrics values than response time (for example, I/O count per-second) may be displayed in a similar manner.

Processing of detecting a load interference from obtained metrics values will be described next with reference to FIG. 38 and FIG. 39.

Figure 38:
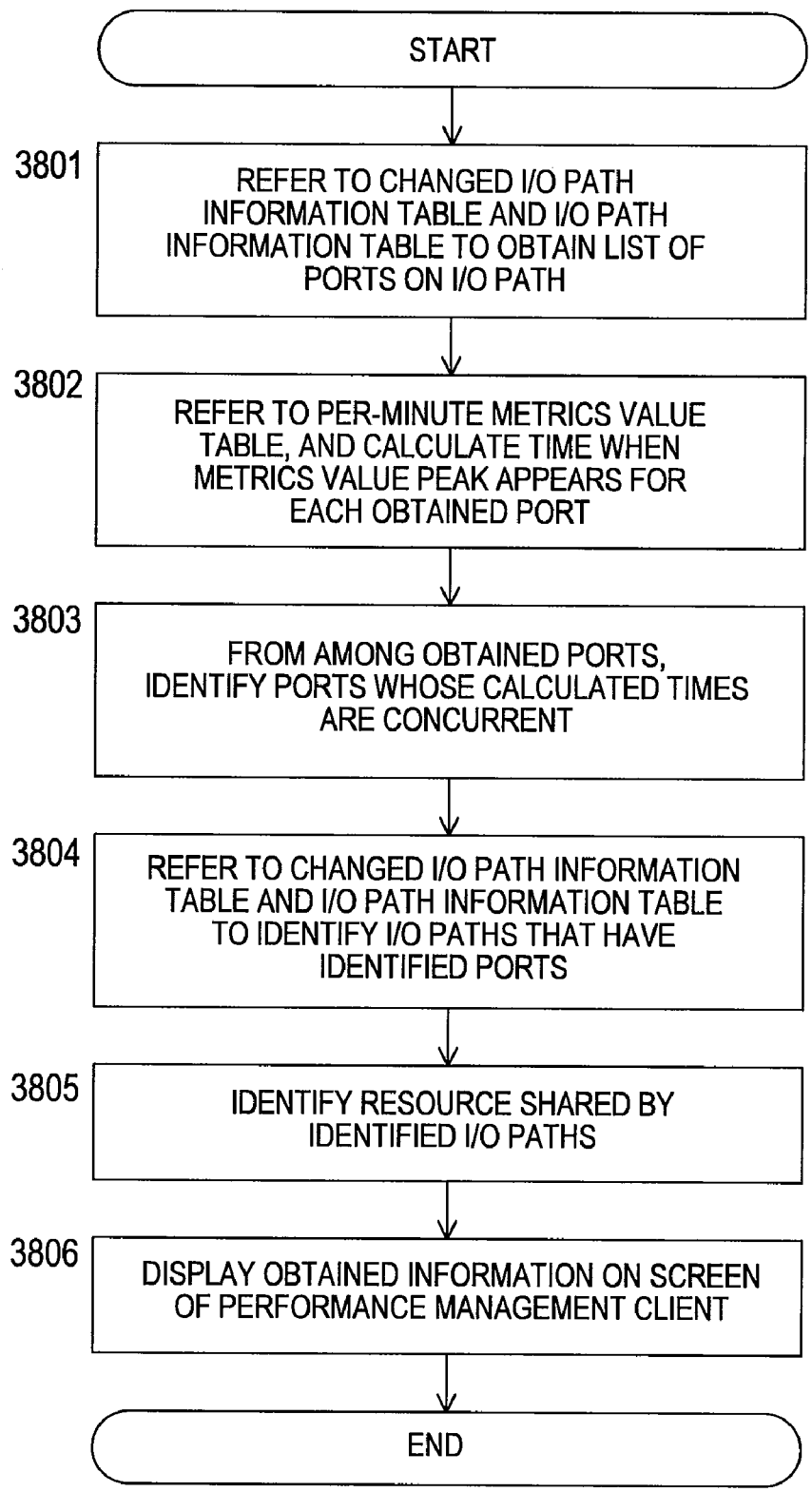
FIG. 38 is a flow chart showing processing that is executed by the performance analysis display module according to the embodiment of this invention to detect a load interference and to display a detection result.

FIG. 38 is a flow chart showing processing that is executed by the performance analysis display module 229 according to the embodiment of this invention to detect a load interference and to display a detection result.

The processing shown in FIG. 38 may be executed, similarly to the processing of FIG. 32, when the administrator or a user selects a hyper-linked item number displayed in FIG. 31. Alternatively, the processing shown in FIG. 38 may be executed in accordance with a predetermined schedule (regularly, for example).

The performance analysis display module 229 first refers to the changed I/O path information table 224 and the I/O path information table 228 to obtain a list of the ports 321 to 351 belonging to the respective paths (Step 3801).

The performance analysis display module 229 next refers to the per-minute metrics value table 1500 for each of the ports 321 and the like on the list obtained in Step 3801 to calculate a time when a metrics value peak appears in each of the ports 321 and the like (Step 3802). A metrics value peak may be a metrics value that exceeds a predetermined threshold, a local maximum value of metrics values, or a local maximum value of metrics values that exceeds a predetermined threshold.

The performance analysis display module 229 next identifies a pair (or group) of ports whose calculated metrics value peaks are concurrent from among the ports 321 and the like on the list obtained in Step 3801 (Step 3803). For example, when the difference between metrics value peak appearance times of two of the ports 321 and the like are within a predetermined range, the metrics value peak appearance times of the two ports may be judged as concurrent.

In the case where metrics value peaks appear concurrently in two of the ports 321 and the like that belong to different paths, it is considered that the loads on the paths to which the two ports belong are interfering with each other.

Now, detection of a load interference from metrics value peaks is described with reference to FIG. 4.

In the example of FIG. 4, while each of four paths shares at least one resource with another path, such resource sharing does not always cause a performance problem as has been described with reference to FIG. 3 and FIG. 4.

This embodiment therefore chooses to compare metric value peaks in the paths in detection of a performance problem caused by a load interference.

To give an example, a metrics value peak of the port B 322 which belongs to the path E 375 may be compared against a metrics value peak of the port C 323 which belongs to the path C 373. In the case where these metrics value peaks do not appear concurrently, it is judged that there is no performance problem caused by a load interference between the path E 375 and the path C 373.

In the case where these metrics value peaks appear concurrently, on the other hand, it is judged that a load interference between the path E 375 and the path C 373 is causing a performance problem at the time the metrics value peaks appear. Then it is judged that the load interference is in the port R 351, which is shared by the path E 375 and the path C 373.

Whether or not the metrics value peaks appear concurrently is therefore judged in Step 3803 of FIG. 38.

In Step 3803, intervals (or cycles) at which these metrics value peaks appear may be compared in addition to metrics value peak appearance times. For example, when the difference between metrics value peak appearance intervals of two of the ports 321 and the like is within a predetermined range, the metrics value peak appearance intervals of the two ports may be judged as a match. In the case where peaks appear at the same time and at the same intervals, it is presumed that there is a strong possibility for future performance problems due to a load interference. The concurrent appearance of metrics value peaks at matching intervals as this may be observed in such cases where the application B 305 and the application C 306 tend to issue I/O requests at exactly (or nearly) the same time because of some relation between processing of the application B 305 and processing of the application C 306.

Next, the performance analysis display module 229 refers to the changed I/O path information table 224 and the I/O path information table 228 to identify paths to which the pair or group of ports identified in Step 3803 from among the ports 321 and the like belongs (Step 3804).

The performance analysis display module 229 then identifies resources that are shared by the paths identified in Step 3804 (Step 3805).

Next, the performance analysis display module 229 instructs the performance management client 104 to display the result of the above processing (Step 3806). For example, the performance analysis display module 229 instructs the performance management client 104 to display the resources identified in Step 3805. Following the instruction, the performance management client 104 displays the processing result on the display device 105. An example of how the result is displayed is shown in FIG. 39.

Figure 39:
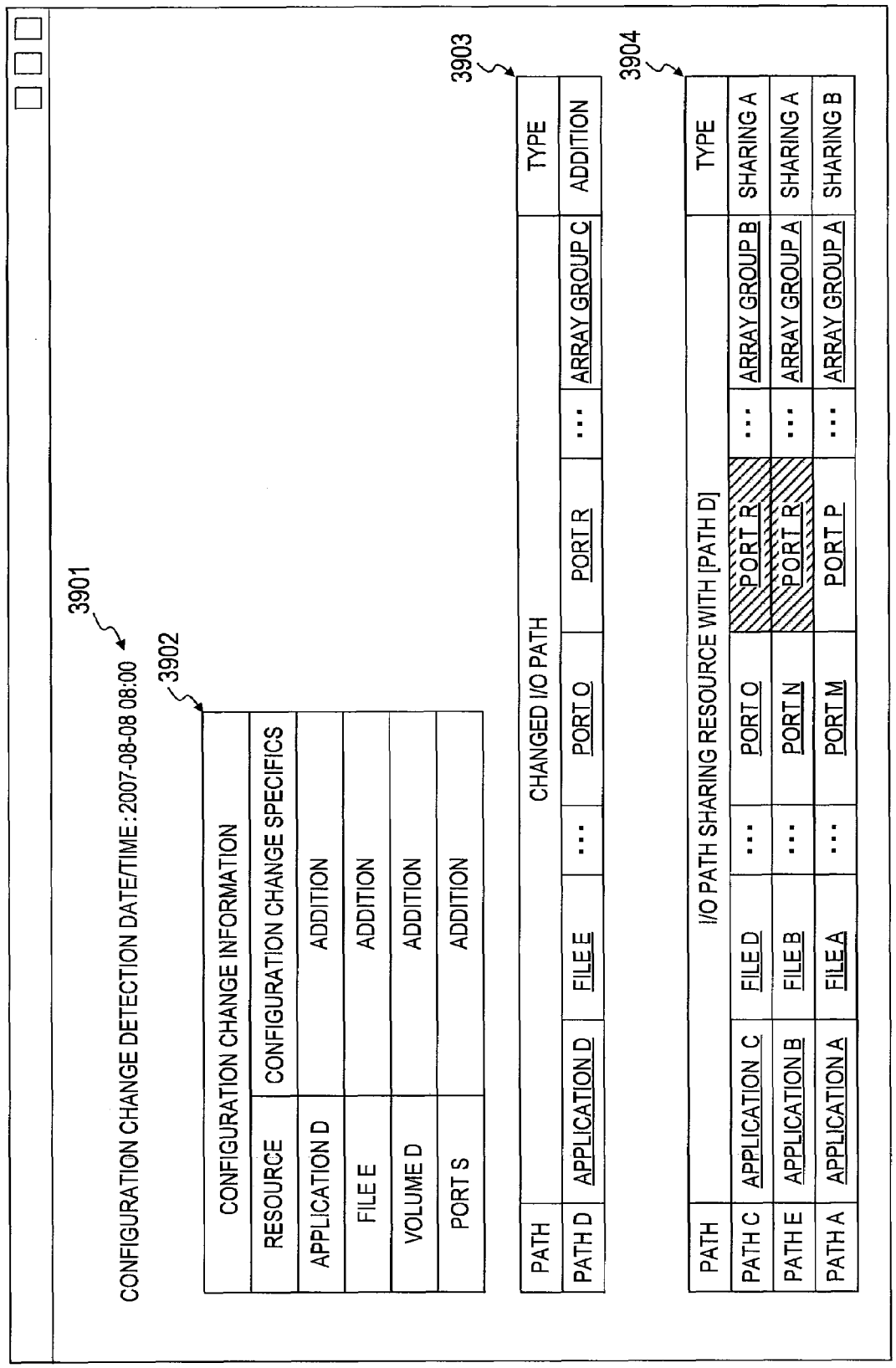
FIG. 39 is an explanatory diagram of a window that displays information about a detected load interference according to the embodiment of this invention.

FIG. 39 is an explanatory diagram of a window that displays information about a detected load interference according to the embodiment of this invention.

Specifically, FIG. 39 shows as an example of a window that is displayed when the host server C 303 is newly added to the computer system shown in FIG. 4 and the path D 374 leading from the application D 307 to the array group C 359 is newly set.

The display window shown in FIG. 39 contains a detection date/time display field 3901, a configuration change information display field 3902, a changed I/O path display field 3903, and a resource sharing I/O path display field 3904. These display fields are the same as the detection date/time display field 3301, configuration change information display field 3302, changed I/O path display field 3303, and resource sharing I/O path display field 3304 shown in FIG. 33, except that, in FIG. 39 which reflects FIG. 4, the resource sharing I/O path display field 3904 displays information different from the one displayed in the resource sharing I/O path display field 3304. The following description only focuses on the difference between FIG. 39 and FIG. 33.

The resource sharing I/O path display field 3904 displays, in addition to information about the path C 373, information about the path E 375 leading from the application B 305 to the array group A 357 and the path A 371 leading from the application A 304 to the array group A 357.

The path E 375 shares the port R 351 with the path D 374. The path A 371 shares the array group A 357 with the path E 375.

FIG. 39 takes as an example a case in which the port R 351 shared by the path C 373 and the path E 375 is identified in Step 3805 through the processing of FIG. 38. In the example of FIG. 39, the port R 351 belonging to the path C 373 and the path E 375 both is accordingly displayed in an enhanced manner by hatching. This indicates that a load interference between the path C 373 and the path E 375 is happening in the port R 351 (in other words, the port R 351 is suffering congestion).

As illustrated in FIG. 38 and FIG. 39, a drop in performance due to a load interference is detected based on when metrics value peaks appear and, when performance lowering is detected, a resource where a load interference that is the cause of the performance lowering is happening is displayed in an enhanced manner. The administrator or a user finds out the load interference in the port R 351 by looking at the enhanced display.

The administrator or a user may take an action to eliminate the interference. For example, the administrator or a user may remove the port R 351 from the path E 375 and add the port Q 350 instead. This changes the path E 375 to a path identical to the path B 372 shown in FIG. 3. Since the path B 372 does not share a resource with the path C 373, the change eliminates the load interference, and it is expected that the performance problem caused by the load interference is eliminated as well.

Processing of displaying specifics of a configuration change in association with metrics values will be described next with reference to FIG. 40 and FIG. 41.

Figure 40:
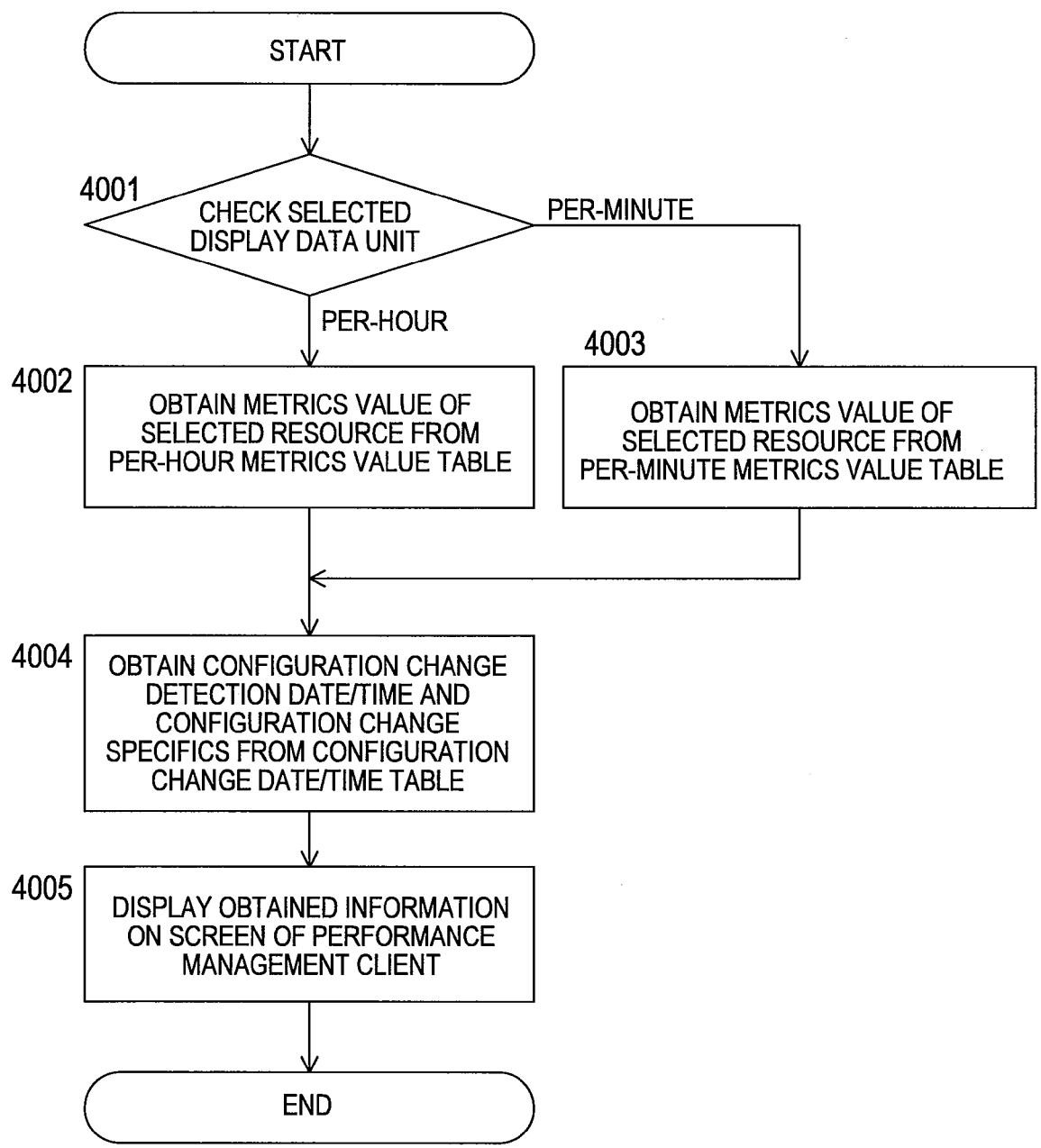
FIG. 40 is a flow chart showing processing that is executed by the performance analysis display module according to the embodiment of this invention to display specifics of a configuration change in association with metrics values.

FIG. 40 is a flow chart showing processing that is executed by the performance analysis display module 229 according to the embodiment of this invention to display specifics of a configuration change in association with metrics values.

The processing shown in FIG. 40 may be executed in place of the processing shown in FIG. 34.

Step 4001 to Step 4003 of the processing shown in FIG. 40 are the same as Step 3401 to Step 3403 of FIG. 34, respectively. Descriptions on these steps will therefore be omitted here.

After Step 4002 or Step 4003 is finished, the performance analysis display module 229 obtains values registered as the configuration change detection date/time 1901 and the configuration change specifics 1903 from the configuration change date/time table 1900 (Step 4004).

Next, the performance analysis display module 229 instructs the performance management client 104 to display the obtained information (Step 4005). Specifically, the performance analysis display module 229 instructs the performance management client 104 to display metrics values as in Step 3404 of FIG. 34. The performance analysis display module 229 also instructs to display the values obtained in Step 4004.

Following the instruction, the performance management client 104 displays the metrics values and the like on the display device 105. An example of a window displayed on the display device 105 is shown in FIG. 41.

Figure 41:
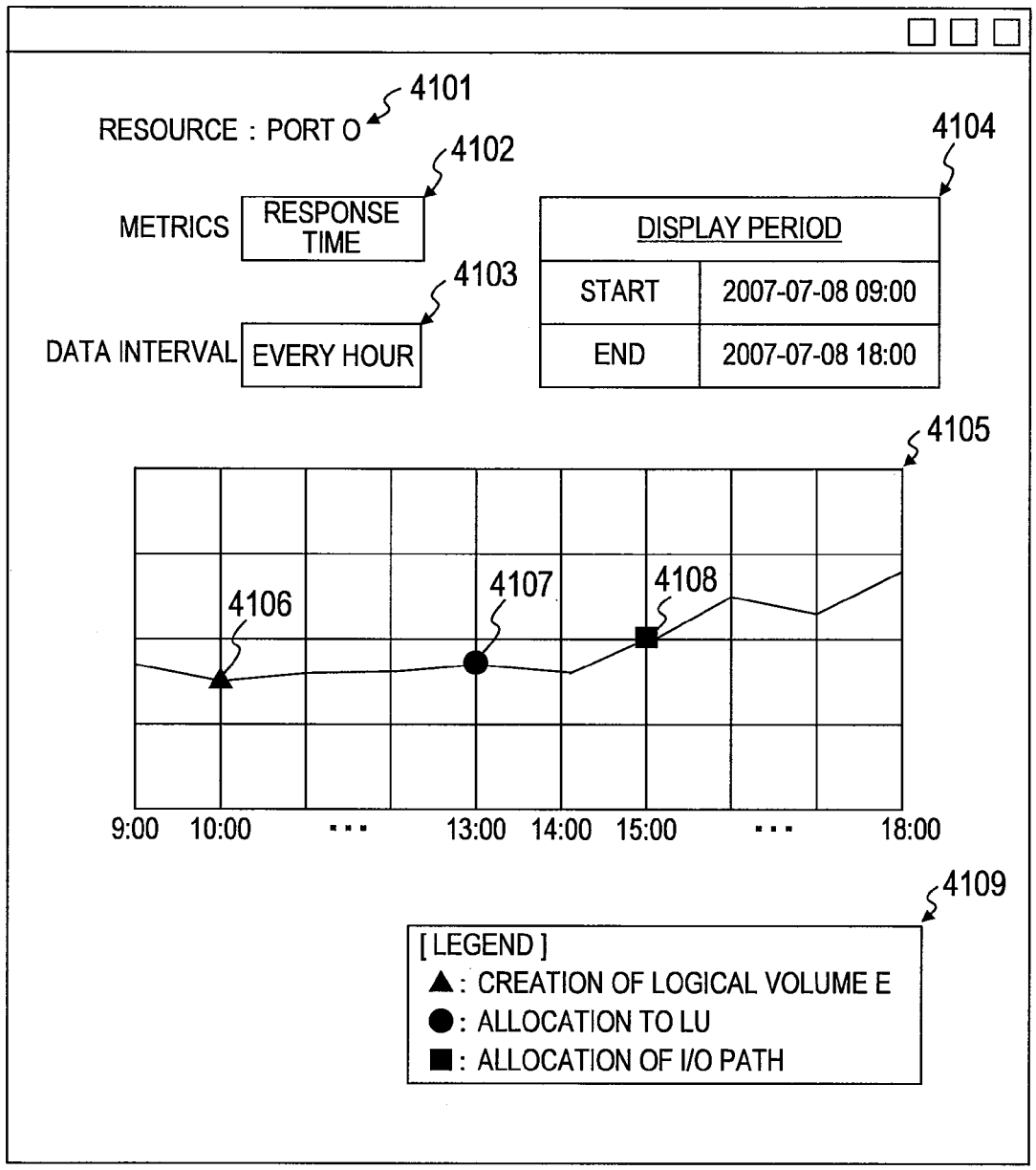
FIG. 41 is an explanatory diagram of metrics values that are displayed in association with specifics of a configuration change according to the embodiment of this invention.

FIG. 41 is an explanatory diagram of metrics values that are displayed in association with specifics of a configuration change according to the embodiment of this invention.

The window of FIG. 41 contains a resource identifier display field 4101, a metrics value type display field 4102, a data interval display field 4103, a display period display field 4104, and a metrics value display field 4105. These display fields are similar to the resource identifier display field 3601, metrics value type display field 3602, data interval display field 3603, display period display field 3604, and metrics value display field 3605 shown in FIG. 36, respectively.

In FIG. 41, however, the display period display field 4104 displays a period from 9:00, Jul. 8, 2007 to 18:00, Jul. 8, 2007. The metrics value display field 4105 accordingly displays per-hour metrics values obtained during the period from 9:00, Jul. 8, 2007 to 18:00, Jul. 8, 2007.

Another difference is that the metrics value display field 4105 in FIG. 41 displays symbols 4106 to 4108, which indicate configuration change specifics. The symbols 4106 to 4108 are each displayed at a point where a per-hour metrics value of the time of detection of a configuration change the symbol represents is plotted.

The window of FIG. 41 further contains a legend display field 4109 for displaying what configuration change specifics the respective symbols 4106 to 4108 represent.

In the example of FIG. 41, the logical volume E (not shown in the drawings) is created at 10:00 on Jul. 8, 2007 as shown in FIG. 19A. Then the metrics value display field 4105 displays the symbol 4106 (the triangular symbol in the example of FIG. 41) representing the creation of the logical volume E at a point where the metrics value collected at 10:00 on Jul. 8, 2007 is plotted.

As illustrated in FIG. 40 and FIG. 41, information for identifying a configuration change and a metrics value collected at the time the configuration change is detected are displayed in association with each other. When a performance problem occurs, the administrator or a user can therefore identify a configuration change that is the cause of the performance problem easily by consulting the window of FIG. 41.

While the present invention has been described in detail and pictorially in the accompanying drawings, the present invention is not limited to such detail but covers various obvious modifications and equivalent arrangements, which fall within the purview of the appended claims.

What is claimed is:

1. A management computer coupled via a network to a computer system which comprises at least one host computer, a storage system coupled to the at least one host computer via the network, and a display device, the at least one host computer comprising a first interface coupled to the network, a first processor coupled to the first interface, and a first memory coupled to the first processor, the storage system comprising at least one physical disk device which stores data written by the at least one host computer, the management computer comprising:
a second interface coupled to the at least one host computer and the storage system;
a second processor coupled to the second interface; and
a second memory coupled to the second processor, wherein each of a plurality of paths over which data is written and read in the at least one physical disk device by the at least one host computer includes a plurality of resources, wherein the second memory holds identification information of each of the plurality of resources, wherein the plurality of paths include a first path and a second path, wherein the second processor is configured to detect at least one of an addition and removal of the resource to the first path, wherein adding the resource to the first path includes newly setting the first path which includes the plurality of resources, and wherein the second processor is further configured to:
store, in the second memory, performance information obtained from the plurality of resources that belong to the first path at first time intervals until a predetermined length of time elapses since the detection of the at least one of addition and removal of the resource to the first path;
store, when at least one of the plurality of resources belonging to the first path also belongs to the second path, in the second memory, performance information obtained from the plurality of resources that belong to the second path at the first time intervals until the predetermined length of time elapses since the detection of the at least one of addition and removal of the resource to the first path;

store, in the second memory, performance information obtained from the plurality of resources that belong to at least one of the first path and the second path at second time intervals, which are longer than the first time intervals, without storing performance information obtained from the plurality of resources that belong to at least one of the first path and the second path at the first time intervals after the predetermined length of time elapses since the detection of the at least one of addition and removal of the resource to the first path; and send an instruction that causes the display device to display the performance information obtained from the plurality of resources that belong to at least one of the plurality of paths at the first time intervals.

2. The management computer according to claim 1, wherein the plurality of paths further include a third path, and wherein the second processor is further configured to:

store, when at least one resource belonging to the second path also belongs to the third path, in the second memory, performance information obtained from the plurality of resources that belong to the third path at the first time intervals until the predetermined length of time elapses since the detection of the at least one of addition and removal of the resource to the first path; and store, in the second memory, performance information obtained from the plurality of resources that belong to the third path at the second time intervals, without storing performance information obtained from the plurality of resources that belong to the third path at the first time intervals after the predetermined length of time elapses since the detection of the at least one of addition and removal of the resource to the first path.

3. The management computer according to claim 2, wherein the plurality of paths further include a fourth path, wherein the second processor is further configured to:

store, when at least one resource belonging to the third path also belongs to the fourth path, in the second memory, performance information obtained from the plurality of resources that belong to the fourth path at the first time intervals until the predetermined length of time elapses since the detection of the at least one of addition and removal of the resource to the first path; and store, in the second memory, performance information obtained from the plurality of resources that belong to the fourth path at the second time intervals, without storing performance information obtained from the plurality of resources that belong to the fourth path at the first time intervals after the predetermined length of time elapses since the detection of the at least one of addition and removal of the resource to the first path.

4. The management computer according to claim 1, wherein, when a difference is smaller than a second threshold between a time at which a value of the performance information collected from at least one resource that belongs to the first path at the first time intervals exceeds a first threshold and a time at which a value of the performance information collected from at least one resource that belongs to the second path at the first time intervals exceeds the first threshold, the second processor is further configured to send an instruction that causes the display device to display information indicating that at least one resource that belongs to the first path and the second path both is suffering congestion.

5. The management computer according to claim 1, wherein the second processor is further configured to:

store, in the second memory, performance information obtained from the plurality of resources that belong to the first path at the second time intervals until the predetermined length of time elapses since the detection of the at least one of addition and removal of the resource to the first path;

store, when at least one of the plurality of resources belonging to the first path also belongs to the second path, in the second memory, performance information obtained from the plurality of resources that belong to the second path at the second time intervals until the predetermined length of time elapses since the detection of the at least one of addition and removal of the resource to the first path; and delete, when a data amount of the stored performance information exceeds a predetermined threshold, from the second memory, the performance information obtained at the second time intervals except performance information obtained before the predetermined length of time elapses from the plurality of resources that belong to at least one of the first path and the second path.

6. The management computer according to claim 1, wherein the second processor is further configured to:

judge, when a data amount of the stored performance information exceeds a predetermined threshold, whether or not a predetermined retention period has elapsed since a time when a piece of the stored first time interval performance information had been obtained;

judge, when it is judged that the predetermined retention period of the piece of the first time interval performance information has elapsed, whether or not this piece of the first time interval performance information represents heaviest load of all pieces of the stored first time interval performance information; and delete, from the second memory, pieces of the first time interval performance information that have been judged not to represent the heaviest load.

7. The management computer according to claim 1, wherein the second processor is further configured to send an instruction that causes the display device to display information for identifying the detected at least one of addition and removal of the resource in association with the performance information obtained at a time when the at least one of addition and removal of the resource has been detected.

8. A computer system comprising:

at least one host computer;

a storage system coupled to the at least one host computer via a network;

a management computer coupled to the at least one host computer and the storage system; and a display device, wherein the at least one host computer comprises a first interface coupled to the network, a first processor coupled to the first interface, and a first memory coupled to the first processor, wherein the storage system comprises at least one physical disk device which store data written by the at least one host computer, wherein the management computer comprises a second interface coupled to the at least one host computer and the storage system, a second processor coupled to the second interface, and a second memory coupled to the second processor, wherein each of a plurality of paths over which data is written and read in the at least one physical disk device by the at least one host computer includes a plurality of resources, wherein the management computer holds identification information of each of the plurality of resources, wherein the plurality of paths include a first path and a second path, wherein the management computer is configured to detect at least one of an addition and removal of the resource to the first path, wherein adding the resource to the first path includes newly setting the first path which comprises the plurality of resources, and wherein the management computer is further configured to:

store performance information obtained from the plurality of resources that belong to the first path at first time intervals until a predetermined length of time elapses since the detection of the at least one of addition and removal of the resource to the first path;

store, when at least one of the plurality of resources belonging to the first path also belongs to the second path, performance information obtained from the plurality of resources that belong to the second path at the first time intervals until the predetermined length of time elapses since the detection of the at least one of addition and removal of the resource to the first path;

store performance information obtained from the plurality of resources that belong to at least one of the first path and the second path at second time intervals, which are longer than the first time intervals, without storing performance information obtained from the plurality of resources that belong to at least one of the first path and the second path at the first time intervals after the predetermined length of time elapses since the detection of the at least one of addition and removal of the resource to the first path; and cause the display device to display the performance information obtained from the plurality of resources that belong to at least one of the plurality of paths at the first time intervals.

9. The computer system according to claim 8, wherein the plurality of paths further include a third path, and wherein the management computer is further configured to:

store, when at least one resource belonging to the second path also belongs to the third path, performance information obtained from the plurality of resources that belong to the third path at the first time intervals until the predetermined length of time elapses since the detection of the at least one of addition and removal of the resource to the first path; and store performance information obtained from the plurality of resources that belong to the third path at the second time intervals, without storing performance information obtained from the plurality of resources that belong to the third path at the first time intervals after the predetermined length of time elapses since the detection of the at least one of addition and removal of the resource to the first path.

10. The computer system according to claim 9, wherein the plurality of paths further include a fourth path, and wherein the management computer is further configured to:

store, when at least one resource belonging to the third path also belongs to the fourth path, performance information obtained from the plurality of resources that belong to the fourth path at the first time intervals until the predetermined length of time elapses since the detection of the at least one of addition and removal of the resource to the first path; and store performance information obtained from the plurality of resources that belong to the fourth path at the second time intervals, without storing performance information obtained from the plurality of resources that belong to the fourth path at the first time intervals after the predetermined length of time elapses since the detection of the at least one of addition and removal of the resource to the first path.

11. The computer system according to claim 8, wherein, when a difference is smaller than a second threshold between a time at which a value of the performance information collected from at least one resource that belongs to the first path at the first time intervals exceeds a first threshold and a time at which a value of the performance information collected from at least one resource that belongs to the second path at the first time intervals exceeds the first threshold, the management computer is further configured to cause the display device to display information indicating that at least one resource that belongs to the first path and the second path both is suffering congestion.

12. The computer system according to claim 8, wherein the management computer is further configured to:

store performance information obtained from the plurality of resources that belong to the first path at the second time intervals until the predetermined length of time elapses since the detection of the at least one of addition and removal of the resource to the first path;

store, when at least one of the plurality of resources belonging to the first path also belongs to the second path, performance information obtained from the plurality of resources that belong to the second path at the second time intervals until the predetermined length of time elapses since the detection of the at least one of addition and removal of the resource to the first path; and delete, when a data amount of the stored performance information exceeds a predetermined threshold, the performance information obtained at the second time intervals except performance information obtained before the predetermined length of time elapses from the plurality of resources that belong to at least one of the first path and the second path.

13. The computer system according to claim 8, wherein the management computer is further configured to:

judge, when a data amount of the stored performance information exceeds a predetermined threshold, whether or not a predetermined retention period has elapsed since a time when a piece of the stored first time interval performance information had been obtained;

judge, when it is judged that the predetermined retention period of the piece of the first time interval performance information has elapsed, whether or not this piece of the first time interval performance information represents heaviest load of all pieces of the stored first time interval performance information; and delete pieces of the first time interval performance information that have been judged not to represent the heaviest load.

14. The computer system according to claim 8, wherein the management computer is further configured to cause the display device to display information for identifying the detected at least one of addition and removal of the resource in association with the performance information obtained at a time when the at least one of addition and removal of the resource has been detected.

15. A control method of controlling a management computer which is coupled via a network to a computer system comprising: at least one host computer; a storage system coupled to the at least one host computer via the network; and a display device, the at least one host computer comprising a first interface coupled to the network, a first processor coupled to the first interface, and a first memory coupled to the first processor, the storage system comprising at least one disk device which stores data written by the at least one host computer, the management computer comprising a second interface coupled to the at least one host computer and the storage system, a second processor coupled to the second interface, and a second memory coupled to the second processor, each of a plurality of paths over which data is written and read in the at least one physical disk device by the at least one host computer including a plurality of resources, the second memory holding identification information of each of the plurality of resources, the plurality of paths including a first path and a second path, the control method comprising:

a first step of detecting at least one of an addition and removal of the resource to the first path, adding the resource to the first path including newly setting the first path which comprises the plurality of resources;

a second step of storing performance information obtained from the plurality of resources that belong to the first path at first time intervals until a predetermined length of time elapses since the detection of the at least one of addition and removal of the resource to the first path;

a third step of storing, when at least one of the plurality of resources belonging to the first path also belongs to the second path, performance information obtained from the plurality of resources that belong to the second path at the first time intervals until the predetermined length of time elapses since the detection of the at least one of addition and removal of the resource to the first path;

a fourth step of storing performance information obtained from the plurality of resources that belong to at least one of the first path and the second path at second time intervals, which are longer than the first time intervals, without storing performance information obtained from the plurality of resources that belong to at least one of the first path and the second path at the first time intervals after the predetermined length of time elapses since the detection of the at least one of addition and removal of the resource to the first path; and a fifth step of causing the display device to display the performance information obtained from the plurality of resources that belong to at least one of the plurality of paths at the first time intervals.

16. The control method according to claim 15,
wherein the plurality of paths further include a third path, and
wherein the control method further comprises:

a sixth step of storing, when at least one resource belonging to the second path also belongs to the third path, performance information obtained from the plurality of resources that belong to the third path at the first time intervals until the predetermined length of time elapses since the detection of the at least one of addition and removal of the resource to the first path; and a seventh step of storing performance information obtained from the plurality of resources that belong to the third path at the second time intervals, without storing performance information obtained from the plurality of resources that belong to the third path at the first time intervals after the predetermined length of time elapses since the detection of the at least one of addition and removal of the resource to the first path.

17. The control method according to claim 16,
wherein the plurality of paths further include a fourth path, and
wherein the control method further comprises:

an eighth step of storing, when at least one resource belonging to the third path also belongs to the fourth path, performance information obtained from the plurality of resources that belongs to the fourth path at the first time intervals until the predetermined length of time elapses since the detection of the at least one of addition and removal of the resource to the first path; and a ninth step of storing performance information obtained from the plurality of resources that belong to the fourth path at the second time intervals, without storing performance information obtained from the plurality of resources that belong to the fourth path at the first time intervals after the predetermined length of time elapses since the detection of the at least one of addition and removal of the resource to the first path.

18. The control method according to claim 15, wherein, when a difference is smaller than a second threshold between a time at which a value of the performance information collected from at least one resource that belongs to the first path at the first time intervals exceeds a first threshold and a time at which a value of the performance information collected from at least one resource that belongs to the second path at the first time intervals exceeds the first threshold, the control method further comprising a tenth step of causing the display device to display information indicating that at least one resource that belongs to the first path and the second path both is suffering congestion.

19. The control method according to claim 15,
wherein the second step comprises the step of storing performance information obtained from the plurality of resources that belong to the first path at the second time intervals until the predetermined length of time elapses since the detection of the at least one of addition and removal of the resource to the first path,
wherein the third step comprises the step of storing, when at least one of the plurality of resources belonging to the first path also belongs to the second path, performance information obtained from the plurality of resources that belong to the second path at the second time intervals until the predetermined length of time elapses since the detection of the at least one of addition and removal of the resource to the first path, and wherein the control method further comprises:

an eleventh step of deleting, when a data amount of the stored performance information exceeds a predetermined threshold, the performance information obtained at the second time intervals except performance information obtained before the predetermined length of time elapses from the plurality of resources that belong to at least one of the first path and the second path;

a twelfth step of judging, when a data amount of the stored performance information exceeds the predetermined threshold, whether or not a predetermined retention period has elapsed since a time when a piece of the stored first time interval performance information had been obtained;

a thirteen step of judging, when it is judged that the predetermined retention period of the piece of the first time interval performance information has elapsed, whether or not this piece of the first time interval performance information represents heaviest load of all pieces of the stored first time interval performance information; and a fourteenth step of deleting pieces of the first time interval performance information that have been judged not to represent the heaviest load.

20. The control method according to claim 15, wherein the fifth step comprises the step of causing the display device to display information for identifying the detected at least one of addition and removal of the resource in association with the performance information obtained at a time when the at least one of addition and removal of the resource has been detected.

* * * * *